United States Patent [19]

Showalter

[11] Patent Number: 4,577,602

[45] Date of Patent: * Mar. 25, 1986

[54] HIGH SWIRL VERY LOW POLLUTION PISTON ENGINE EMPLOYING OPTIMIZABLE VORTICITY METERING

[75] Inventor: Merle R. Showalter, Madison, Wis.

[73] Assignee: Automotive Engine Associates, Madison, Wis.

[*] Notice: The portion of the term of this patent subsequent to Aug. 17, 1999 has been disclaimed.

[21] Appl. No.: 589,869

[22] Filed: Mar. 19, 1984

Related U.S. Application Data

[60] Continuation of Ser. No. 328,850, Dec. 9, 1981, abandoned, which is a division of Ser. No. 47,472, Jun. 11, 1979, Pat. No. 4,344,394, which is a continuation-in-part of Ser. No. 914,857, Jun. 12, 1978, abandoned, which is a continuation of Ser. No. 791,422, Apr. 27, 1977, abandoned, which is a continuation of Ser. No. 547,040, Feb. 4, 1975, abandoned.

[51] Int. Cl.$^4$ .................................................. F02B 31/00
[52] U.S. Cl. .................................. 123/306; 123/52 M; 123/188 M
[58] Field of Search ............... 123/301, 306, 188 M, 123/52 M, 90.15, 52 MF

[56] References Cited

U.S. PATENT DOCUMENTS

| | | | |
|---|---|---|---|
| 3,167,059 | 1/1965 | Love | 123/52 MF |
| 3,714,932 | 2/1973 | Meacham et al. | 123/90.15 |
| 3,744,463 | 7/1973 | McFarland, Jr. | 123/52 M |
| 3,868,940 | 3/1975 | Kirchweger | 123/306 |
| 4,180,041 | 12/1979 | Miyazaki et al. | 123/188 M |
| 4,207,854 | 6/1980 | Alford et al. | 123/306 |
| 4,228,772 | 10/1980 | Bakonyi | 123/188 M |
| 4,344,394 | 8/1982 | Showalter | 123/52 M |

FOREIGN PATENT DOCUMENTS 60523  2/1948  Netherlands ................. 123/306

Primary Examiner—Andrew M. Dolinar
Attorney, Agent, or Firm—Witherspoon & Hargest

[57] ABSTRACT

Method and apparatus for producing intense, consistent swirl and air-fuel-E.G.R.-vorticity charge uniformity without any net penalty in engine power, volumetric efficiency, or pumping work. Method and apparatus permit optimal swirl and turbulence for flame stability and fuel economy throughout the R.P.M.-load phase space of engine operation. Method and apparatus require no substantial changes in combustion chamber shape or basic engine structure. For spark fired engines, the method and apparatus permits operation at air-fuel-E.G.R.-intake manifold vacuum combinations having excellent fuel consumption characteristics combined with very low emissions of CO, HC, and NO. For diesel engines, the method and apparatus permits optimized swirl without the volumetric efficiency and pumping work penalties accepted with present art swirl inducing techniques.

3 Claims, 96 Drawing Figures

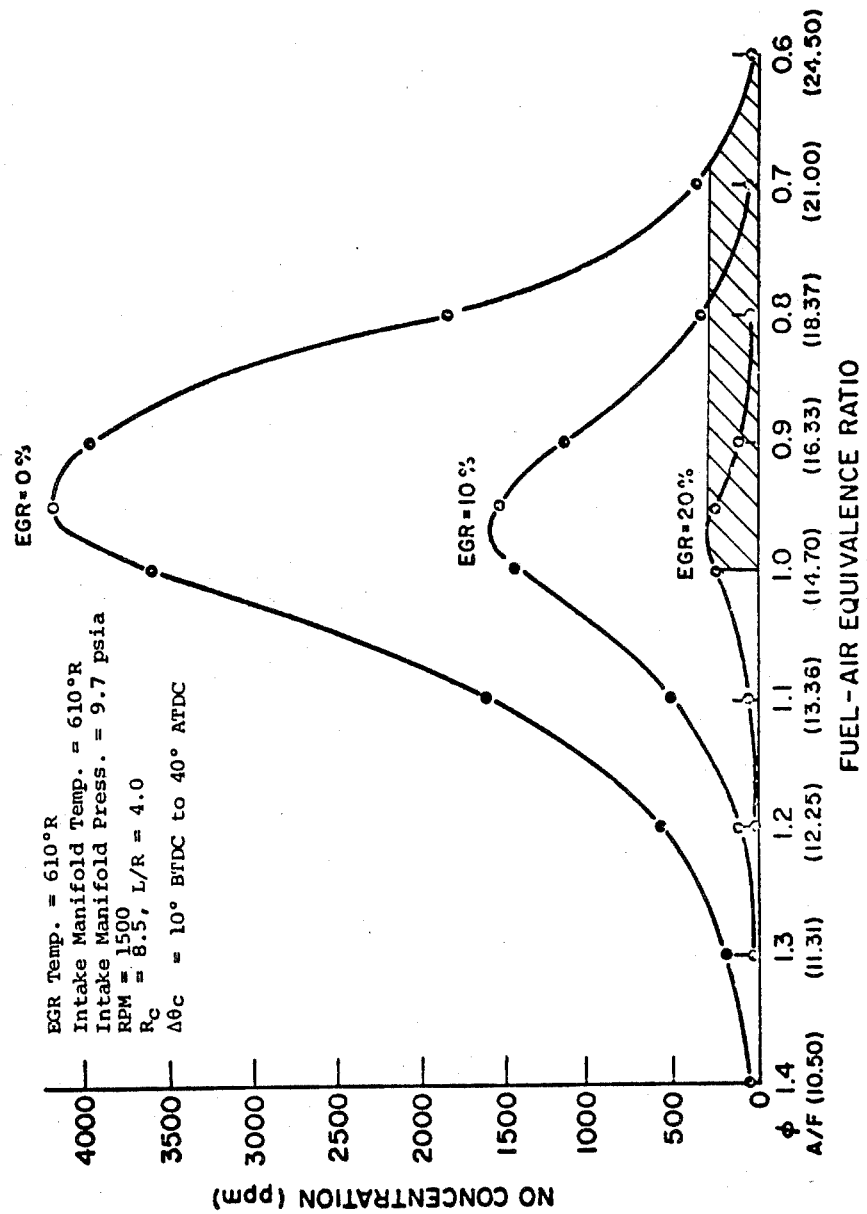

SOURCE: P. N. BLUMBERG, OP. CIT.

SOURCE: P. N. BLUMBERG, OP. CIT.

IRROTATIONAL FLOW VORTEX

IRROTATIONAL FLOW VORTEX

SOURCE: DAVID R. LANCASTER
S.A.E. PAPER 760159

SOURCE: DAVID R. LANCASTER
S.A.E. PAPER 760159

SOURCE: DAVID R. LANCASTER
S.A.E. PAPER 760159

SOURCE: DAVID R. LANCASTER
S.A.E. PAPER 760159

SOURCE: DAVID R. LANCASTER
S.A.E. PAPER 760159

SOURCE: "MEASUREMENT OF AIR MOVEMENTS IN
INTERNAL COMBUSTION ENGINE CYLINDERS"
M. HORVATIN AND A. W. HUSSMAN
DISA INFORMATION #8
JULY 1969

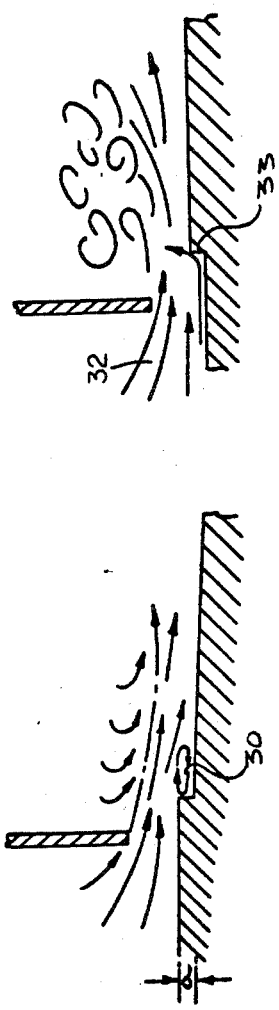
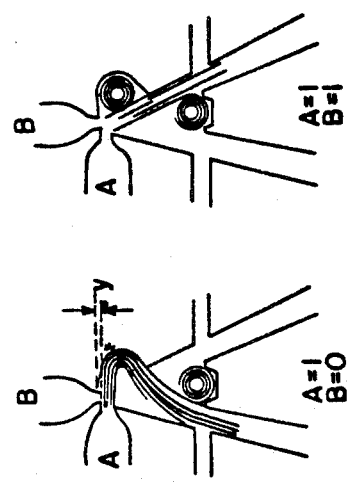
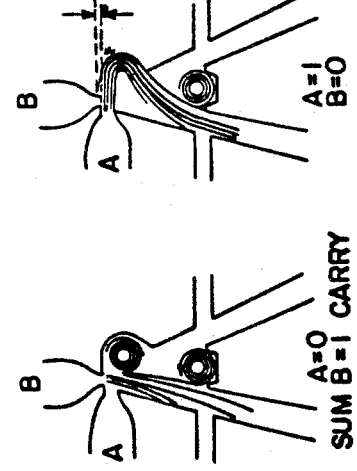
FIG. 27B
FIG. 27a
FIG. 26D.
FIG. 26C.
FIG. 26B.
FIG. 26A.
SOURCE: PAGE 18 FLUIDICS
K. FOSTER AND
G.A. PARKER

SOURCE: HORVATIN AND HUSSMAN, OP. CIT.

INTAKE  EXHAUST

SOURCE: LANCASTER ET AL
S.A.E. PAPER 760160

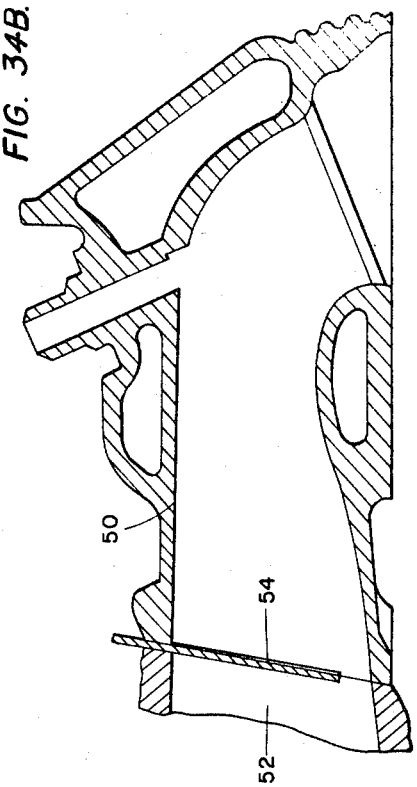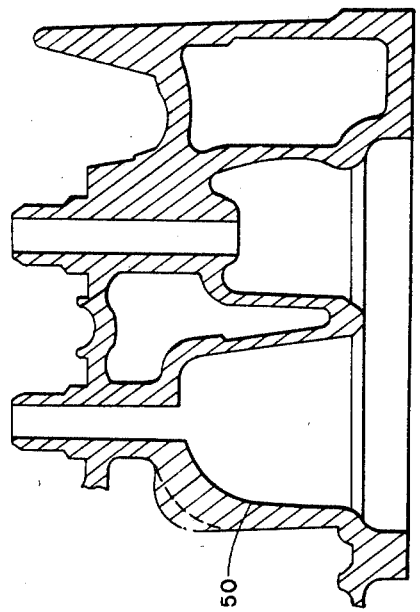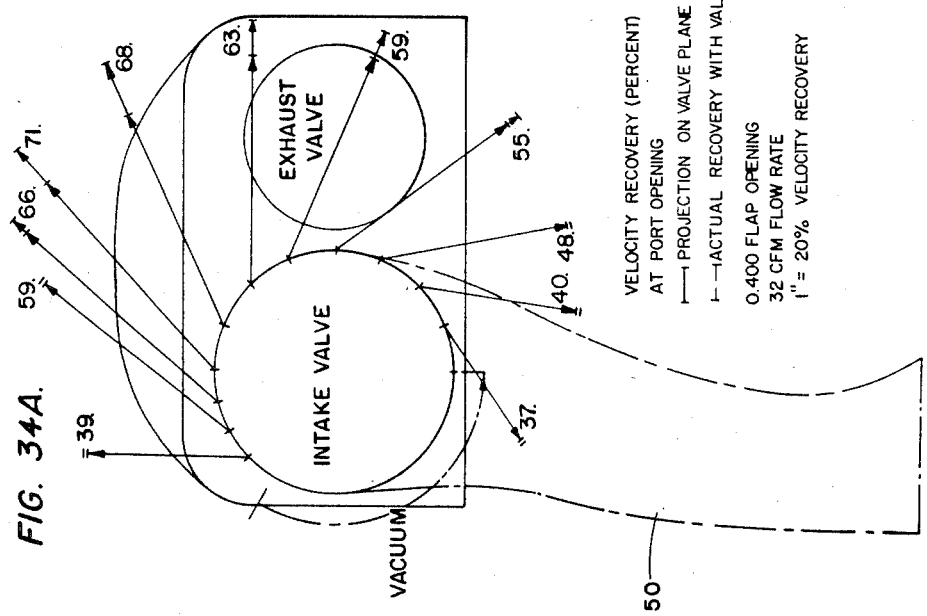

$V_{tr} = \dfrac{V_{t r_0} r_0}{r}$ $(mvr = k)$

IRROTATIONAL VORTEX FLOW TO CENTRAL SINK:

$V_{TANGENTIAL}(r) = \dfrac{V_{t r_0} r_0}{r}$ $V_{RADIAL}(r) = \dfrac{V_{r r_0} r_0}{r}$ Nitric Oxide Emissions, gm/mi ($NO_2$)

1972 Mark IV vehicle (5500 lb.)

351 C.I.D. engine, 20 psi fmep assumed

Blumberg 8-point Correlation on Propane

| | EQUIV. RATIO | | |
|---|---|---|---|
| | POWER (ISFC) OPTIMAL | 5% RICH | 10% RICH |
| SPARK ADVANCE — POWER OPTIMAL | .313 | | 3.20 |
| SPARK ADVANCE — 5° RETARD | .088 | .527 | 1.76 |
| SPARK ADVANCE — 7½° RETARD | | .364 | |

FIG. 63

Hydrocarbon Emissions, gm/mi $(CH_2)_N$

1972 Mark IV vehicle (5500 lb.)

351 C.I.D. engine, 20 psi fmep assumed

Blumberg 8-point correlation on Propane

|  | | EQUIV. RATIO | | |
|---|---|---|---|---|
|  | | POWER (ISFC) OPTIMAL | 5% RICH | 10% RICH |
| SPARK ADVANCE | POWER OPTIMAL | 6.71 |  | 4.61 |
|  | 5° RETARD | 6.11 | 5.20 | 4.36 |
|  | 7½° RETARD |  | 5.03 |  |

FIG. 64

HIGH LOAD FLAP SENSITIVITY TEST
(≈ 105 IMEP)
(ER=.709)
(DECEMBER 29, 1977 DATA)

HIGH LOAD FLAP SENSITIVITY TEST
FIG. 69 (ER=.709) (MBT SPARK ADVANCE)
(DECEMBER 29, 1977 DATA)

HIGH SWIRL VERY LOW POLLUTION PISTON ENGINE EMPLOYING OPTIMIZABLE VORTICITY METERING

BACKGROUND AND OBJECTS

This application is a continuation of application Ser. No. 328,850, filed Dec. 9, 1981, now abandoned, which is a division of application Ser. No. 047,472, filed June 11, 1979, now U.S. Pat. No. 4,344,394, which is a continuation-in-part of application Ser. No. 914,857, filed June, 12, 1978, abandoned, which application is a continuation of Ser. No. 791,422, abandoned, filed Apr. 27, 1977, which is in turn a continuation of Ser. No. 547,040, filed Feb. 4, 1975, abandoned.

Since the beginning of 1972, the inventor has been devoting his full-time efforts to controlling the detailed fluid mechanics within engine cylinders. Since before the filling of the original case in 1975, the inventor has been engaged on a continuous and full time basis in perfecting optimizable vorticity metering for engines. Supporters of this work have included The Johns Hopkins University and The University of Wisconsin. The bulk of the new matter of this application was developed at the Internal Combustion Engine Research Laboratory of The University of Wisconsin under the close supervision of Professors P. S. Myers and O. A. Uyehara.

It is the purpose of the present invention to satisfy a number of requirements commonly thought to be in conflict using structurally simple, mass producible, and reliable hardware. The requirements to be met are:

a. Build an engine producing ultralow $NO_x$ and other emissions without catalytic control of $No_x$.
b. Build the engine in such a way that the goals of optimal fuel consumption and $NO_x$ control are not in conflict, with fuel consumption superior to that of pre-emission control engines.
c. Build the engine such that very high power outputs, substantially in excess of the power outputs of current production engines are possible.
d. Build the engine so that combustion is always very smooth, so that excellent driveability and engine flexibility are obtained under all the many conditions under which automobile engines are expected to run smoothly.
e. Build the engine as a modification of current engines, in such a way that current production lines and techniques require little modification to produce the improved engines.
f. Build the engine modification so that it requires fewer and simpler parts than those required for current production engines, to minimize both fabrication and maintenance costs.

To achieve these goals together has involved difficult conceptual and practical problems, and particularly has required a fundamental breakthrough in the application of detailed turbulent fluid mechanics to the physical chemistry of combustion in engines.

The following considerations, many of them not obvious and out of harmony with conventional doctrine in automotive engineering, were involved in the conception and development of the present invention:

1. The commonly held "trade-off" between low $NO_x$ emissions and optimal fuel economy is based on the narrow range of flame stability limits characteristic of prior art spark fired engines. Thermodynamically, theoretical efficiency of the constant volume fuel-air cycle for a set compression ratio continues to improve monotonically as air-fuel ratio is leaned from the stoichiometric ratio. The chemical kinetics of NO formation in engines is such that the maximum NO concentration is formed around 0.9 stoichiometric (0.9 equivalence ratio), but as the mixture is leaned beyond 0.9 equivalence ratio, NO decreases; and leaner than an equivalence ratio of 0.65 $NO_x$ is negligible even without dilution of the charge with residual gases (products of combustion). With exhaust gas dilution, NO formation rates become negligible at richer ratios, and again the constant volume cycle efficiency under part loads improves as dilution of the charge is increased. *With current engines there is a trade-off between low NO and fuel efficiency because the very lean or dilute mixtures required for low NO burn so badly that the thermodynamic advantages are overshadowed by the unstable and slow combustion.* The conventional wisdom of automotive engineering is that the very lean mixtures required for low NO must always burn badly, and so the idea of an inherent trade-off between NO emission control and engine efficiency has become entrenched. The inventor proceeded in engine research for more than eight years to achieve adequately fast and very stable combustion of the very lean or dilute mixtures required for NO control. This very dilute combustion required, and was understood by the inventor to require, a very significant tightening of statistical variations in the engine: sources of cycle-to-cycle air-fuel variation had to be much reduced (statistical variations from cylinder-to-cylinder had to be very much reduced; and microscale or small volume mixture variations inside the cylinder at combustion time had to be reduced). In addition, adequately fast stable combustion required control of the mixture motions inside the cylinder to produce intense enough turbulence for fast flame speeds with dilute mixtures. He has achieved the desired combustion stability by achieving very complete statistical uniformity of fuel, air and residuals inside the combustion chamber with the uniformity maintained from cycle to cycle and from cylinder to cylinder, and by maintaining a controllable and high turbulence level at combustion time so as to achieve rapid and uniform flame speeds. The statistical uniformity sought and achieved was and is much beyond the present engine art statistical uniformity, and represents levels of statistical uniformity well beyond levels held to be either necessary or desirable by authorities in automotive engineering.

2. The trade-off between engine smoothness and peak power output has been recognized since before the first world war, and this trade-off is usually thought to be inevitable. Basically, the power output of a well designed engine, once its mixture has been richened to the maximum output air-fuel ratio, is limited by its volumetric efficiency. (An engine's ability to take in fuel-air mixture mass limits its power output). To get high volumetric efficiency, one must minimize the flow resistance of the passages through which charge must flow to the cylinder, so as to maximize the mass of mixture inducted. This entails large flow cross sections in passages, smooth transitions, large intake valves with large valve lifts, and a camshaft designed so that valves are well open at times when piston speeds are substantial. These modifications tend to make an engine run badly under the very low load conditions characteristic of conventional engine operation, particularly for in-town driving. Under these low speed, low load conditions, valve overlap causes excessive charge dilution; and the low velocities of the mixture into the cylinder produce bad mixing and low turbulent flame speeds. Excessive dilution, bad mixing, and low combustion turbulence all tend to produce marginal combustion.

Consequently, everyone expects racing engines to idle badly and run roughly under normal driving conditions. The conventional remedy for the bad driveability of high output type engines has been to restrict valve lifts, port and manifold passages, and cam timings; these modifications invariably restrict peak power to improve smoothness. Under conventional market conditions, the compromise between smoothness and peak output is always an uneasy one, because power and smoothness both have substantial market value. The wide speed-load range of engine operation makes the problem particularly difficult, and it is generally found that with the maximum tolerable fixed intake restriction, idle and low speed combustion stability is still much less than the stability which would be possible with better low speed mixing and turbulence.

For low speeds, very restrictive intake flow passages are needed; for high speeds, open passages are needed, and the engine must operate under both low and high speed conditions. Within a fixed intake passage geometry format, no way out of this dilemna has been found.

The intrinsic need for a power versus smoothness trade-off goes away if the intake flow passage is variable, for then the intake flow sections can be restrictive when high turbulence is wanted and open when high flow capacity is wanted; as engines are operated, the two are never wanted simultaneously. This variation has been achieved previously by varying intake valve lifts (Stivender INTAKE VALVE THROTTLING-A SONIC THROTTLING INTAKE VALVE ENGINE, (SAE TRANSACTIONS), Vol. 77, 1968). Intake valve throttling is conceptually straightforward, but involves great practical difficulties. Other and more producible forms of variable intake passage section involve very difficult and even treacherous fluid mechanical questions, which have occupied the inventor since the filing of the original case.

3. The detailed fluid mechanics inside an engine is sufficiently complicated that it is held to be unreasonable to think about it or manipulate it in great detail. The flows are turbulent non-equilibrium structured flows of significant complexity both in the intake port and inside the combustion chamber. The concept of a structured turbulent flow appears to be conceptually very difficult, perhaps because turbulence is generally taught in exclusively statistical terms. The inventor has never encountered an automotive engineer who was not significantly uncomfortable about the very concept of flow inside a cylinder as a structured three dimensional flow "dance" or trajectory with random turbulent fluctuations superimposed on the means flow pattern. Understanding and manipulation of the turbulent flow structures in engines, manipulating both flow patterns and velocities, is central to the current invention, and constitutes a significant advance beyond conventional fluid mechanical control in engines.

At the time of filing the original application in February of 1975, the inventor had a very clear understanding of points 1 and 2 and a rather complete conceptual understanding of point 3 above. However, the details of the fluid mechanics required to produce adequately stable structures and controllable flows were inadequately understood. The history of the development of the present invention is relevant here.

In late 1974, the inventor had the idea that continuously variable structured flow and turbulence in combination with very dilute mixtures would produce smooth and efficient combustion in combination with very low NO and CO emissions. At this time, a number of tests with port restrictions having identical flow discharge coefficients were conducted on a Ford 240 CID 6 cylinder truck engine. The tests clearly demonstrated that engine performance was much better with the kinetic energy past the port restriction relatively organized than with the same flow energy poured into turbulence, which apparently decayed too rapidly to complete mixing and to assist combustion. The inventor was relatively well skilled in the fluid mechanical art known as fluidics, which will be discussed below. To minimize the flow energy decay between the variable port restriction and the valve inlet, the inventor utilized port restricting means having the openings adjacent to one of the port walls (the Ford ports were roughly rectangular), so as to produce a Coanda wall attached stream flow. For this particular port, the side opening restrictions produced much better combustion than the top or bottom opening port restrictions; and it was not until much later that the inventor discovered that with proper port shaping, the top opening and bottom opening restriction designs could be made much more fluidically stable and effective than the side opening restrictions used in the initial experiments.

Initial results with the side opening port restrictions tested at this time were outstandingly good. It was quickly determined that using the fluidic effect of wall attachment (Coanda effect) enough of the flow energy past the variable restriction could be maintained during the induction and compression process to significantly improve mixing and combustion. The lean limit of engine operation for this homogeneous charge engine was extended to the very lean ratio of 26:1 on gasoline, and engine EGR tolerance with a mixture leaner than stoichiometric was as much as 40% by mass. The variable restrictions significantly increased flame speeds for any set mixture quality. Engine smoothness and cold start characteristic also improved markedly.

The dramatic improvement in the engine's performance at cold start was an initial surprise, but was easy to understand. Because of the port restriction, the exhaust gas blown back into the intake manifold during the valve overlap period was a turbulent structured flow which greatly assisted fuel evaporation after the first engine revolution. Clearly the port restrictions permitted increasing valve overlap, both because dilute combustion was improved and because the port restriction would serve to limit the quantity of exhaust gases blown back into the intake manifold during the overlap period.

Both theory and experiment, therefore, made the advantages of the inventor's variable port restriction invention very clear. Before filing the original case, the inventor already knew to attach the intake port design problem using the methods of fluidics and particularly the Coanda stream wall attachment effect, and had gotten good results. (For a discussion of fluidics, a field where flow control devices for information handling are made using momentum, wall attachment, turbulence decay, and vorticity effect see FLUIDICS, COMPONENTS AND CIRCUITS, by K. Foster and G. A.

Parker, Wiley-Interscience, 1970). During this same time period the inventor and his associates put a variable port restriction modified engine into a Ford Maverick vehicle, under an investor dictated time schedule which was unreasonably fast. Largely because of these time pressures, the vehicle was not well worked out or calibrated. Nonetheless, the vehicle did operate over the EPA CVS-hot cycle with good fuel economy and $NO_x$ emissions approaching 0.4 grams per mile.

However, after filing the original case, the inventor found that the swirl ports he there disclosed were fluid mechanically unstable, and that relatively small and seemingly sensible modifications of port shape greatly reduced the ports' measured effect on the engine combustion process. After doing considerable work in this fluid mechanical area, and trying a number of port shapes, the inventor found that turbulent decay of flow energy into vortex scales too small to be of use for combustion happened very, very quickly with most configurations tested. He further found that some designs that produced relatively high fluidic efficiencies (relatively high conversion of flow energy past the port restriction into forms useful for mixing and combustion) were geometrically unstable to the point that only quite small changes in passage shape produced very large differences in performance. Sometimes the changes amounted to more than a factor of two degradation of flame speeds, with corresponding diminutions in flame stability limits.

These fluidic performance problems were crucial to the practical value of the variable port restriction approach. Even given perfect mixing, adequate performance with the dilute mixtures required for low NO emissions requires enough turbulence at combustion time for a reasonably fast burn. To shift the optimal fuel economy point toward the very lean mixtures required for low NO requires fast burns, because the optimal point is determined by the point when the thermodynamic time losses due to slow combustion outweigh the inherent fuel-air cycle thermodynamic advantages of further enleanment (or further dilution). The time losses due to slow combustion increase almost exactly as the 1.9 power of the combustion duration. Fast combustion is needed, and flame speeds are proportional to the turbulence intensity present at the time of combustion. (The relation between flame speed and turbulence has been strongly suspected in IC engines for at least fifty years, and was recently confirmed experimentally by David Lancaster, Roger Krieger, Spencer Sorenson, and William Hull, in "Effects of Turbulence on Spark-Ignition Engine Combustion", SAE paper 760160). Details of the fluid mechanics required to get high turbulence at ignition time will be discussed below. However, the value of the fluidic ports clearly hinges on the amount of mixing and turbulence which can be gotten per unit pumping work across the variable port restriction.

In addition to prototype fluidic efficiency, the producibility of the port geometry is a critical commercial question. Engines are mass produced, and if port passage shapes must be controlled too tightly, conventional mass production techniques for the engine heads may not be applicable. If the flow becomes unstable after the deposition of thin deposits, the design is also impractical. It is also clear that variable port geometries involving many parts, close tolerances, or complex control linkages in the ports are undesirable.

For these reasons, the inventor spent the bulk of the year 1976 at the Internal Combustion Engine Research Laboratory of the Department of Mechanical Engineering at The University of Wisconsin, working to develop a fluidically efficient variable port geometry which was also geometrically robust and structurally simple. He attacked the problem using steady state flow setups which investigated the flow using hot wire aenemometry and pitot tubes. The work yielded significant understanding of the fluid mechanics inside fluid ports and inside engine combustion chambers, and produced several fluidic port designs with excellent and robust performance.

Because of the very complex fluid mechanics involved, men of authority in automotive engineering refused to concede the worth of the fluidic ports on the basis of these steady flow aerodynamic tests, and insisted that the only way the worth of the fluidic ports could ever be determined was via extensive and carefully conducted engine tests.

Partly because of the potential commercial worth of the fluidic ports, and partially because the inventor was maintaining that wider flame limits and lower emissions were possible from homogeneous engine combustion than were considered reasonable, the engine test setup required to validate the performance of the fluidic ports was built with unusual care, and the fuel metering, air metering, and torque reading apparatus were constructed to significantly higher standards of accuracy than are commonly required for engine research. The inventor's test setup was very carefully checked not only by members of the Internal Combustion Engine Research Lab but also by outside authorities in automotive engineering, and was deemed to be accurate. Tests were conducted under the very close supervision of Professors P. S. Myers and O. A. Uyehara, who were most careful to see that the inventor did not draw overoptimistic or otherwise unwarranted conclusions from his work. Initially, Myers, Uyehara, and other ranking automotive engineers were by no means convinced that the good results the inventor expected were possible. Myers and Uyehara have outstanding reputations in automotive engineering and they were very well oriented with respect to the inventor's fluidic port results. These men did not consider it by any means obvious, certain, or self-evident that the fluidic steady state performance of the inventor's ports would be produced under the dynamic conditions characteristic of engine operation, nor did they find it self-evident that proper fluidic performance of the ports would permit the efficient and stable ultralean combustion expected by the inventor. These men doubted that the very dilute mixtures required for ultralow $NO_x$ with homogeneous combination could be burned with adequate stability and speed, no matter how tight mixing statistics were and no matter how well controlled turbulence levels were. On the basis of the evidence then available, in light of traditional automotive engineering standards of evidence and logic, these doubts were entirely rational.

Automotive engineering requires, for clear commercial reasons, very high standards of proof, particularly with respect to technology concerned with so sensitive a subject as emissions. The present application is somewhat detailed and lengthy because it contains the information required to teach skilled automotive engineers, who are not commonly acquainted with fluidics and have difficulty visualizing and thinking about structured flows, how to understand, make, and use fluidic ports in combination with lean mixtures to produce very efficient and ultralow $NO_x$ output engines with improved peak power and excellent driveability. Also, the application is lengthy because it contains the detailed experimental results which the automotive engineering profession deems necessary (if not, perhaps, sufficient) to establish the technical worth of the inventor's ultralean fluidic port invention. In addition to the inventor's own experimental work, other experimental work is discussed in order to explain the invention's performance and more clearly orient the invention in the context of prior automotive engineering knowledge.

IN THE DRAWINGS

FIG. 3 shows the effect of equivalence ratio and EGR on NO production for a homogeneous charge engine.

Figure 6:
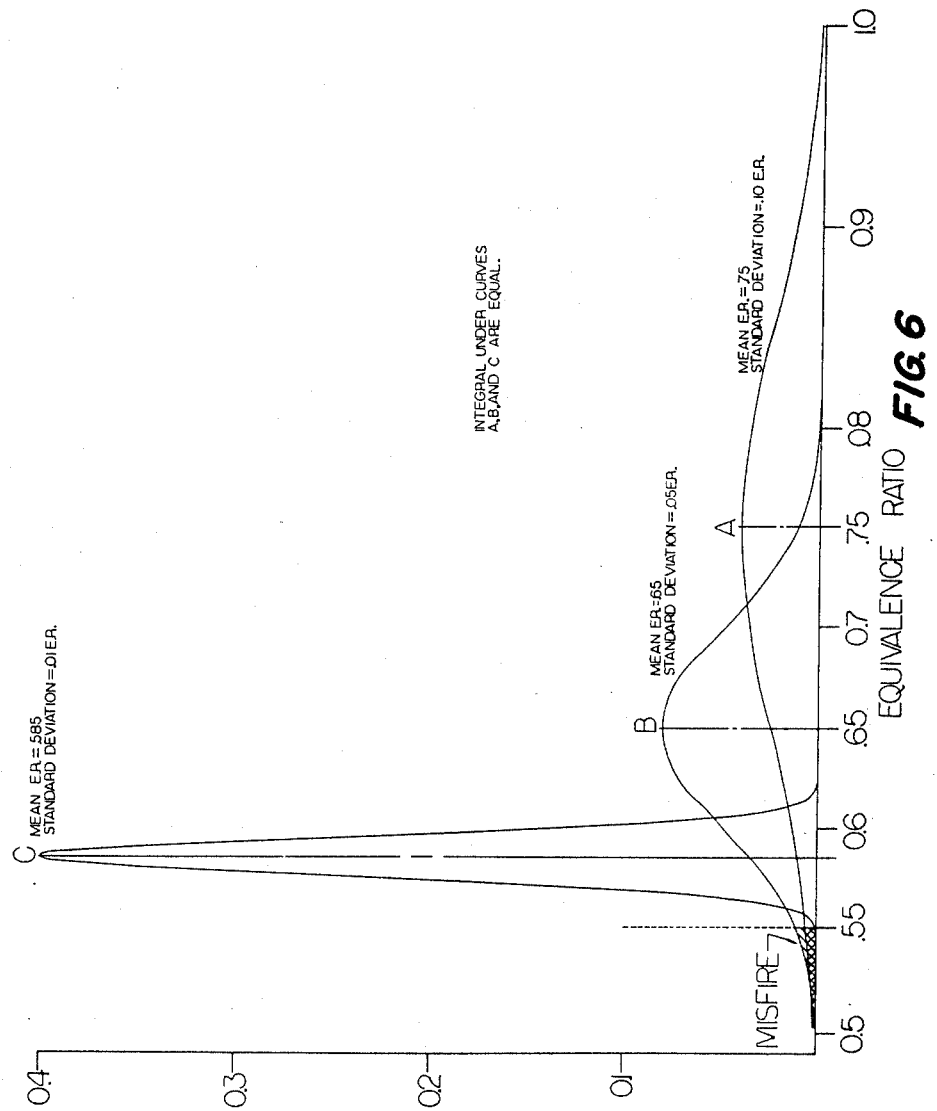

FIG. 6 gives a graphical explanation of how improved mixing within the combustion chamber can widen the equivalence ratio or dilution limits which permit stable combustion inside an engine.

Figure 7:
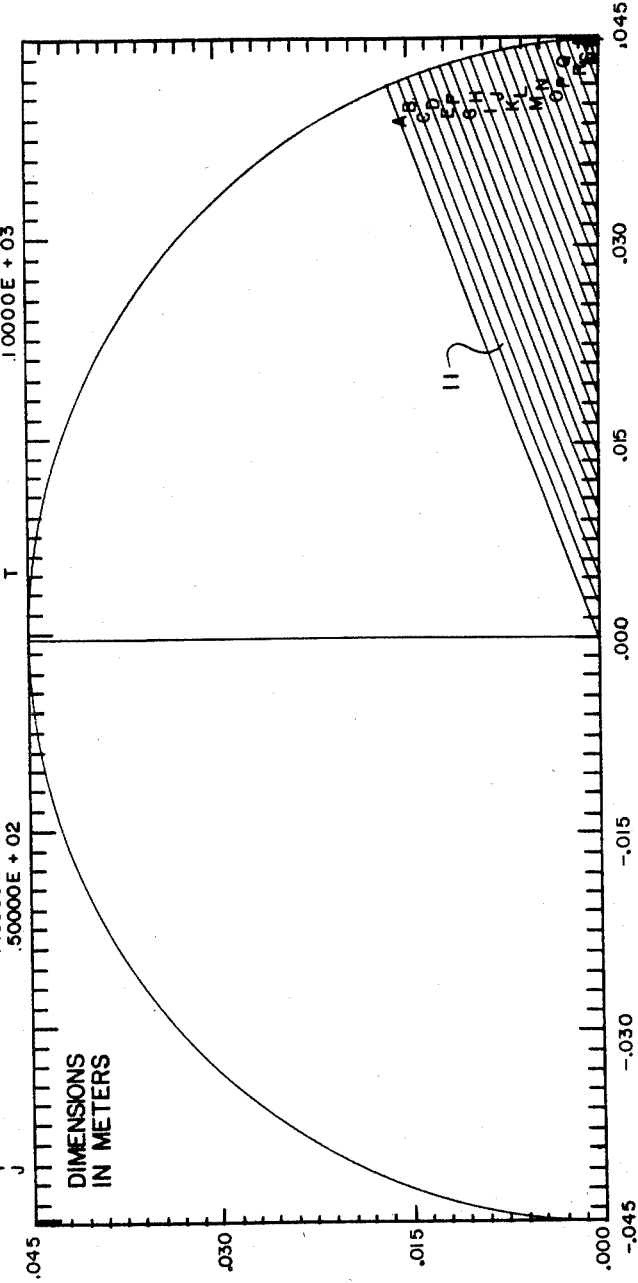
Figure 8:
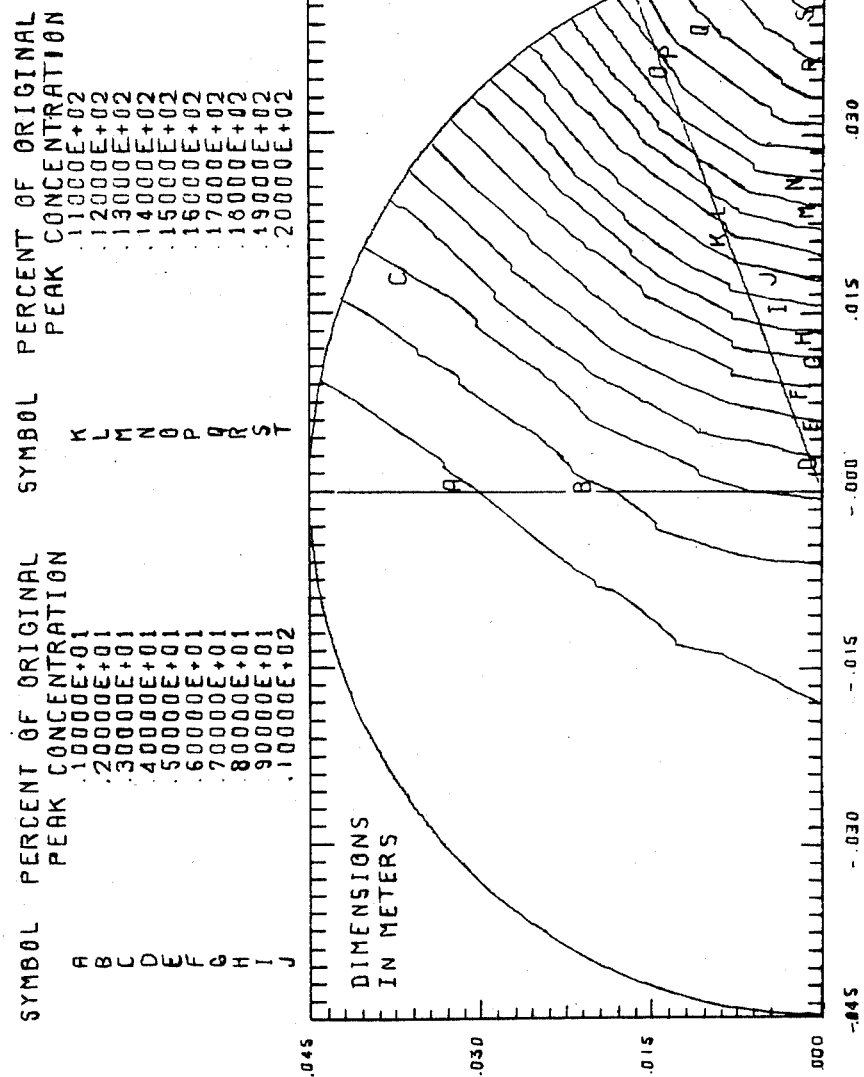
Figure 9:
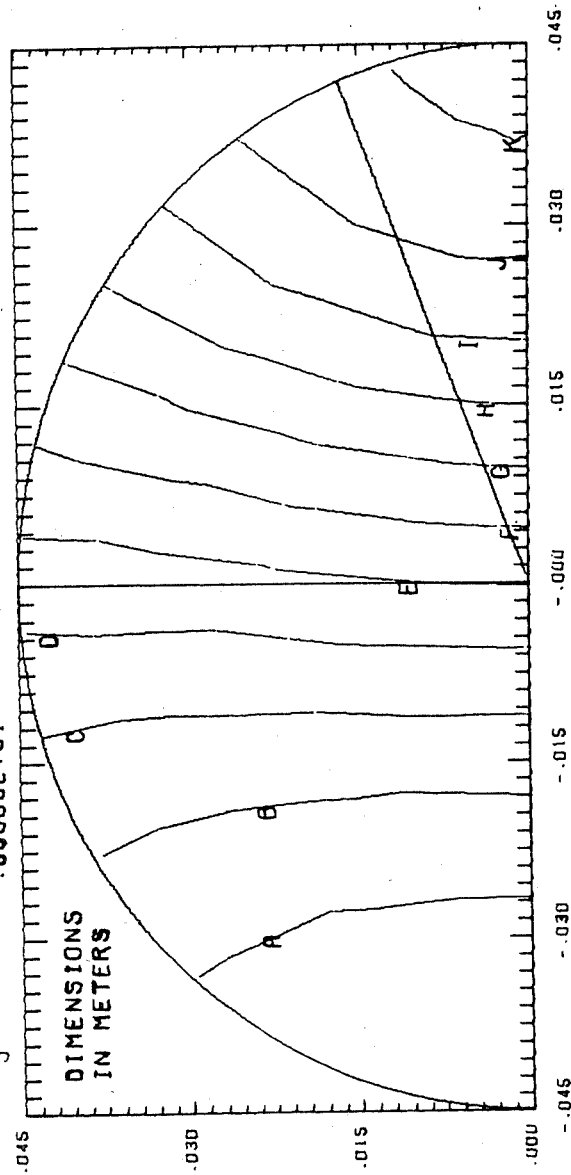

FIGS. 7, 8, and 9 are computer generated printouts of calculations showing the effect of ordinary turbulence on mixing in engine cylinders, to show that turbulence diffusion per se is relatively slow in engines.

FIGS. 10, 11, 12, 13, 14, 15, and 16 show that mixing, in a well defined statistical sense, can occur in totally laminar flows in the absence of diffusion, producing a much more rapid mixing than would be possible from turbulence alone.

Figure 10:
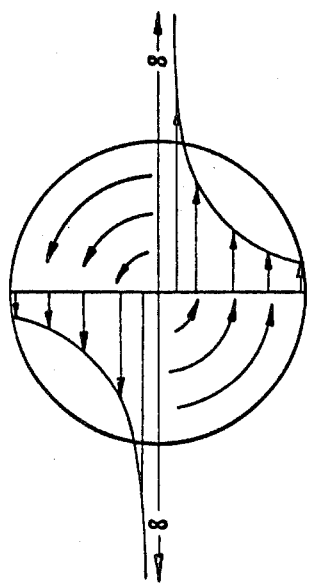
Figure 11:
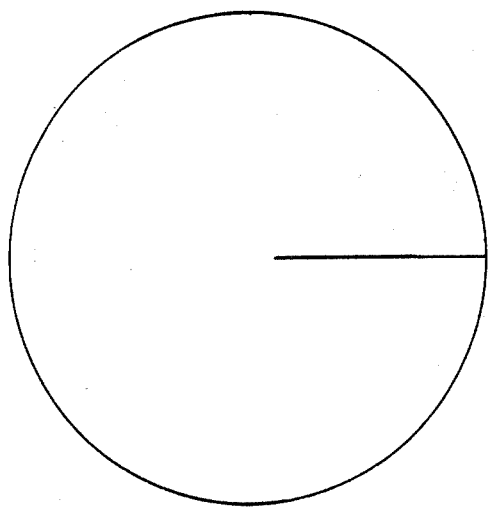
Figure 12:
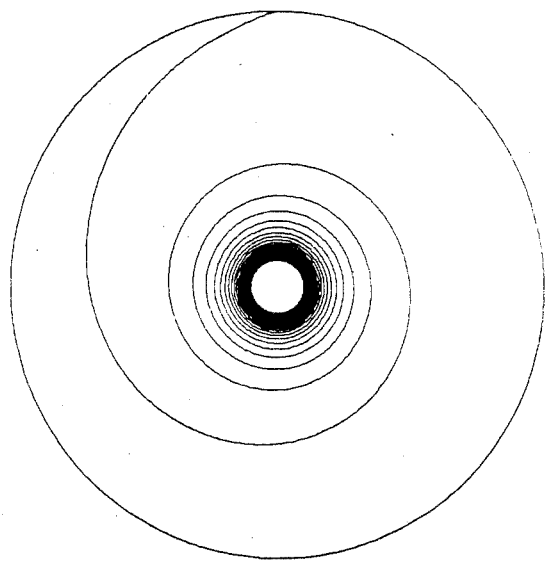
Figure 13:
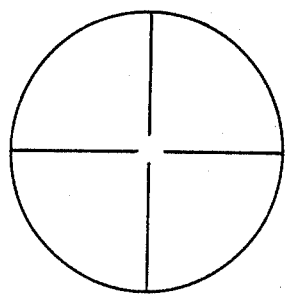

FIG. 10 shows the velocity distribution about the radius of an irrotational flow vortex such as may occur in an engine cylinder. FIG. 11 shows the initial condition for mixant introduction which is transformed by the vortex into FIG. 12. FIG. 13 (analogous to FIG. 11) shows the initial condition of mixant introduction which is transformed by the vortex flow into the pattern of FIG. 14.

Figure 15:
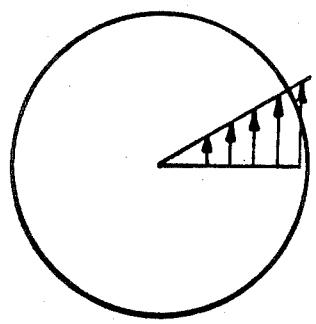

FIG. 15 shows the velocity distribution for a rigid body fluid rotation to show a flow structure which does not mix.

Figure 16:
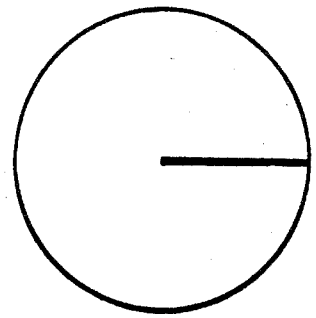

FIG. 16, which is analogous to FIG. 11, shows the initial mixant introduction or the mixant pattern after any integral number of vortex revolutions, to show the drastic difference in mixing between an irrotational and a rigid body vortex.

FIGS. 17 to 25, and FIG. 27 show test set-ups and data from the literature to illustrate structured flow in actual engines.

Figure 17:
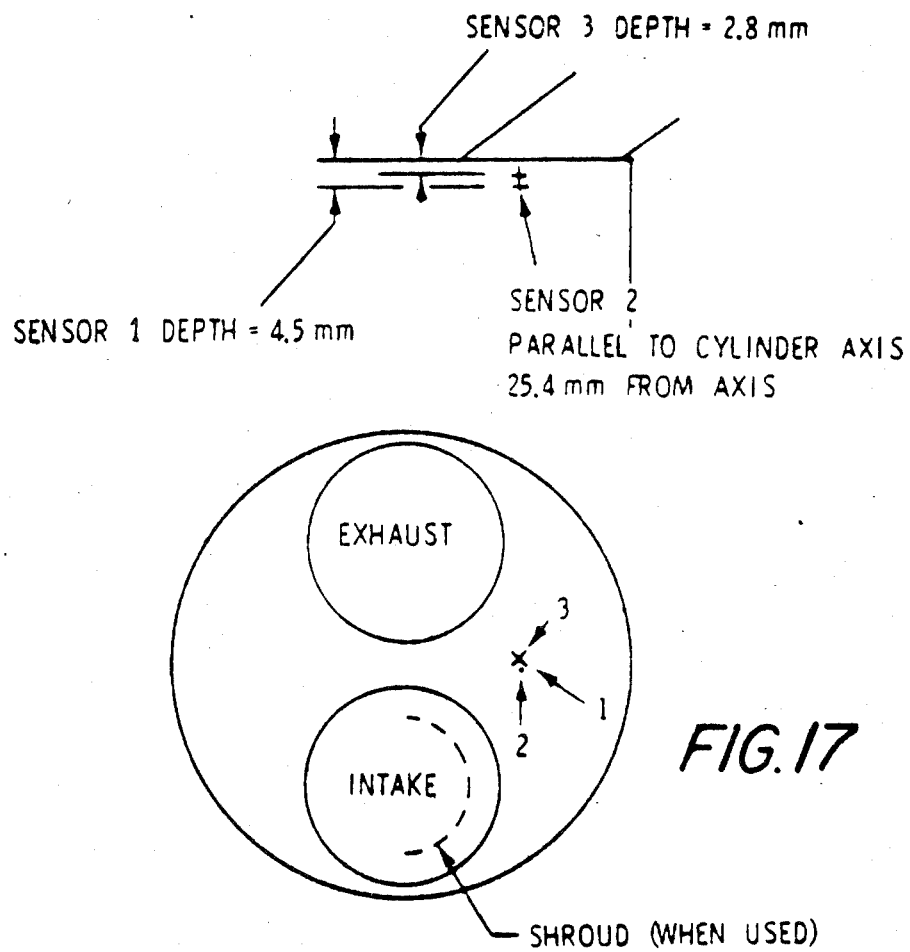

FIG. 17 shows the layout of hot wire anemometer sensors used in the experiments described in FIGS. 18A, 18B, 18C, 19, 20, FIG. 21, FIG. 22, and FIG. 23.

Figure 18A:
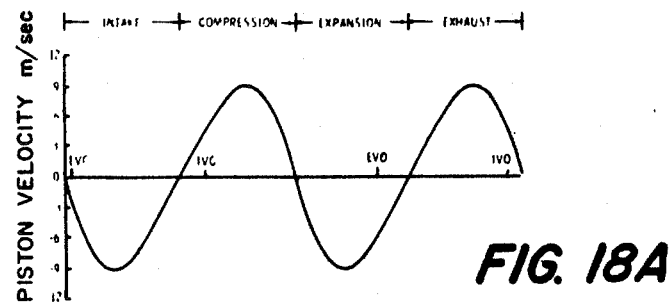
Figure 18B:
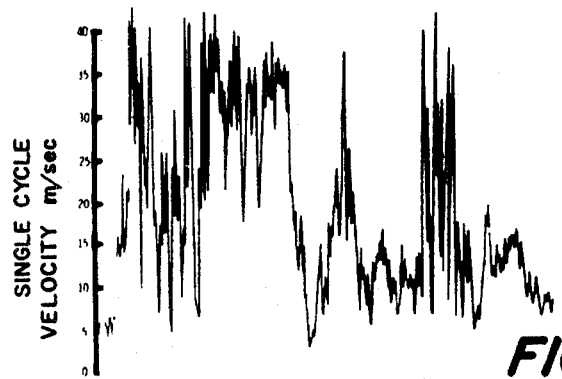
Figure 18C:
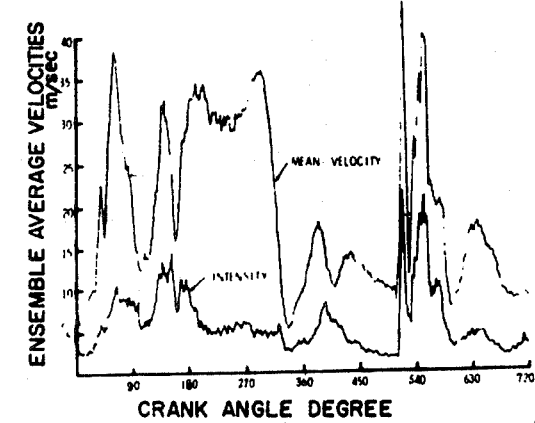

FIGS. 18A, 18B, and 18C are three plots against the same crank angle ordinate illustrating the resolution of flow motion into the mean velocity and turbulent intensity components for the set-up of FIG. 17.

Figure 19:
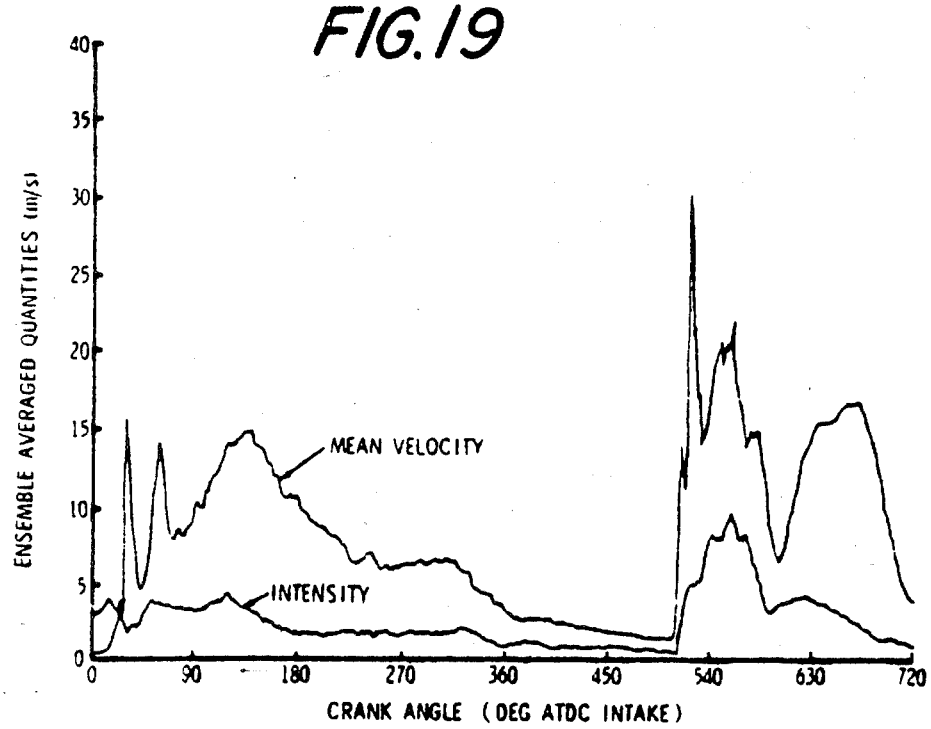

FIG. 19 is analogous to FIG. 18C, when the engine is operated without a shrouded valve.

Figure 20:
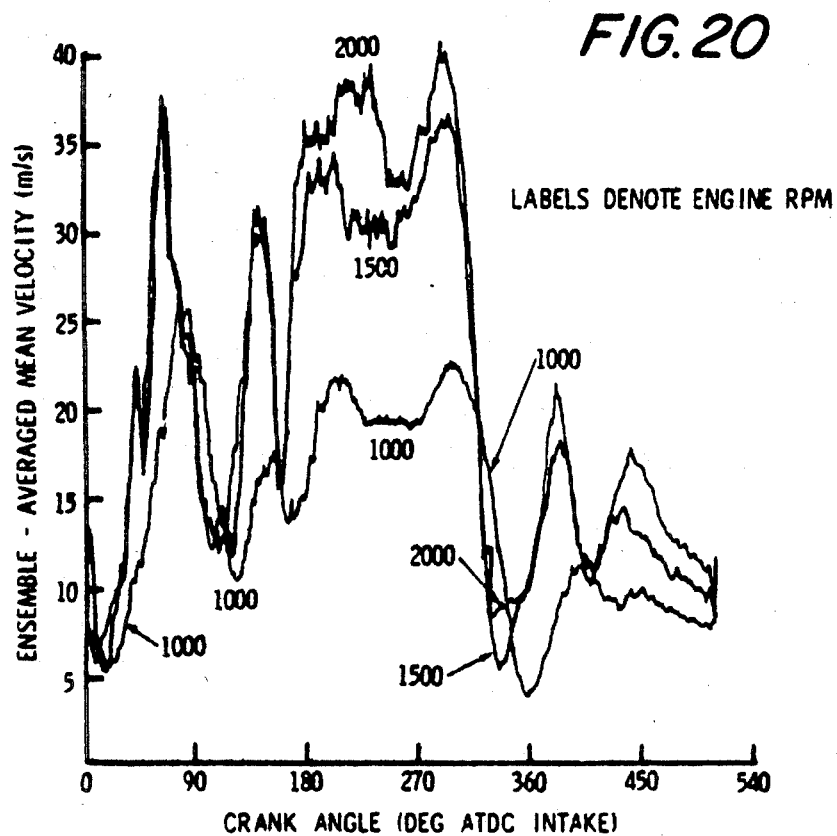

FIG. 20 shows the means flow velocity pattern for the set-up of FIGS. 17 and 18 for a number of engine speeds with the shrouded valve.

Figure 21:
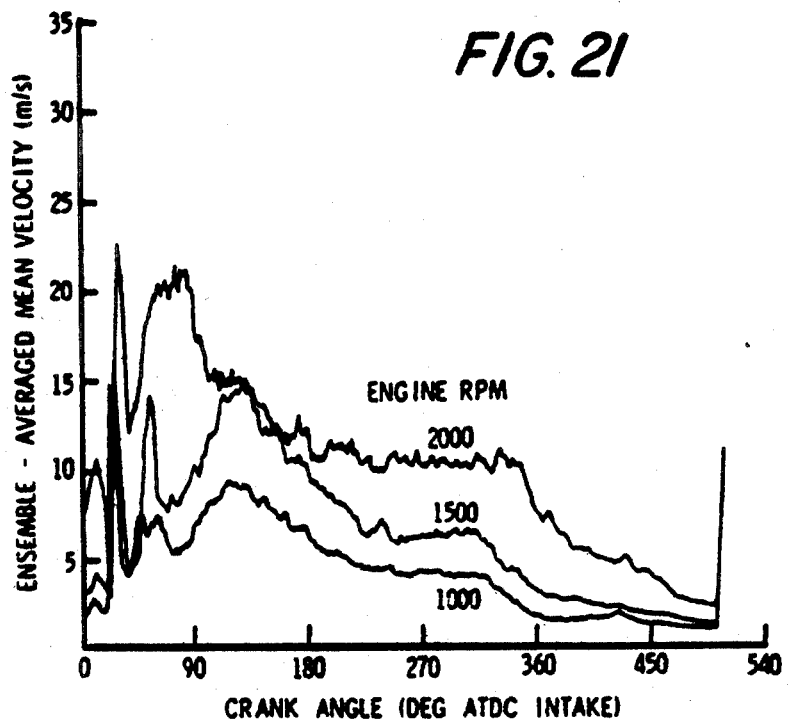
Figure 22:
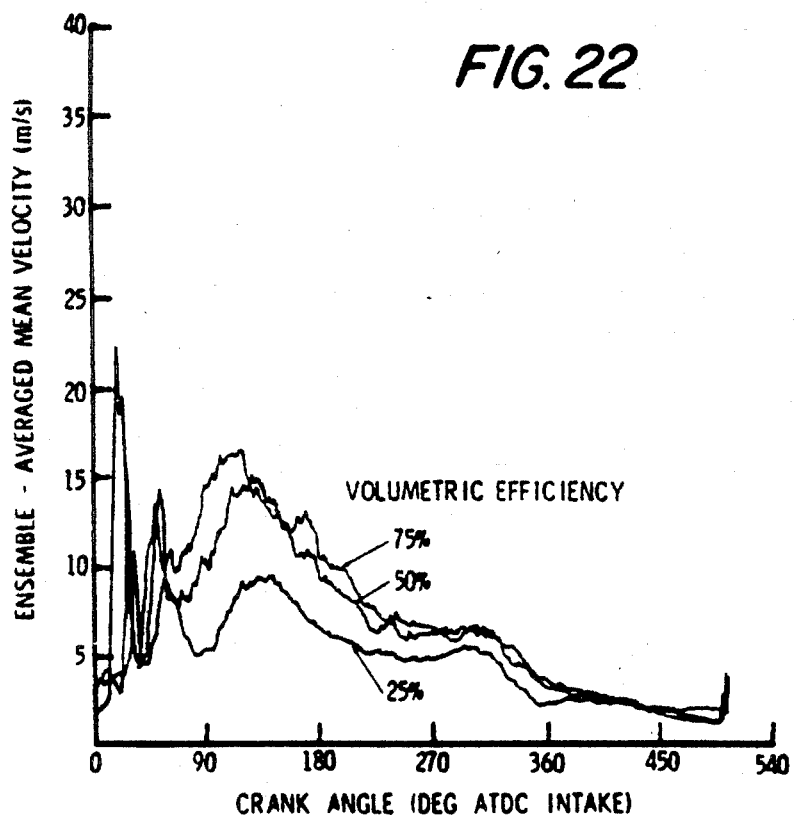

FIG. 21 is analogous to FIG. 20, and shows data for the unshrouded intake valve case. FIG. 22 also plots unshrouded valve data, with variation in engine volumetric efficiency for a fixed r.p.m.

Figure 23:
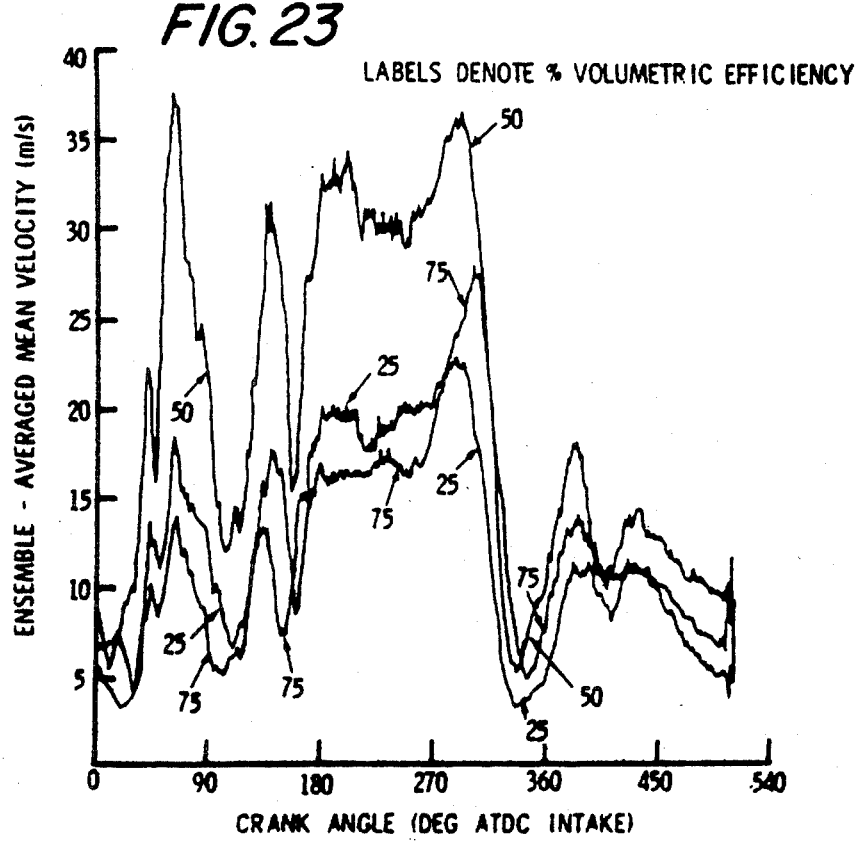

FIG. 23 shows the effect of variation in volumetric efficiency at a set r.p.m. for the shrouded valve case.

Figure 24:
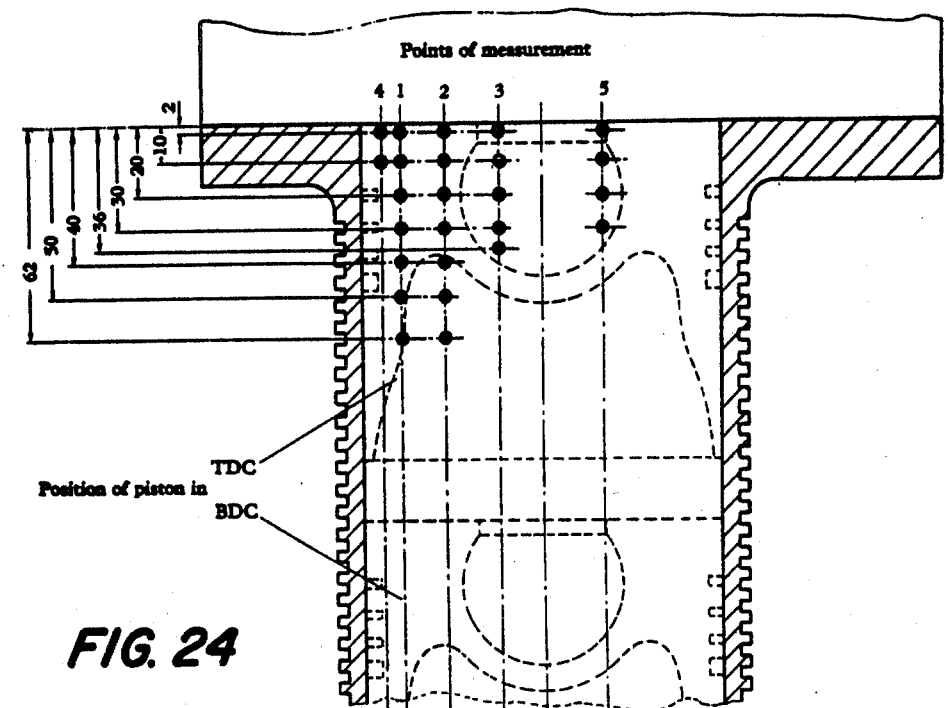
Figure 25:
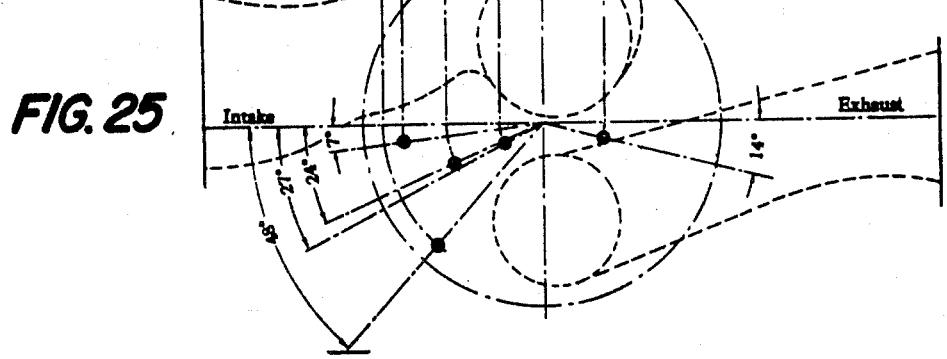
Figure 27:
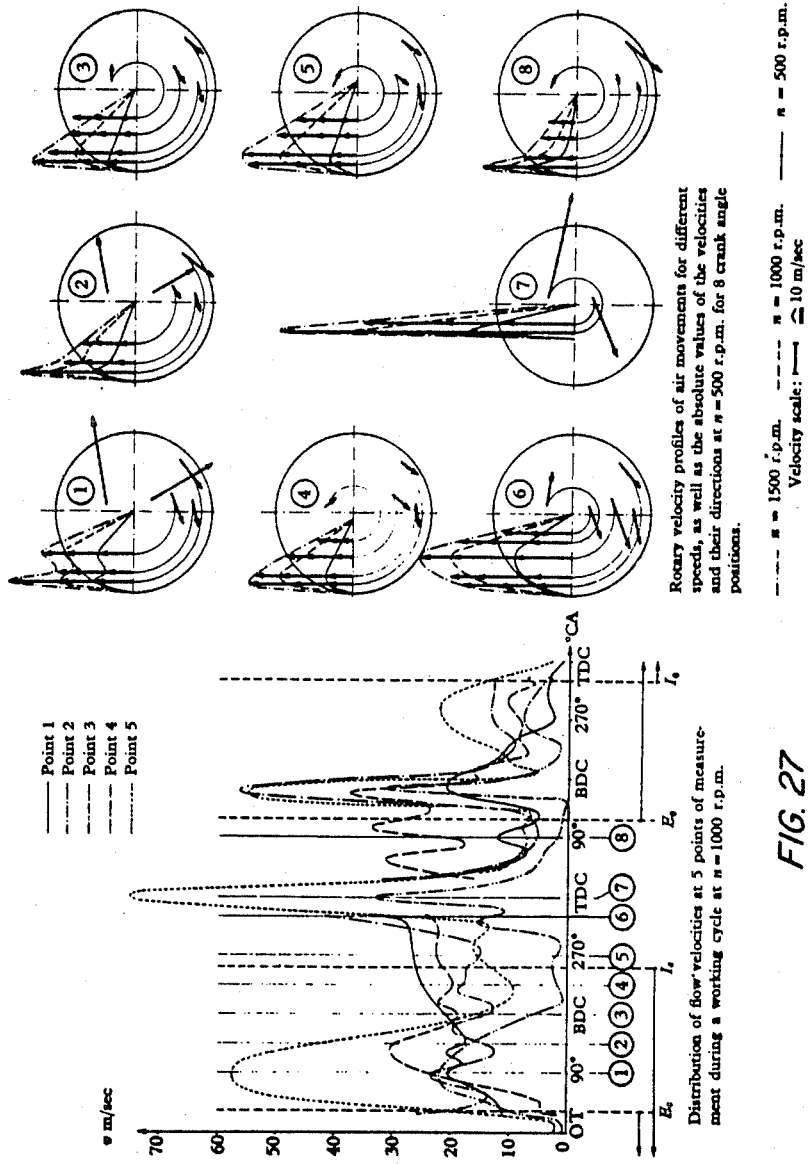

FIGS. 24 and 25 show the engine set-up and hot wire set-up for another engine, and show the set-up which generated the data of FIG. 27.

FIGS. 26A, 26B, and 26C, and 26D illustrate a number of important fluidic effects in a compact way, by showing the function of Parker and Jones' cusp half adder binary fluidic device. FIG. 26A shows the device with its flow pattern in the A=0, B=1 state; FIG. 26B shows the device with its flow pattern in the A=1, B=0 state; and FIG. 26C shows the device in its A=1, B=1 (carry) state. FIG. 26D shows the passage shape of the half adder without flow streamlines to emphasize the critical dimensions relevant to this device.

FIG. 27 is flow data generated with the set-up of FIGS. 24 and 25 showing the rigid body rotation flow pattern of the engine to illustrate that structured flows which mix only slowly are possible in engines.

FIG. 27A is a variable flow restriction passage set up to illustrate the principle of "set-back." FIG. 27B shows the disruption of a Coanda flow which occurs with a "step-up."

Figure 28:

FIG. 28 is a photograph of the piston top of the engine on which the inventor conducted numerous tests, when the engine had oil leaking past the rings. The deposit pattern of the photograph demonstrates conclusively that an irrotational vortex was present in the engine of the present invention.

Figure 29:
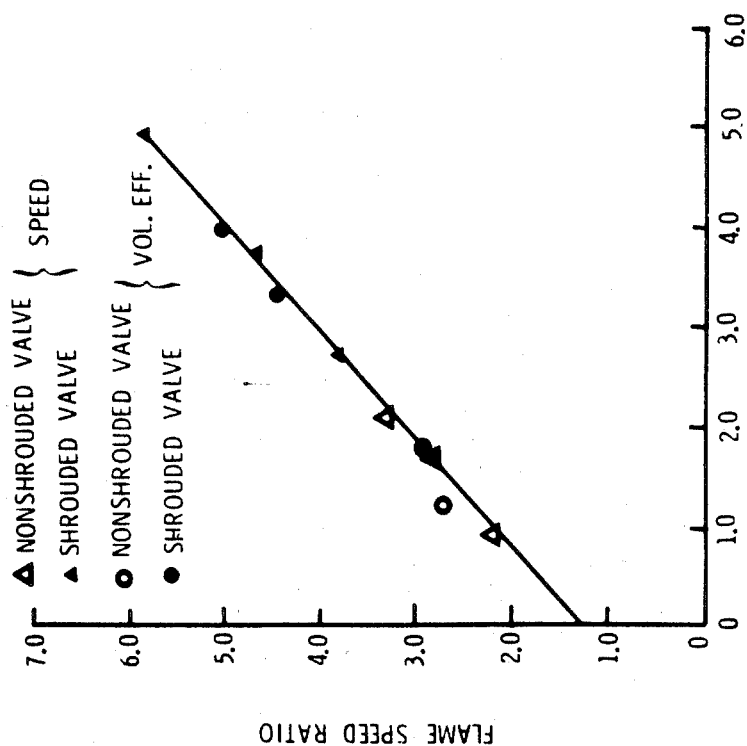
Figure 30:
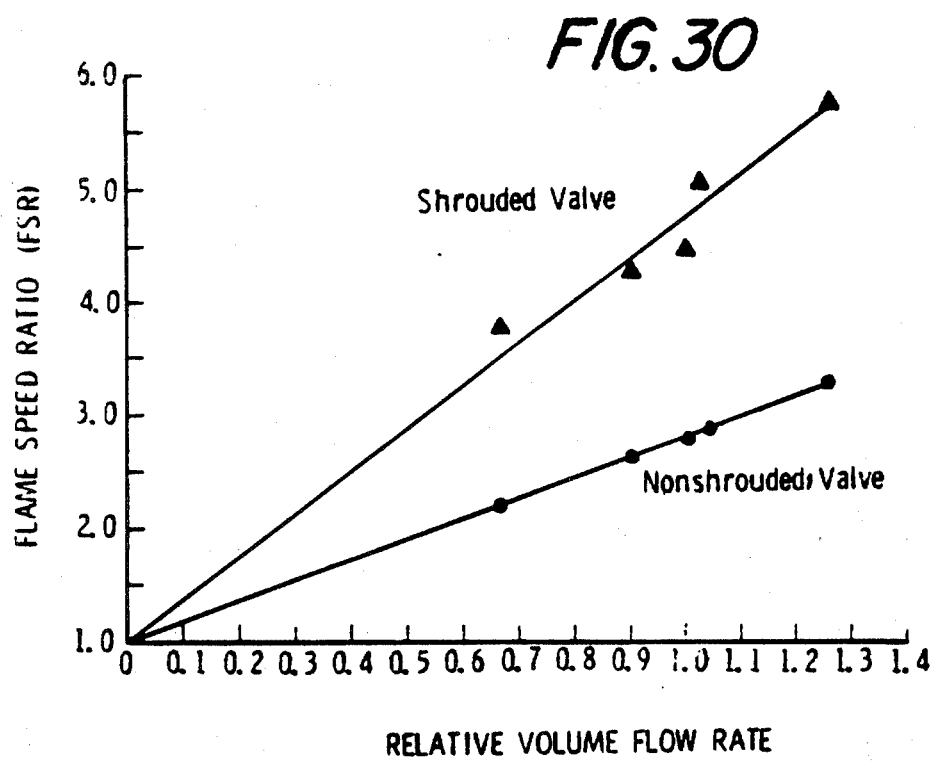

FIGS. 29 and 30 are data from the literature to illustrate the effect of turbulence on the turbulent to laminar flame speed ratio. FIG. 29 plots experimental data for the turbulent to laminar flame speed ratio for an engine versus measured root mean squared turbulent fluctuating velocity.

FIG. 30 shows the correlation found between the turbulent to laminar flame speed ratio and the inlet flow velocity (which was proportional to r.p.m.) to illustrate the effect of geometry on flame speed.

Figure 31:
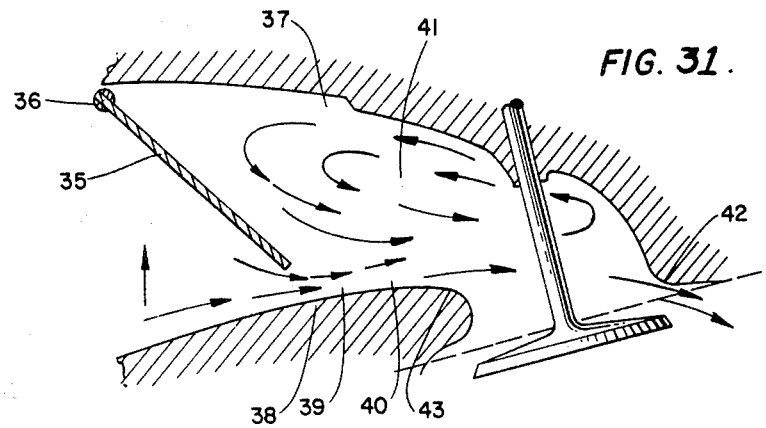

FIG. 31 shows a side view of a variable restriction port with an inwardly opening flap restriction which opens towards the floor of the intake port.

Figure 32:
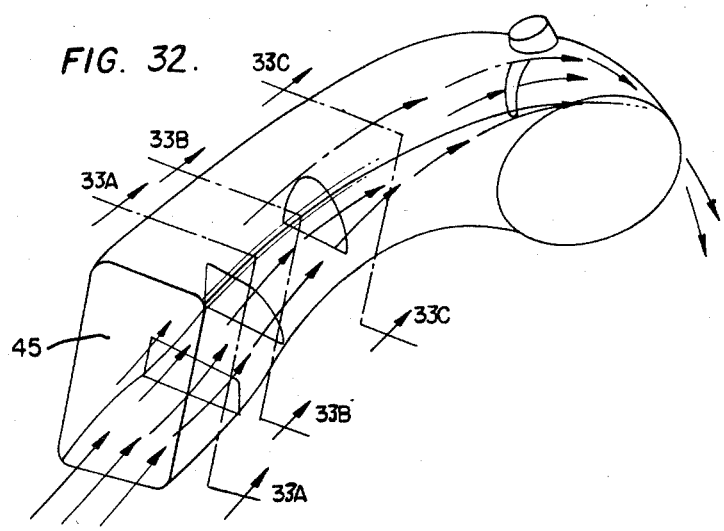

FIG. 32 is a perspective cut away of a rectangular port passage with a bottom opening flap, so that the high velocity flow will attach to the floor of the passage and flow into a corner of the flow passage for smooth delivery across the intake valve seat surface.

Figure 33A:
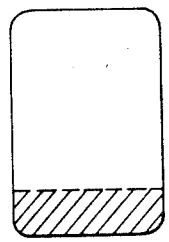
Figure 33B:
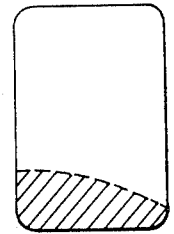
Figure 33C:
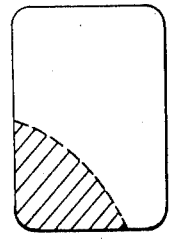

FIGS. 33A, 33B, and 33C show section views through the flow passage of FIG. 32.

FIGS. 34A, 34B, and 34C show three views of a fluidically efficient port on which the inventor ran a number of experiments. On FIG. 34A, vectors around the valve face are denoted showing the fractions of the isotropic flow velocity past the variable restriction delivered in coherent form into the cylinder passage.

Figure 35:
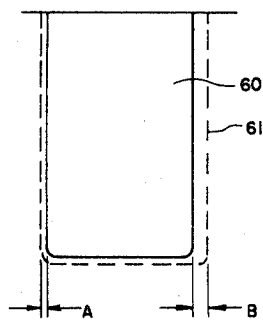

FIGS. 35, 36A, 36B, 37, and 38 are each drawings for a system having outwardly swinging flaps and where the outwardly swinging flaps are part of a separate intake manifold assembly which mounts to the intake port of the cylinder head. FIG. 35 shows how the flow can be biased to attach to a specific port corner by arranging the set-back past the restriction asymmetrically.

Figure 36A:
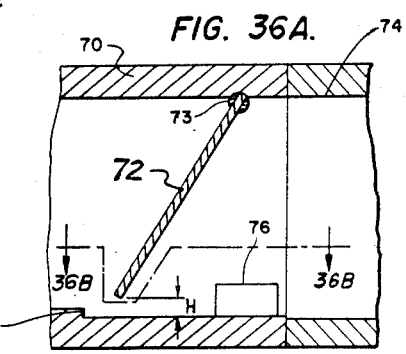
Figure 36B:
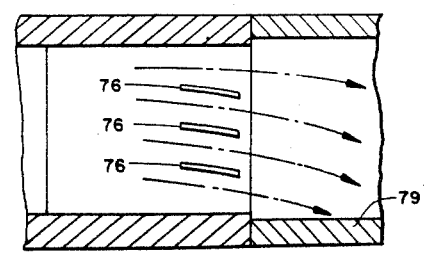

FIGS. 36A and 36B illustrate the use of deflectors to deflect the wall attached stream from the variable restriction towards the desired intake port corner.

Figures 37, 38:
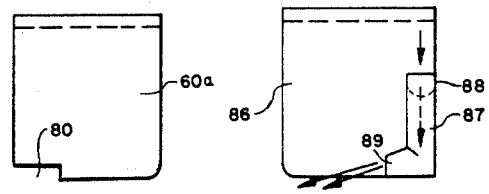

FIG. 37 shows another simple way of biasing the flow towards a specific corner of the inlet port.

FIG. 38 illustrates another means of deflecting the flow towards a specified port corner.

Figure 39:
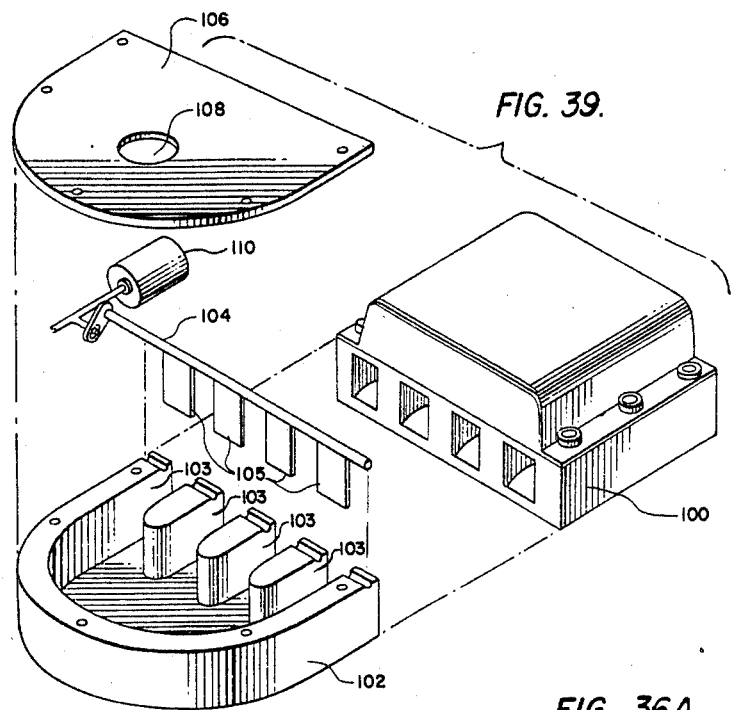

FIG. 39 illustrates the manner in which the flaps may be integrated into an integral intake manifold assembly.

Figure 40:
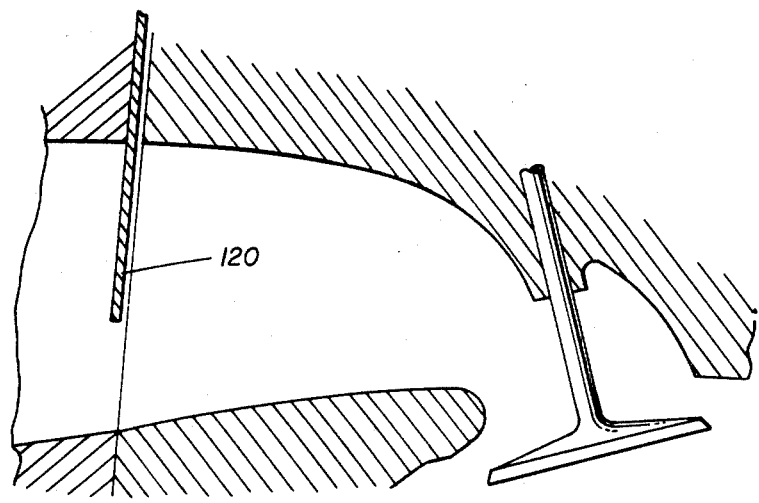

FIG. 40 illustrates a variable restriction arrangement having a sliding vane to control the flow.

Figure 41:
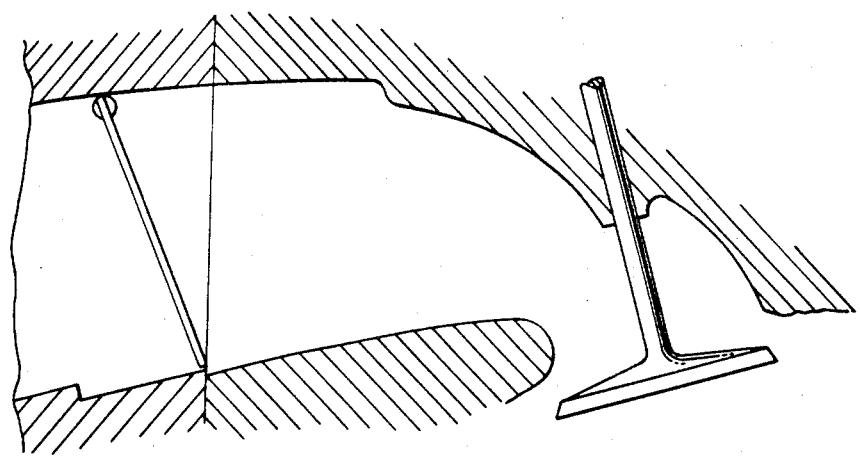

FIG. 41 illustrates a variable restriction flap which swings in towards the intake port.

Figure 42:
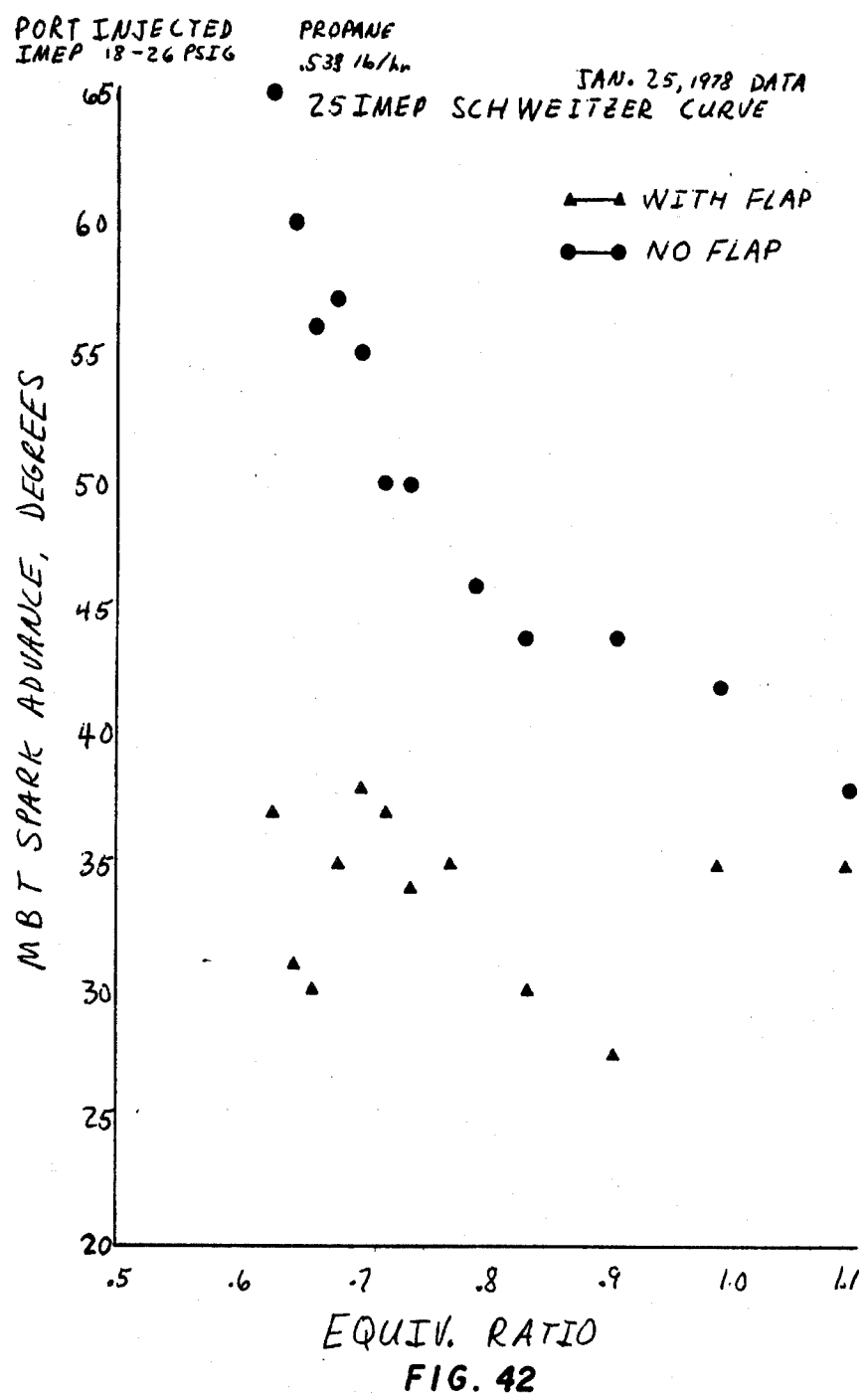

In FIG. 42 the significant improvement in flame speed with the variable restriction is clearly seen.

Figure 43:
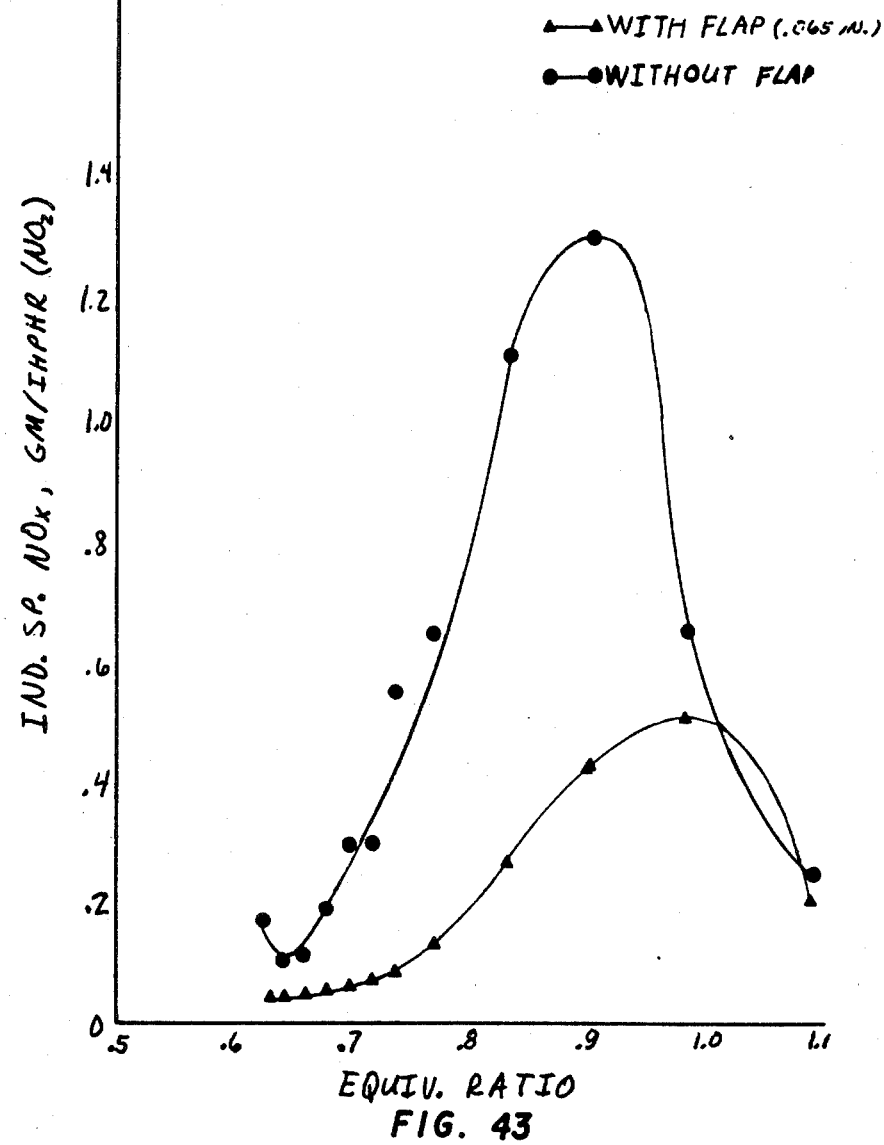

In FIG. 43 the effect of the variable restriction on mixing results in significant reduction in $No_x$ outputs at all equivalence ratios.

Figure 44:
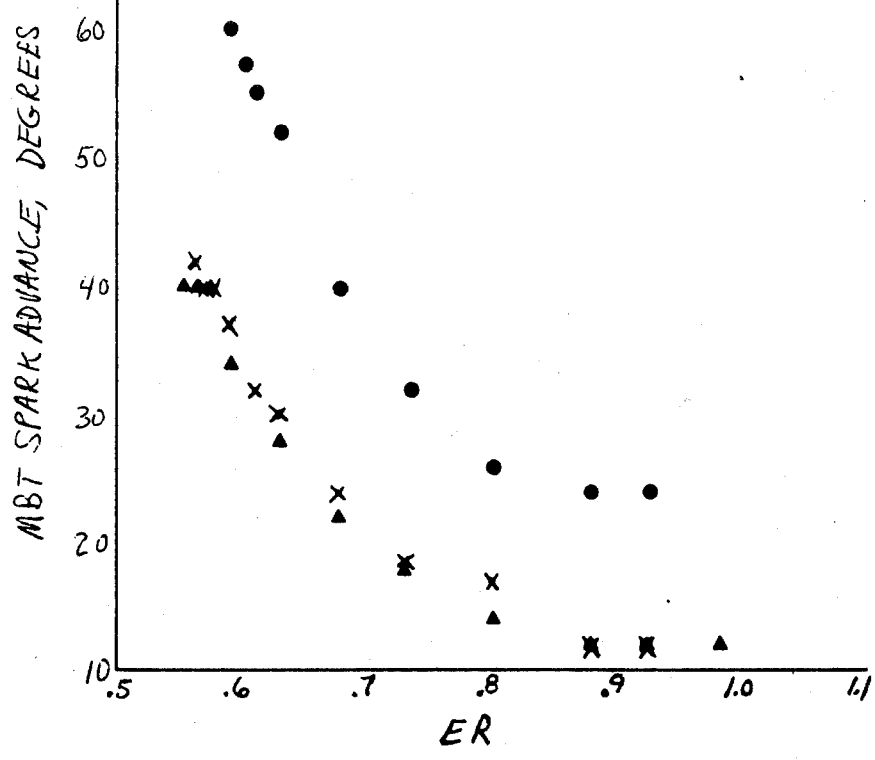
Figure 60:
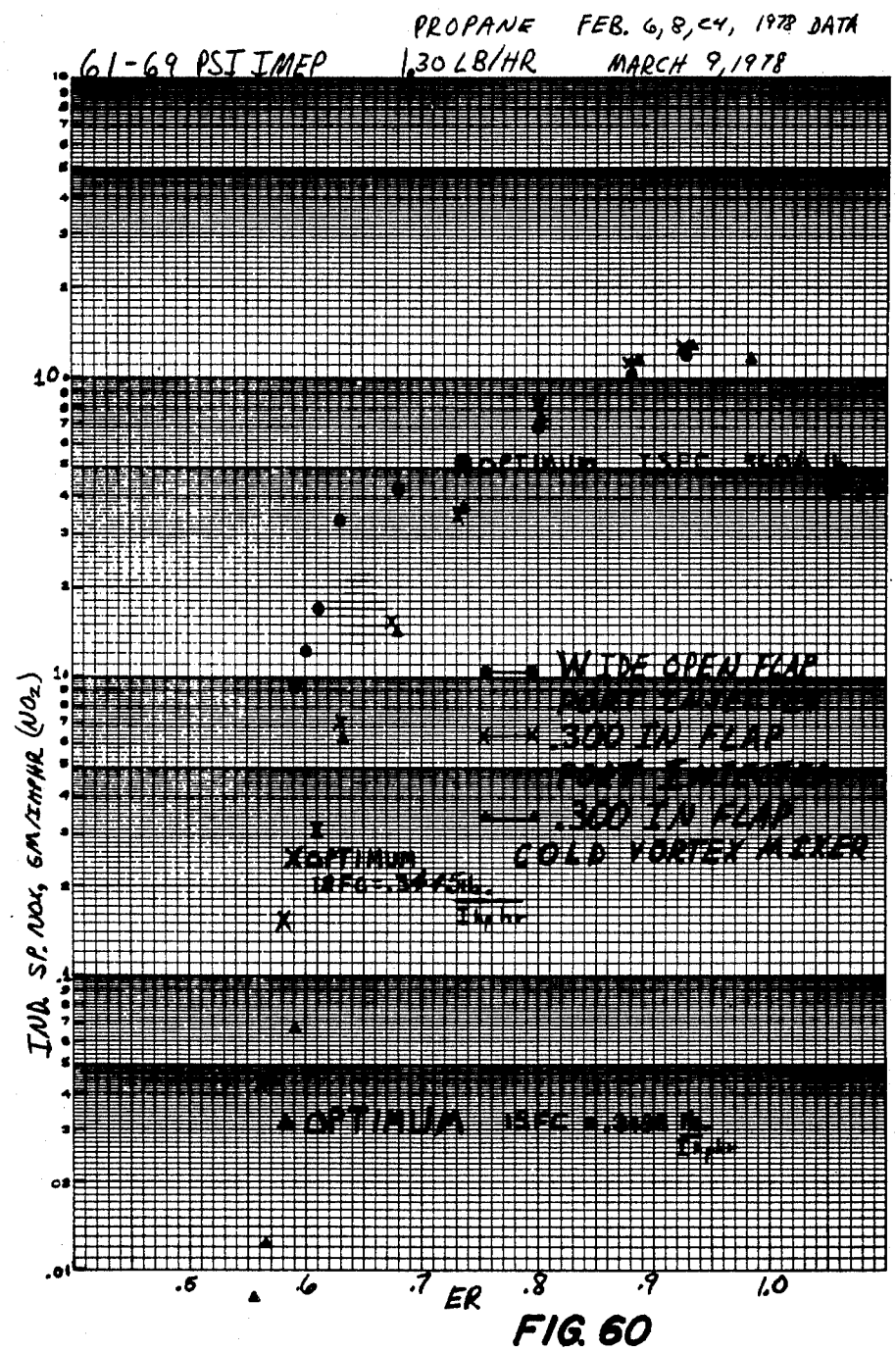

FIG. 44 shows the MBT spark timings which correspond to the data points of FIG. 60.

Figure 45:
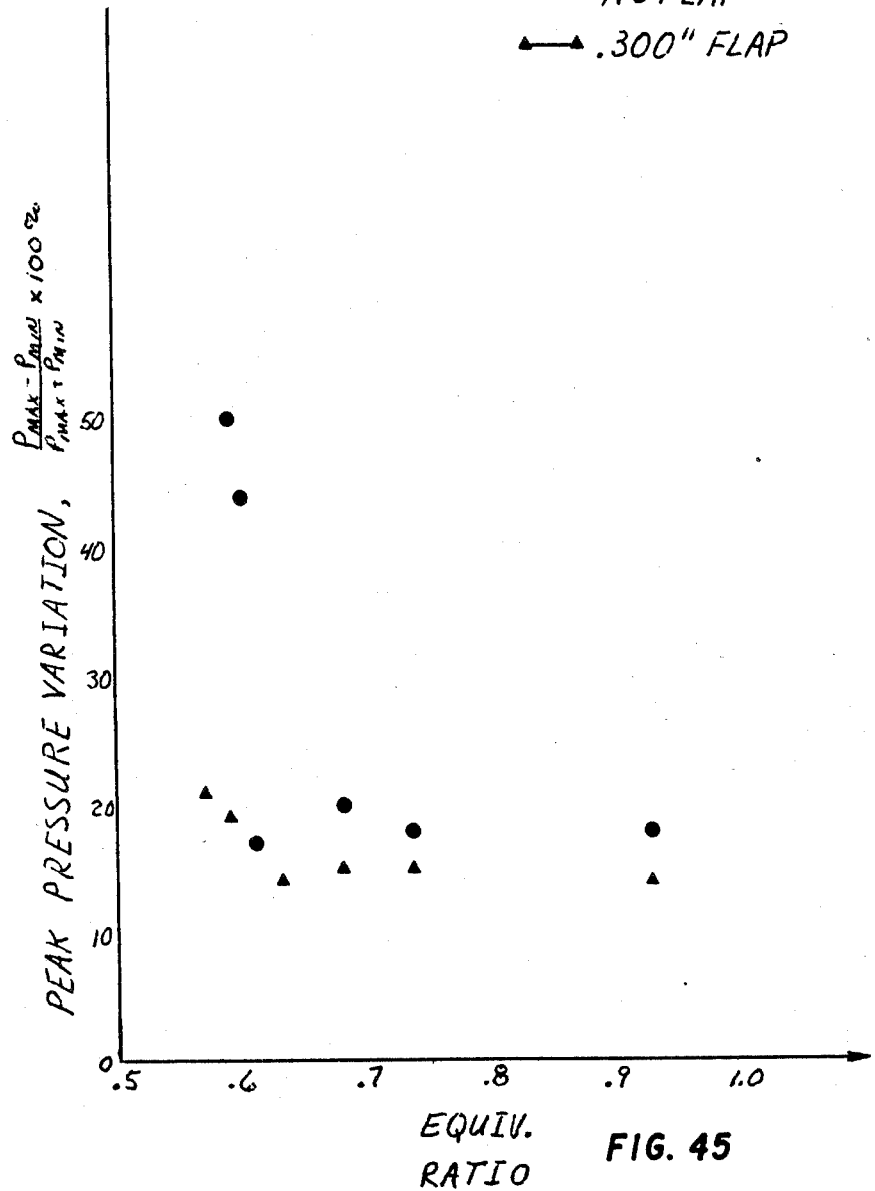

FIG. 45 shows peak pressure variation measured from oscilloscope photographs for the data also plotted in FIG. 60.

Figure 46:
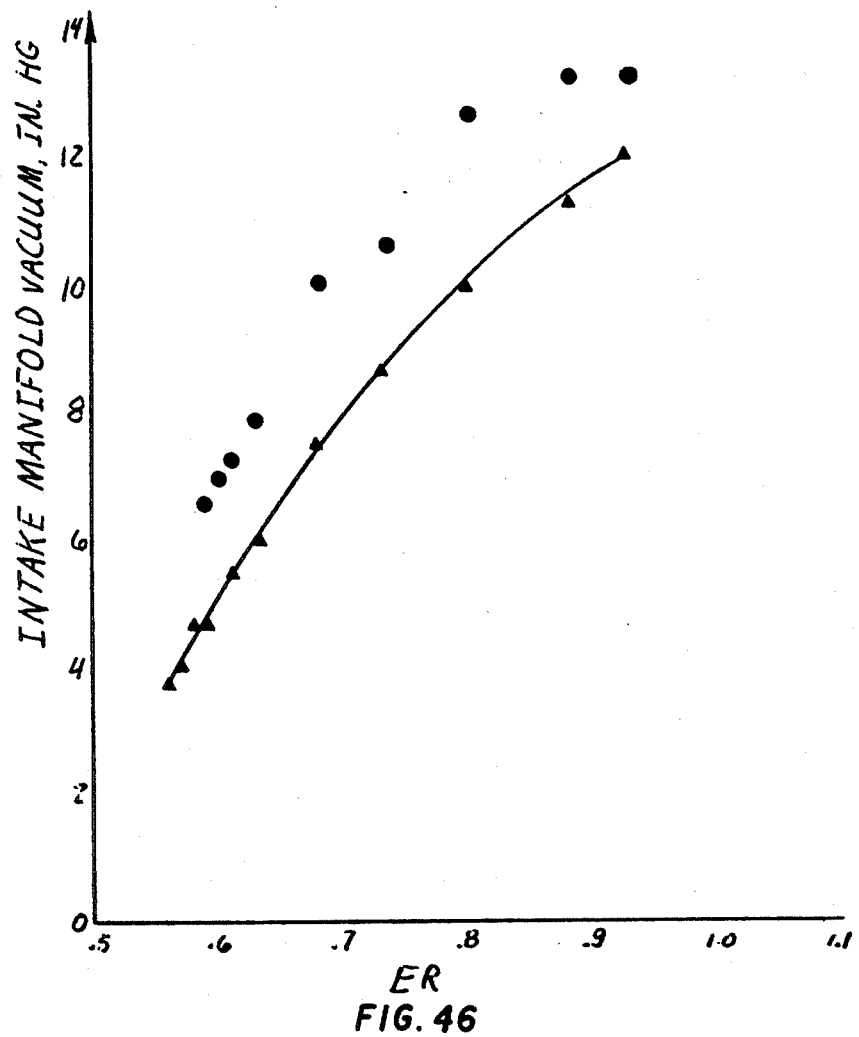

FIG. 46 plots intake manifold vacuum in inches of mercury versus equivalence ratio for the run also plotted in FIG. 60.

Figure 47:
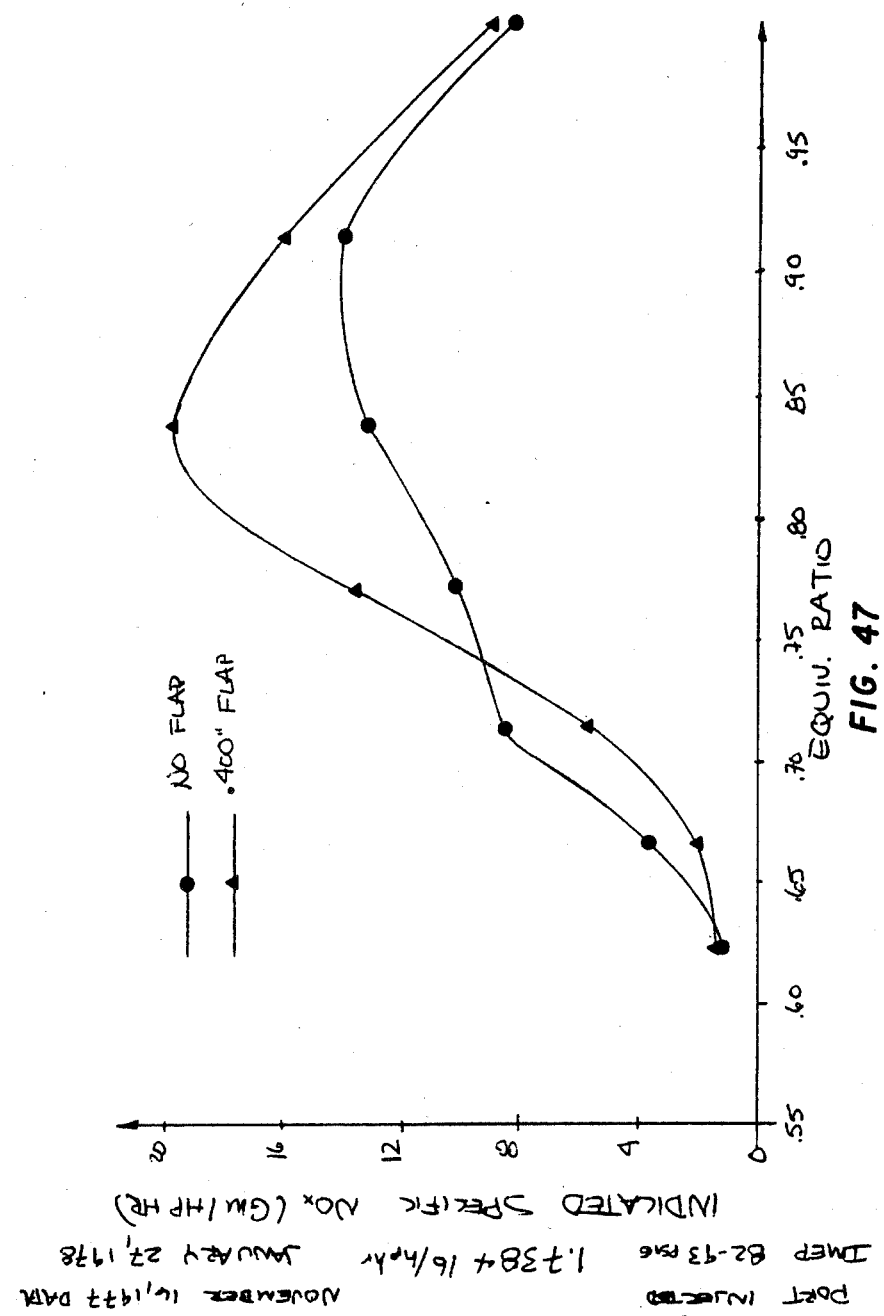

FIG. 47 plots indicated specific $NO_x$ versus equivalence ratio for load condition higher than any which occurs in the Blumberg correlation.

Figure 48:
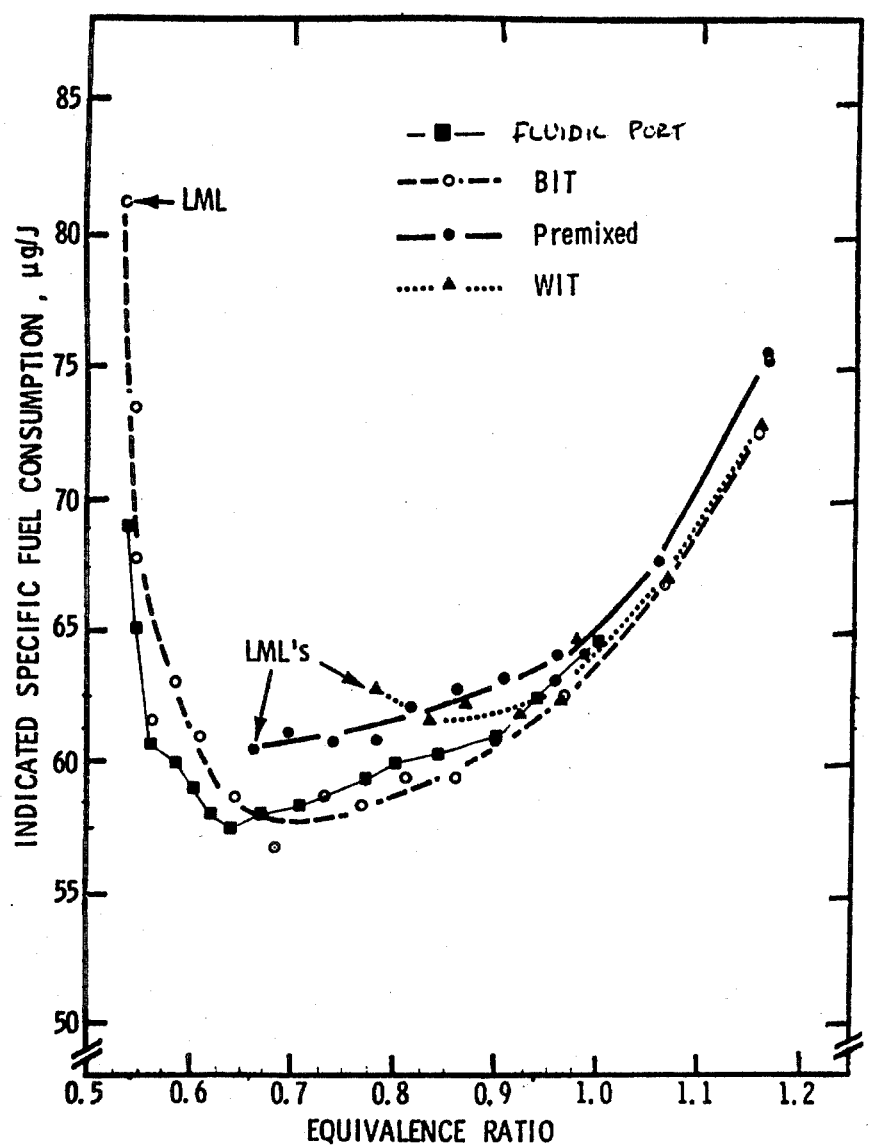
Figure 49:
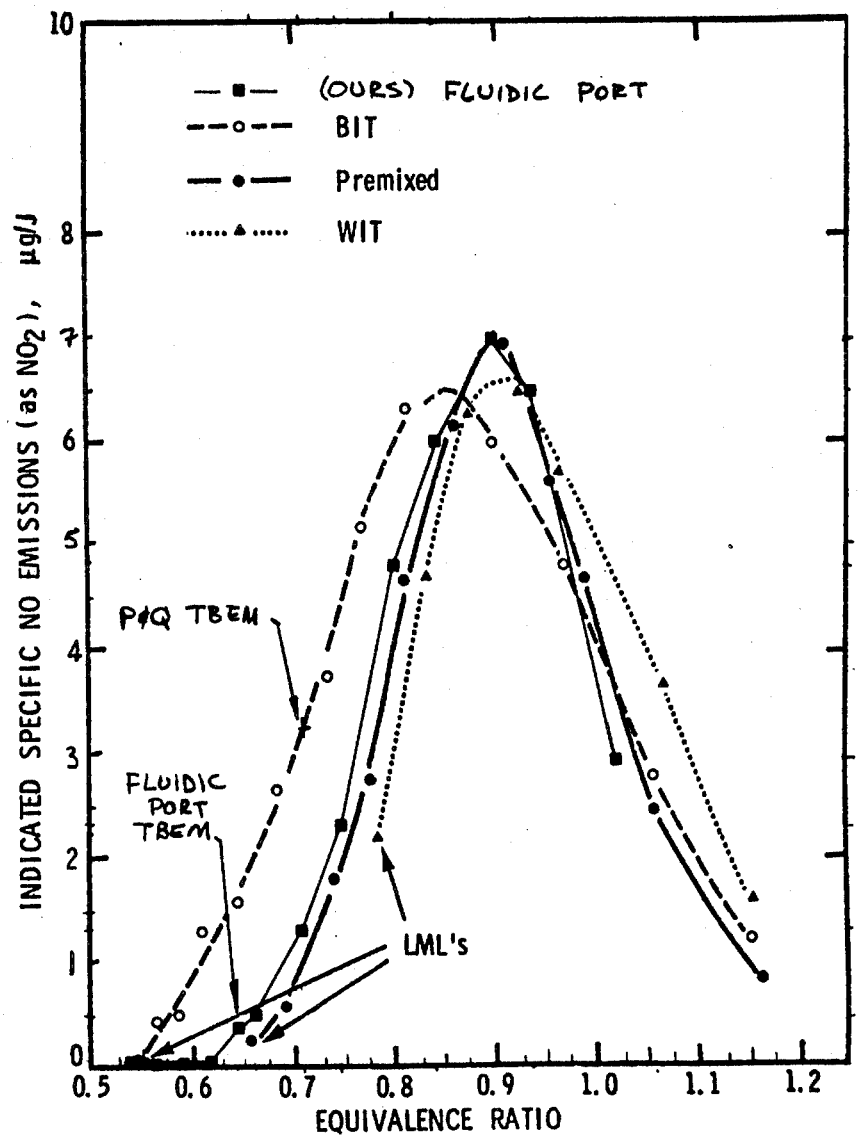

FIGS. 48 and 49 compare the fluidic port engine data to published General Motors data for a stratified charge engine.

Figure 50:
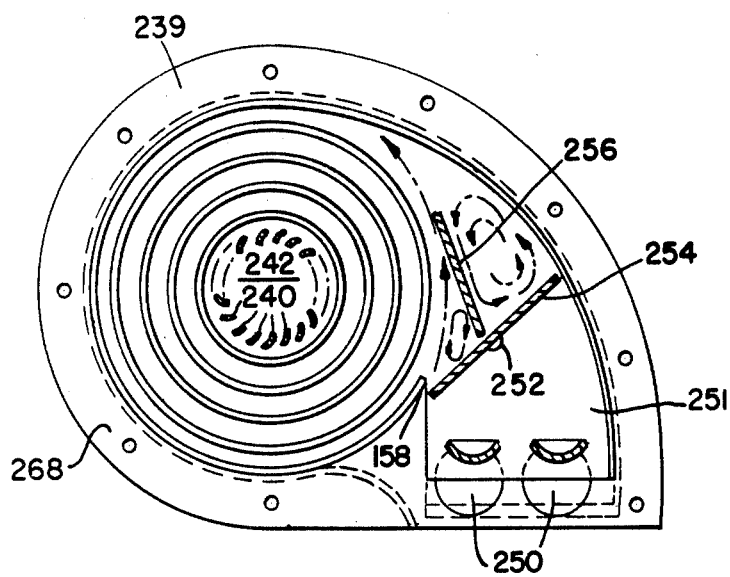
Figure 51:
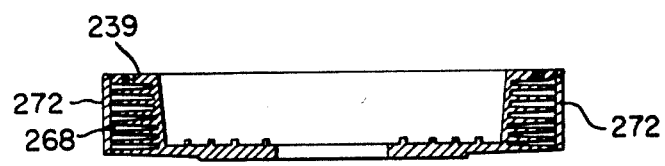
Figure 52:
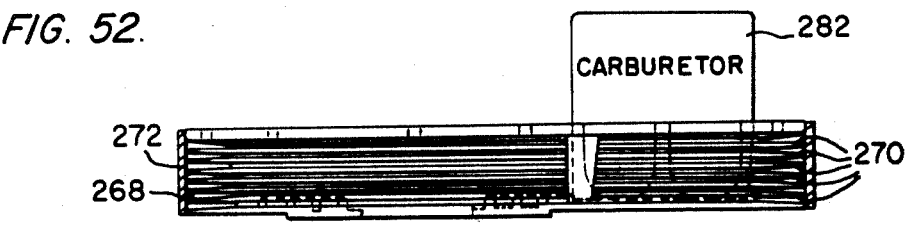

FIGS. 50, 51, and 52 show a preferred form of a vortex mixer which produces very tight cycle-to-cycle and cylinder-to-cylinder mixing statistics.

Figure 53:
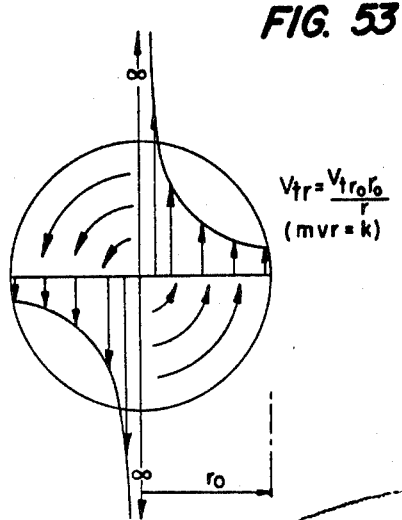

FIG. 53 illustrates the tangential flow velocities which are produced in the irrotational flow vortex of the vortex mixer.

Figure 54:
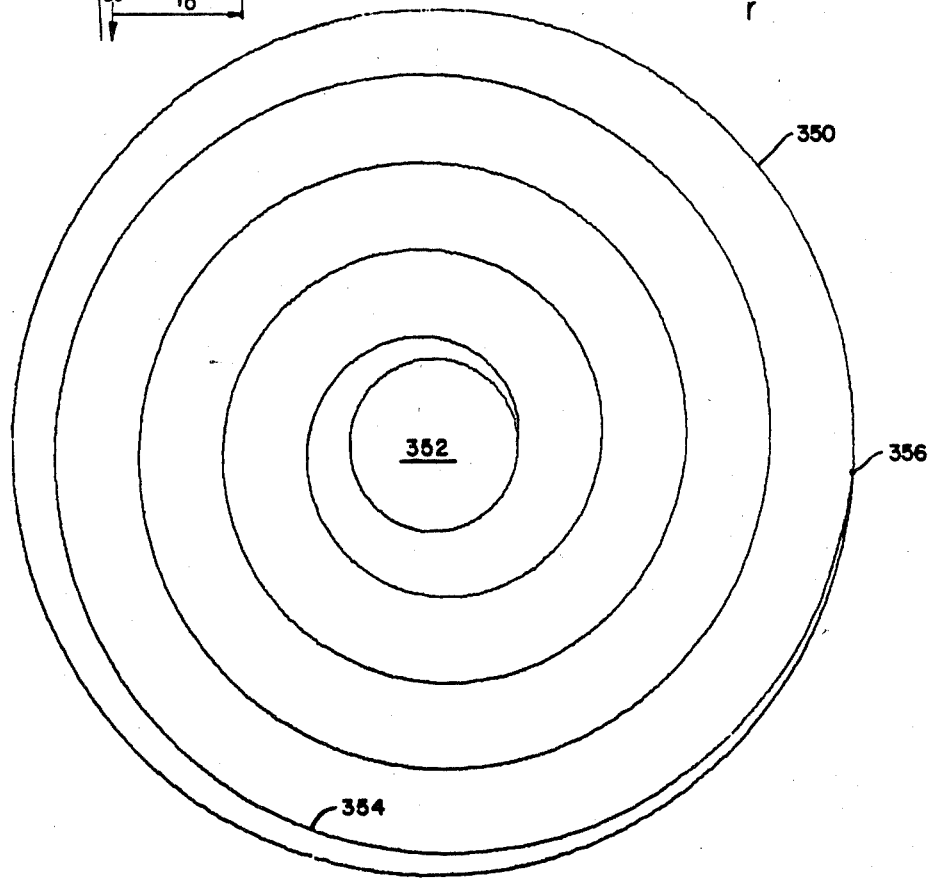

FIG. 54 shows a streamline of the clockwise rotating vortex analogous to the vortex of the vortex mixer FIGS. 50 to 52.

Figure 55:
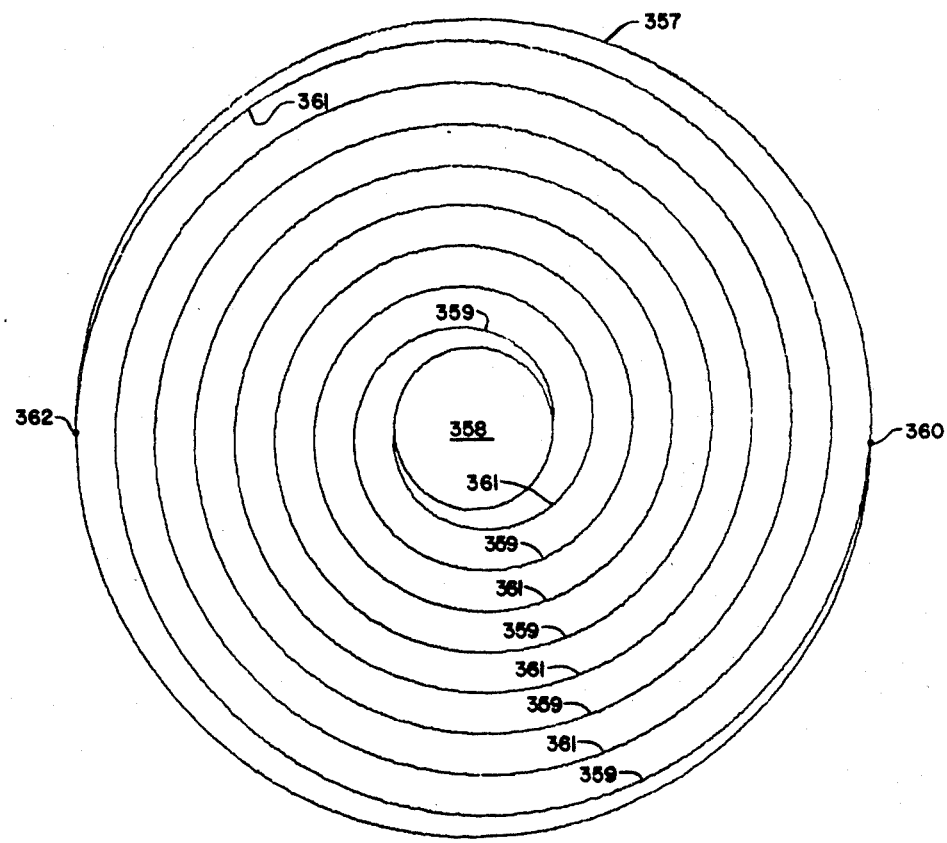

FIG. 55 shows what would happen if the same flow situation as that of FIG. 54 had an additional line of mixant introduced 180° around from the initial point of mixant introduction.

Figure 56:
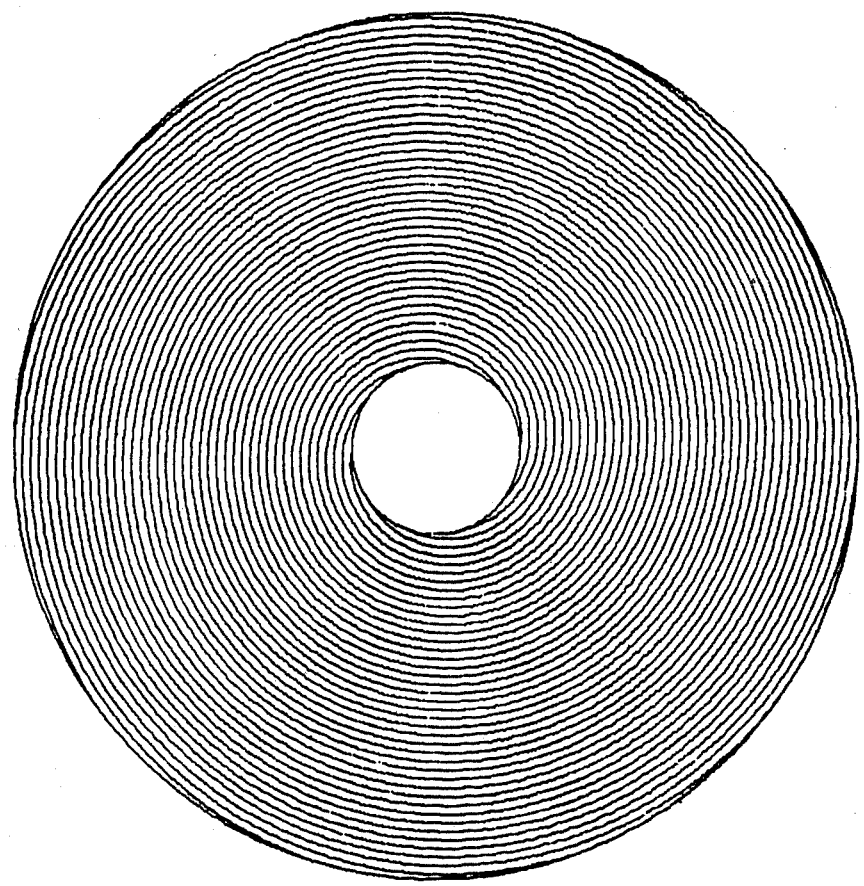

FIG. 56 is analogous to FIG. 55, except that ten spirals are nesting rather than the two spirals of FIG. 55.

Figure 57:
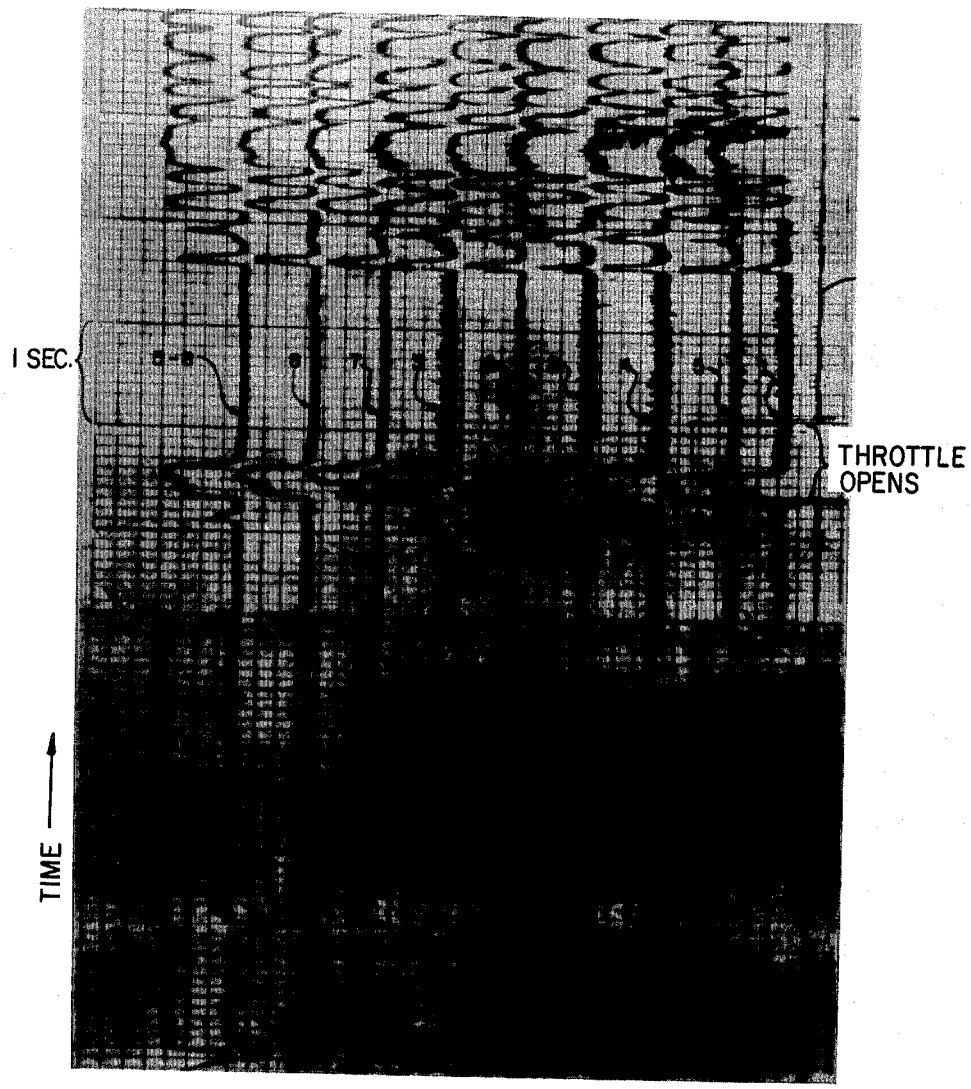

FIG. 57 is a reproduction of chart recorder generated data using oxygen sensors in each exhaust port to demonstrate the very tight and rapid response of the vortex mixer as a mixing device to produce tight cylinder to cylinder and cycle to cycle mixing statistics.

FIGS. 58 to 91 illustrate data taken by the inventor and his associates at the University of Wisconsin to verify the function of the invention.

Figure 58:
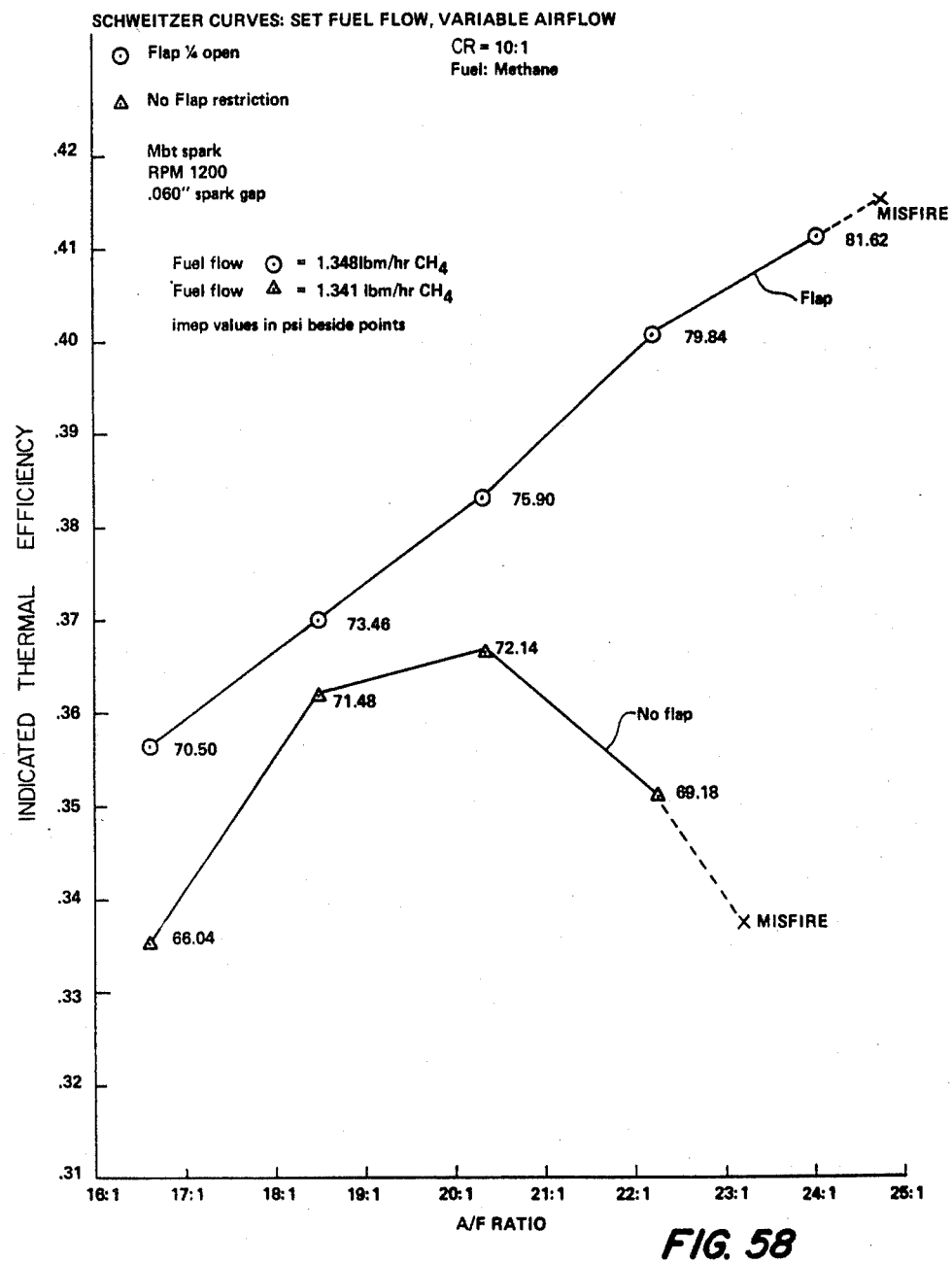
Figure 59:
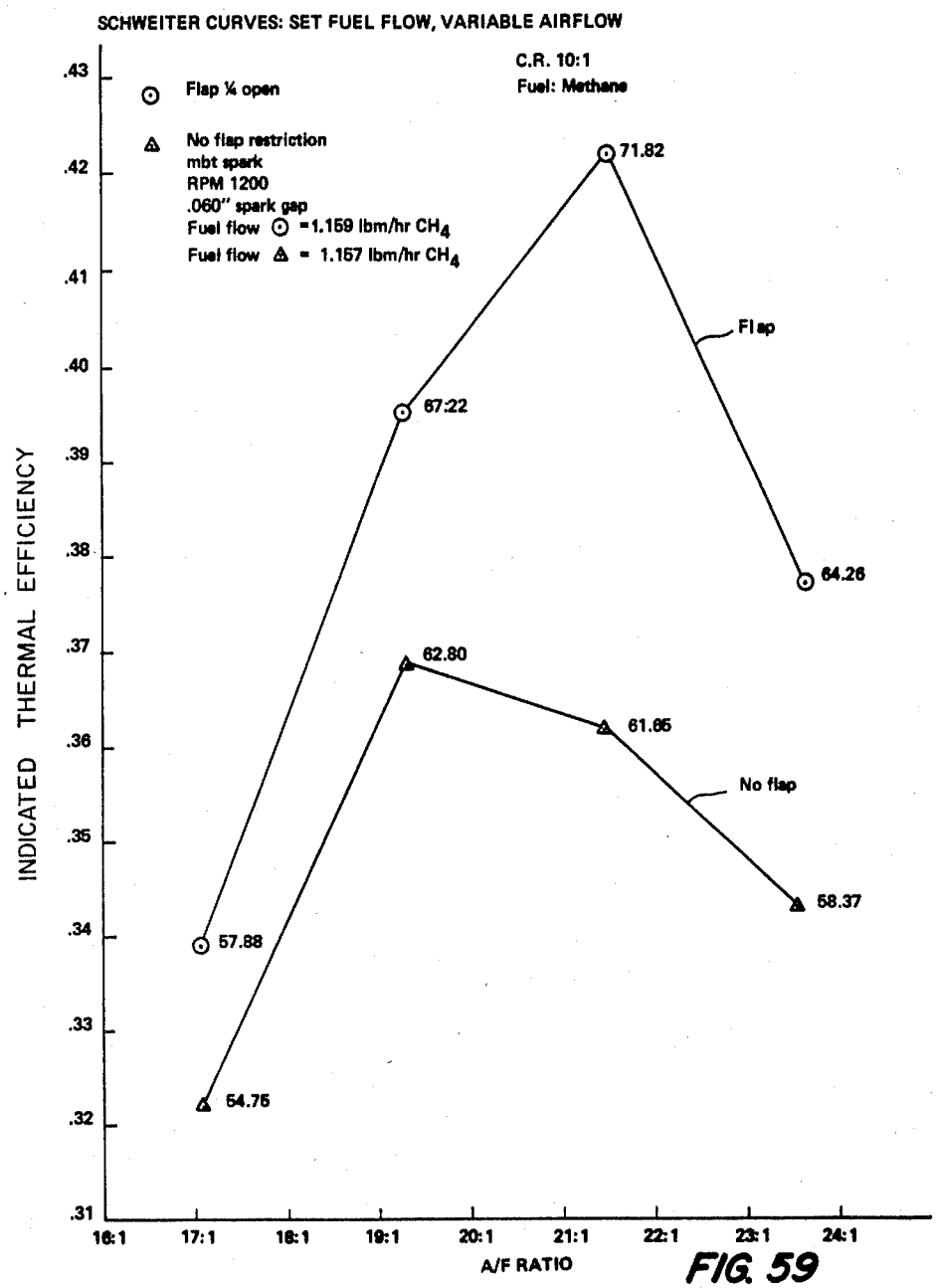

FIGS. 58 and 59 illustrate the fuel consumption advantages of the variable restriction port when the engine is operated on methane.

FIG. 60, which illustrates the most important data of the entire case, shows that the variable restriction port engine, particularly when equipped with a mixing vortex in the induction system, permits more than a factor of one hundred reduction in nitric oxide emissions while simultaneously improving fuel economy, and shows results very different from those of conventional prior art induction system engines.

Figure 61:
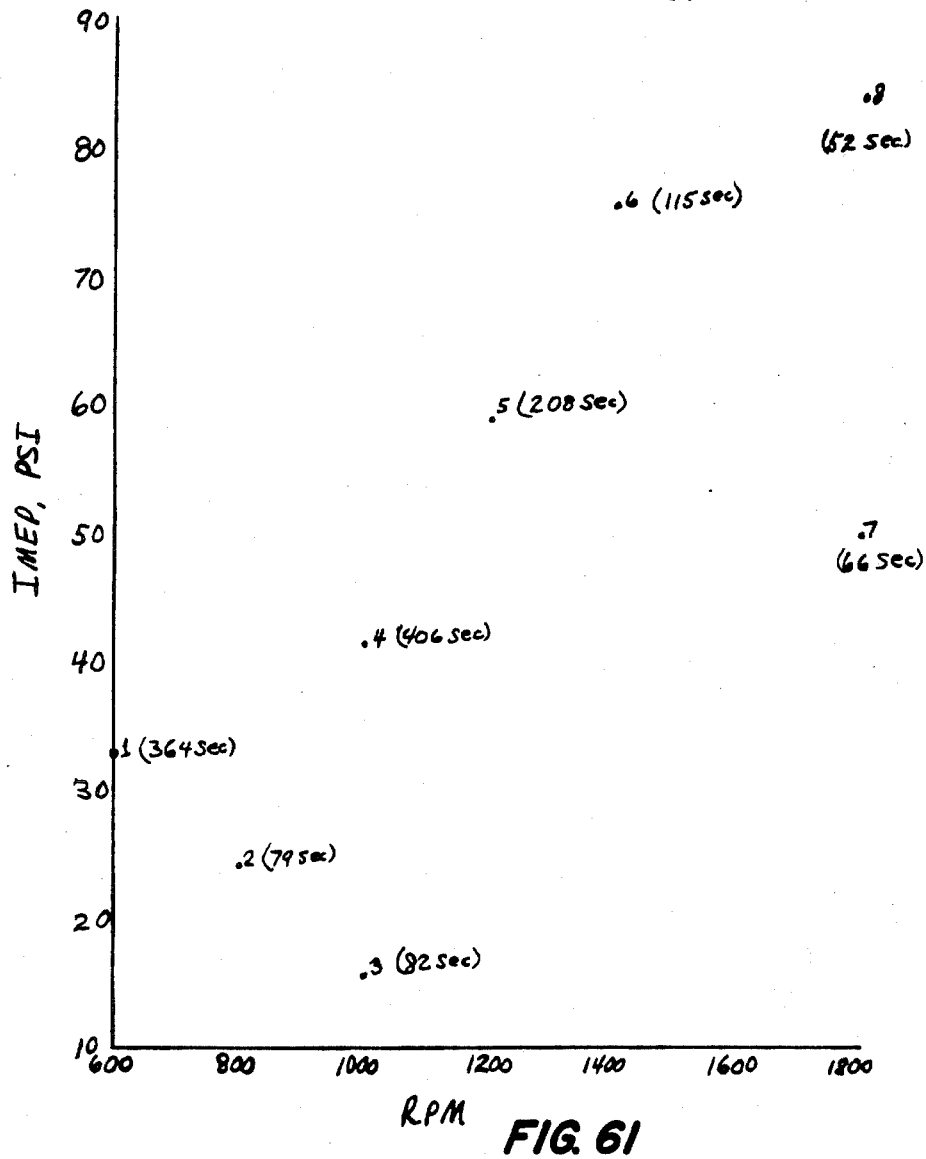

FIG. 61 shows the indicated mean effective pressures and r.p.m.'s for the Blumberg eight point matrix approximation of the Environmental Protection Agency CVS hot cycle which will be applied in the data immediately following.

Figure 62:
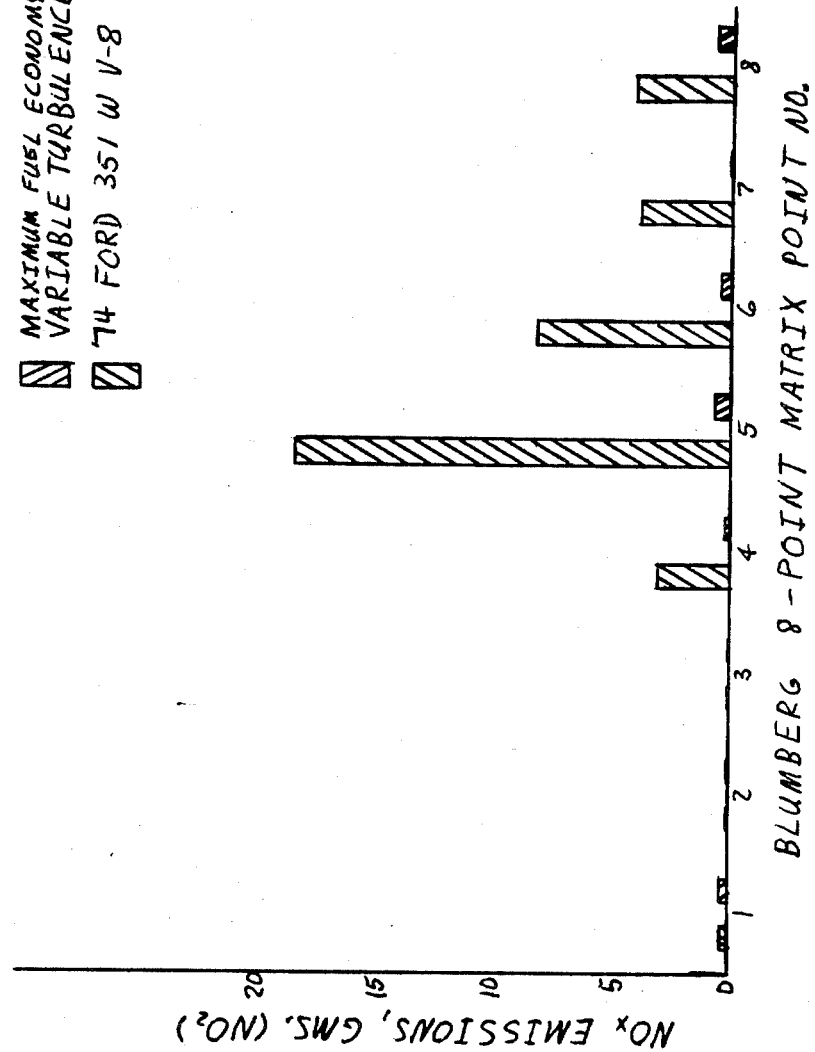

FIG. 62 plots $NO_x$ emissions in total gram contribution for the cycle, for each of the eight points in the Blumberg matrix, comparing the performance of the variable restriction port engine to the baseline performance of the conventional production engine.

FIG. 63 plots in graphical form the $NO_x$ emissions in grams per mile which would be predicted for the fluidic port engine using the Blumberg eight point correlation running the engine on propane.

Figure 65:
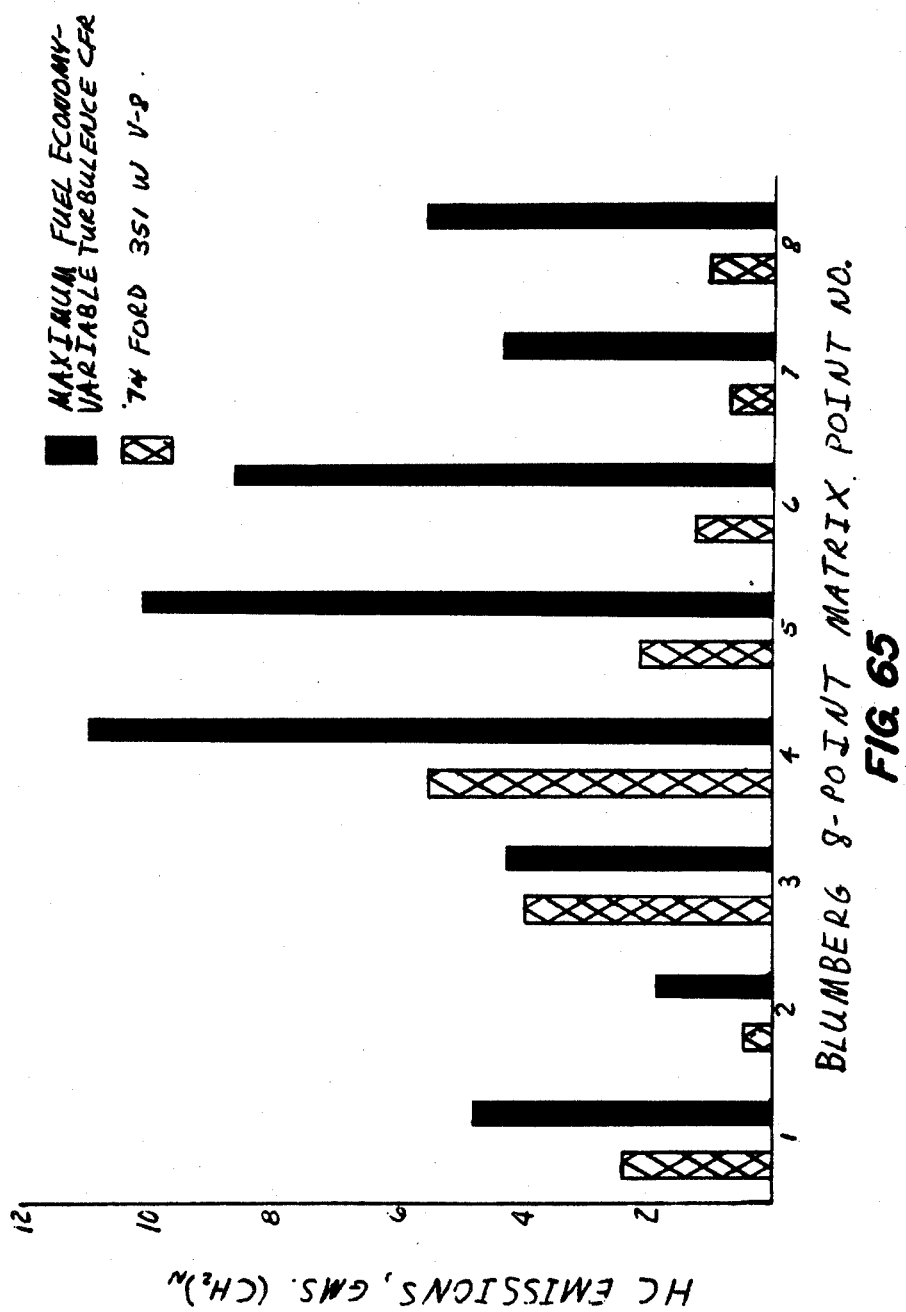
Figure 66:
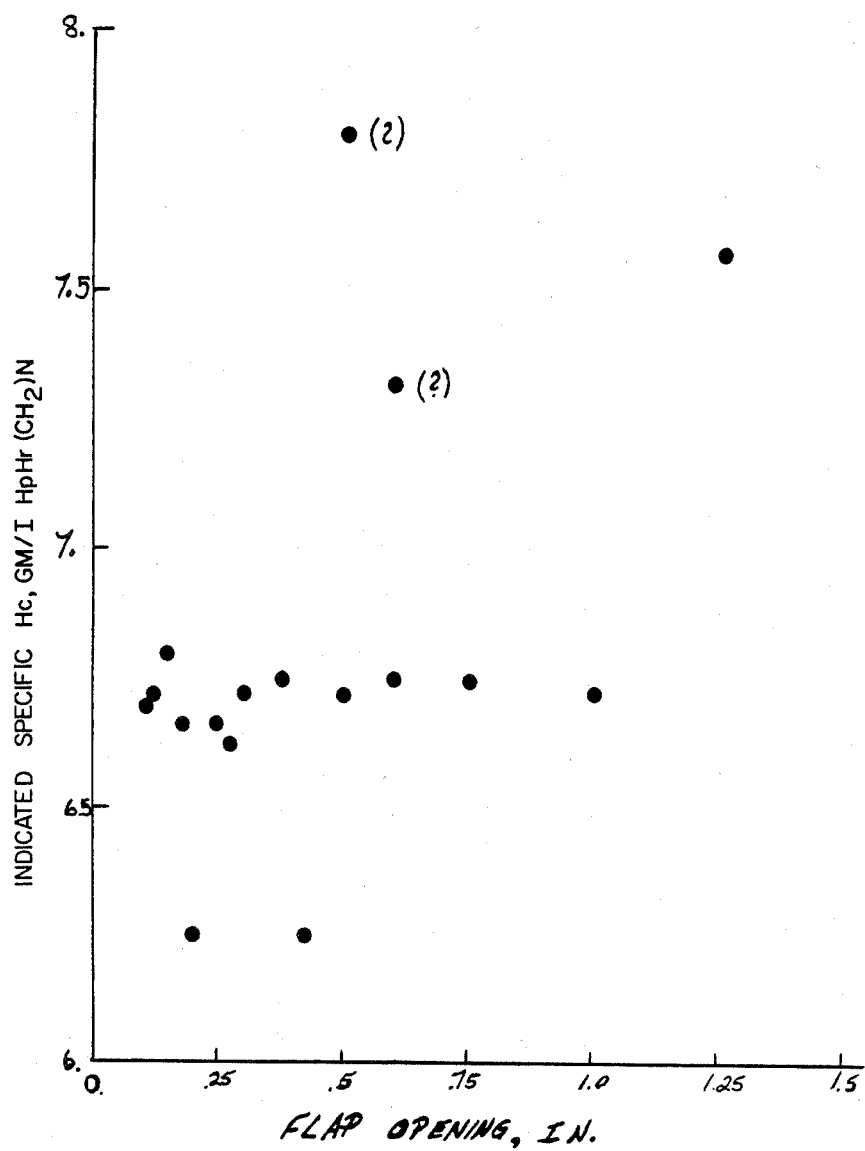

FIGS. 64, 65, and 66 discuss the HC emissions from the engine, which are high.

FIG. 66 shows that the variable restriction does not increase HC emissions.

Figure 67:
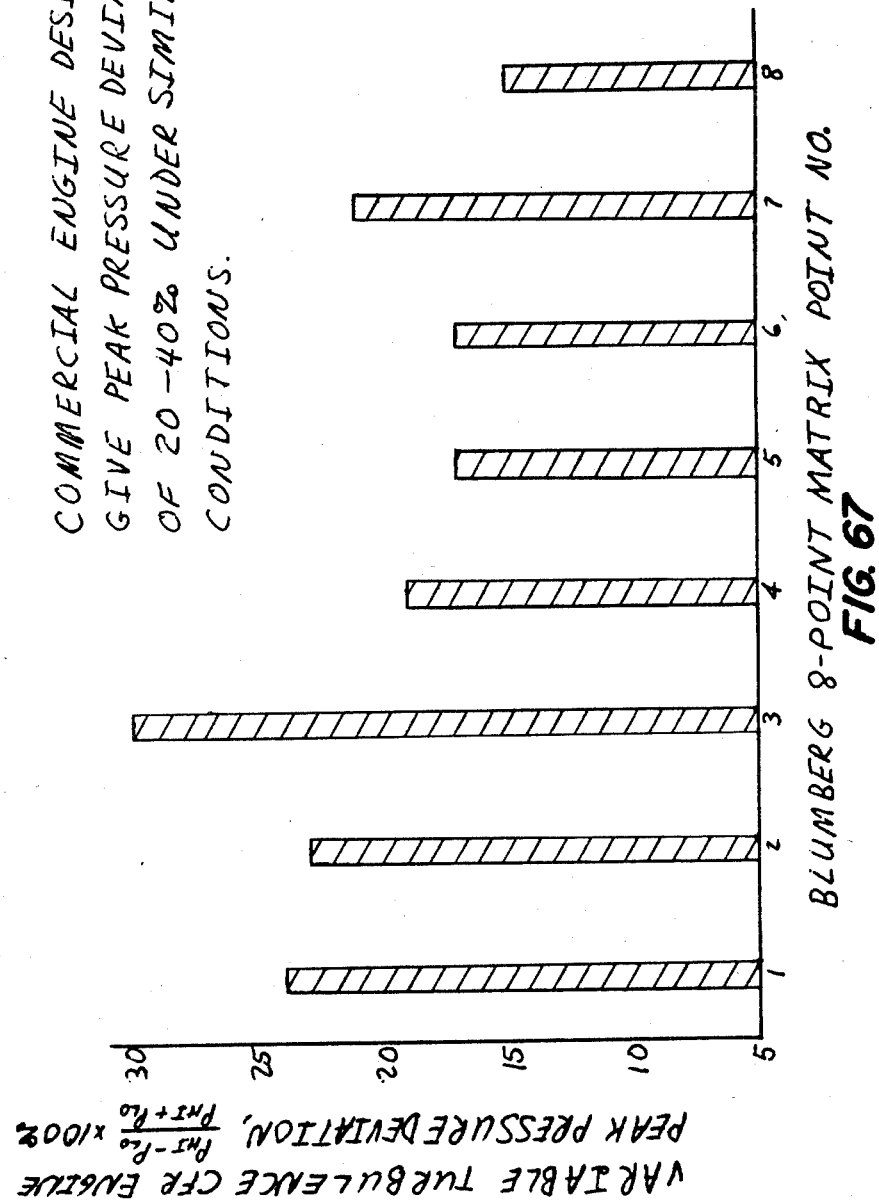

FIG. 67 shows the variation in peak combustion pressure corresponding to the Blumberg points with the fluidic port engine.

Figure 68:
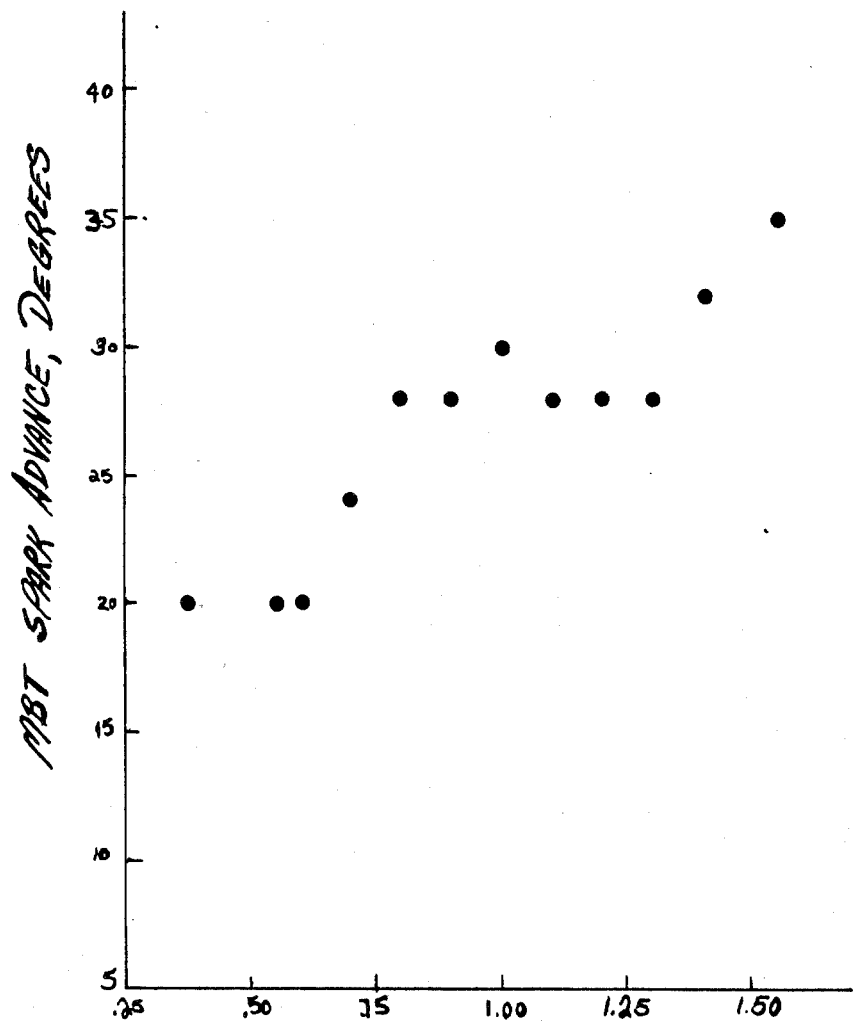

FIG. 68 records experimental data which shows the effect of variable restriction flap setting on MBT spark advance (and correlatively on flame speed).

Figure 69:
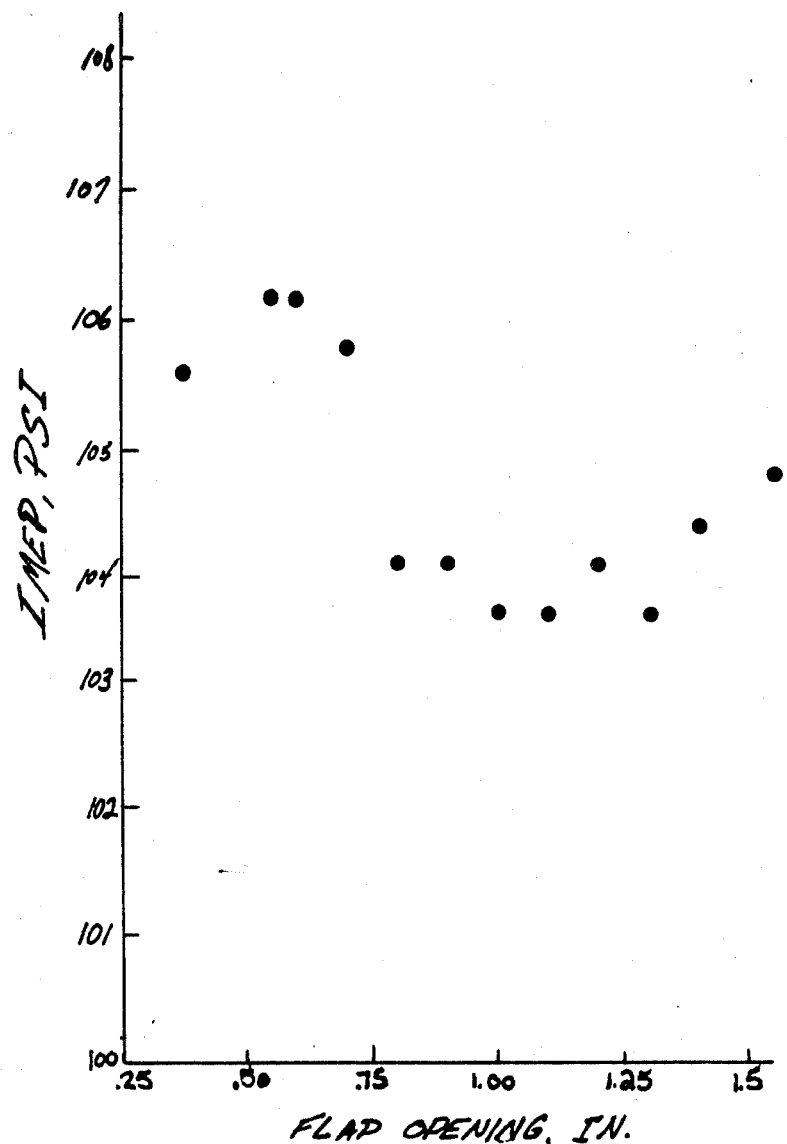

FIG. 69 plots indicated mean effective pressure versus flap opening for the data run also producing FIG. 68, and shows that the most efficient flap settings are relatively restrictive.

Figure 70:
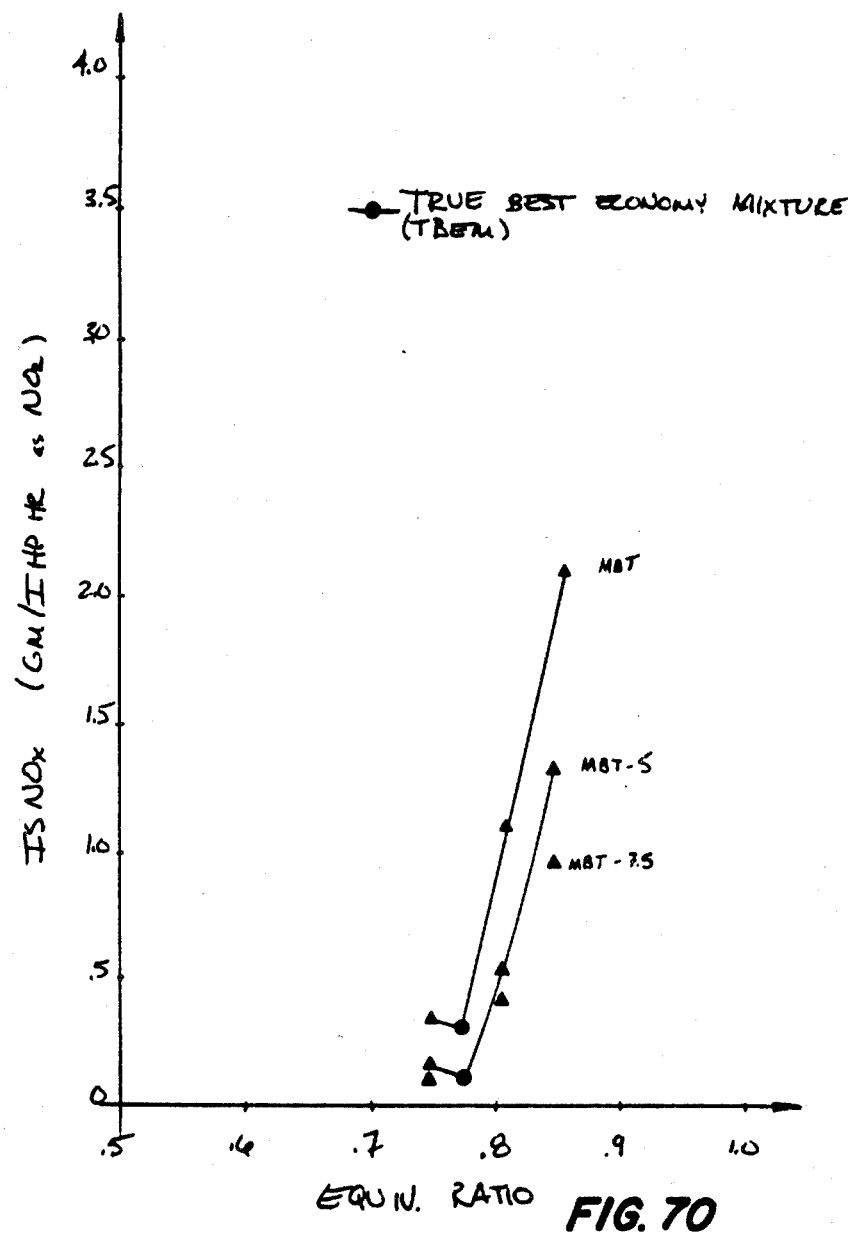
Figure 71:
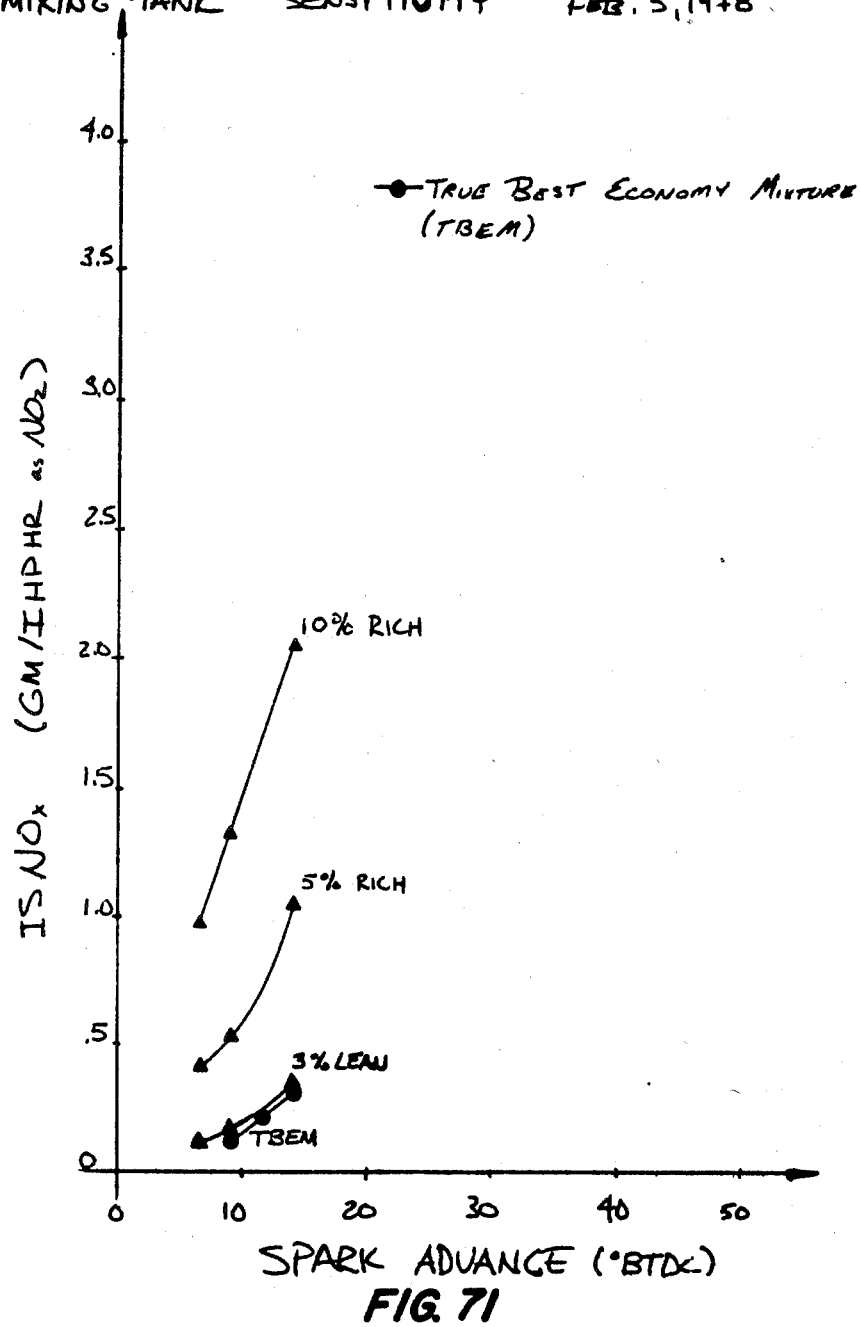
Figure 72:
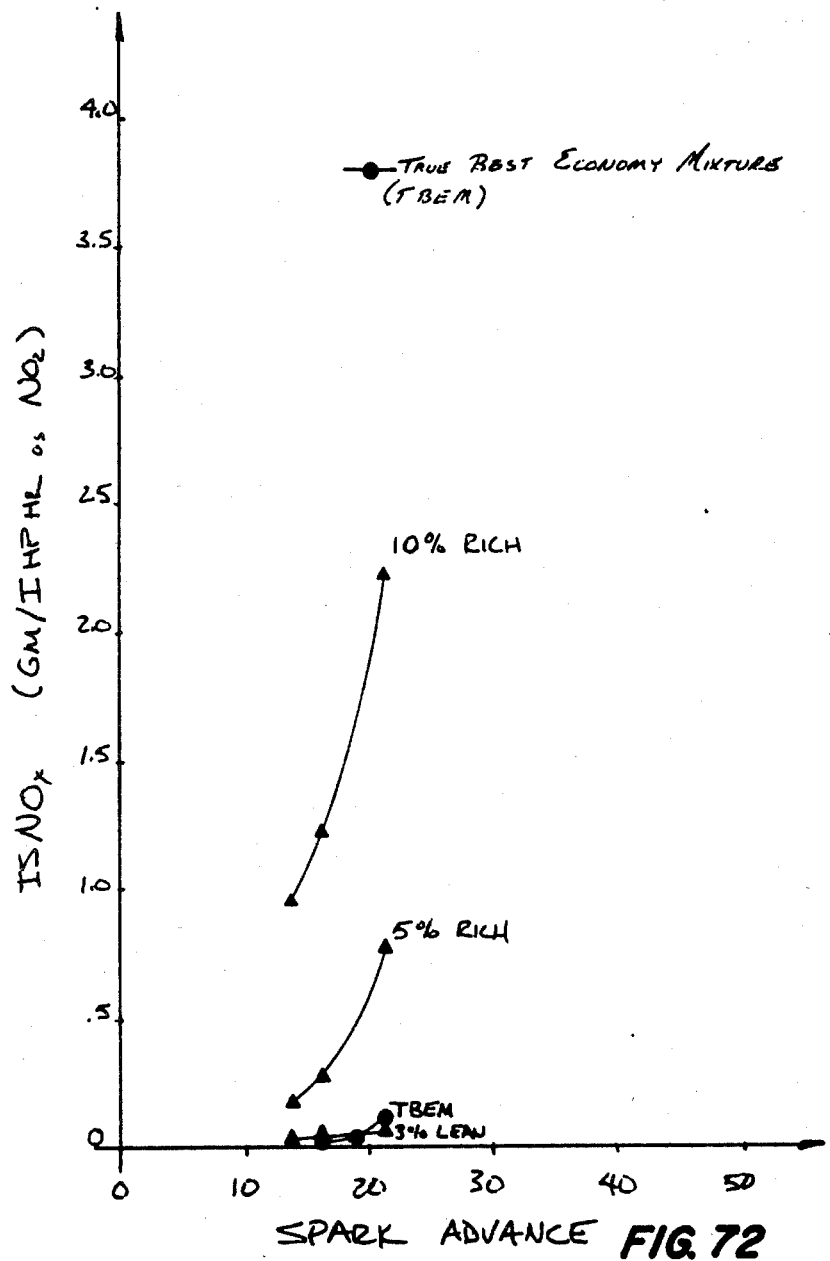
Figure 73:
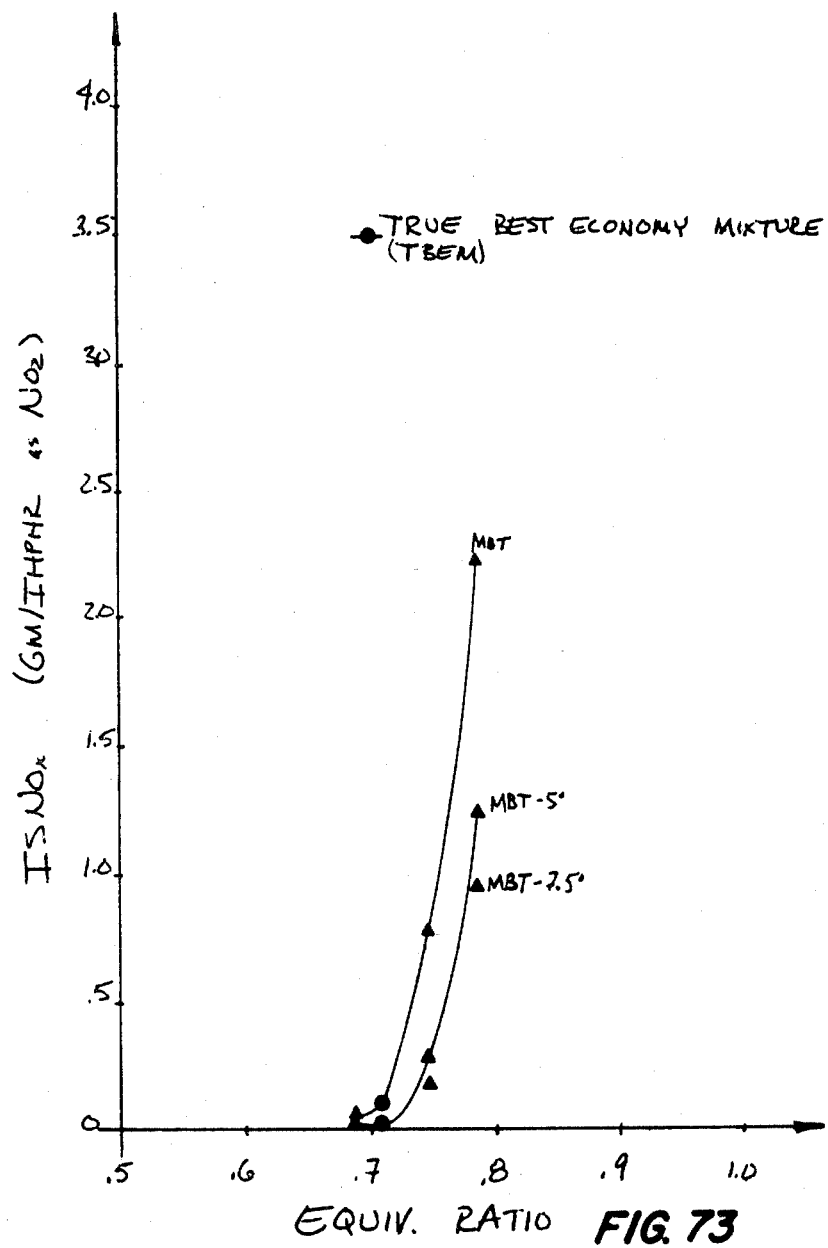
Figure 74:
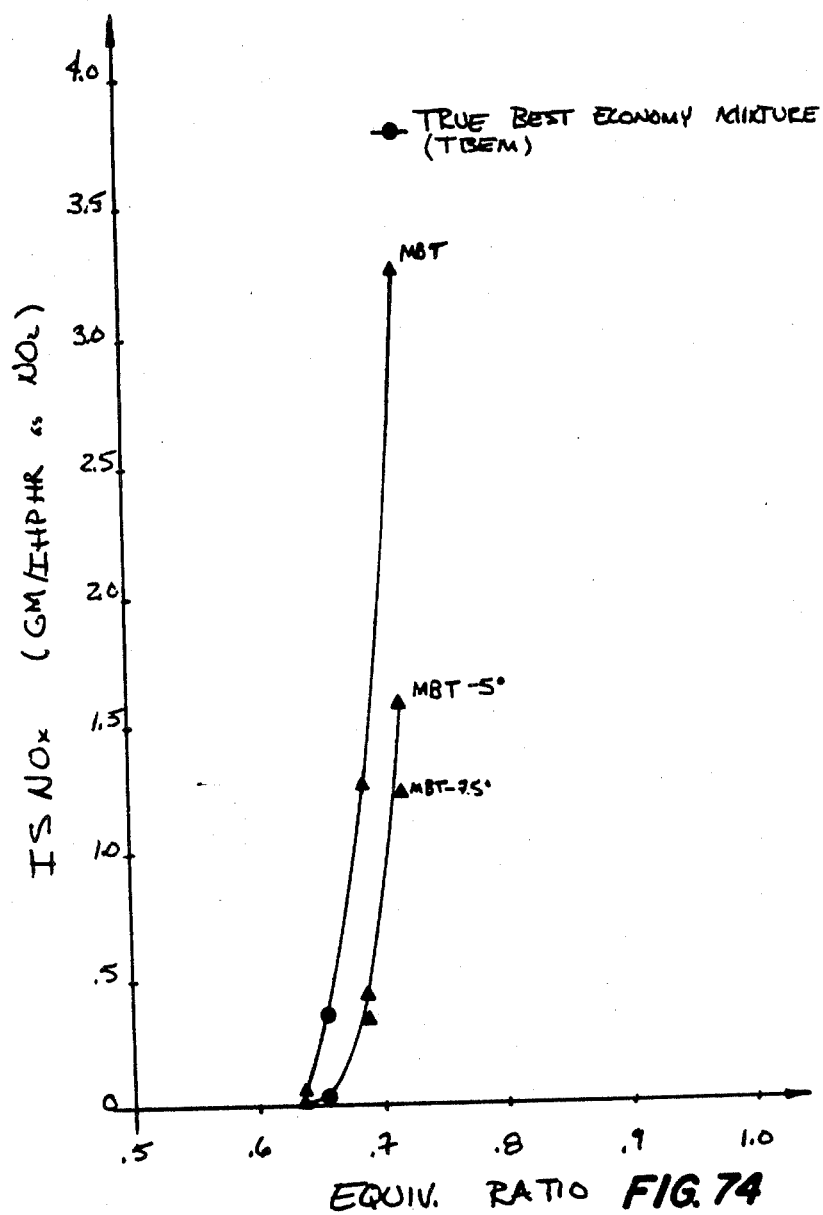
Figure 75:
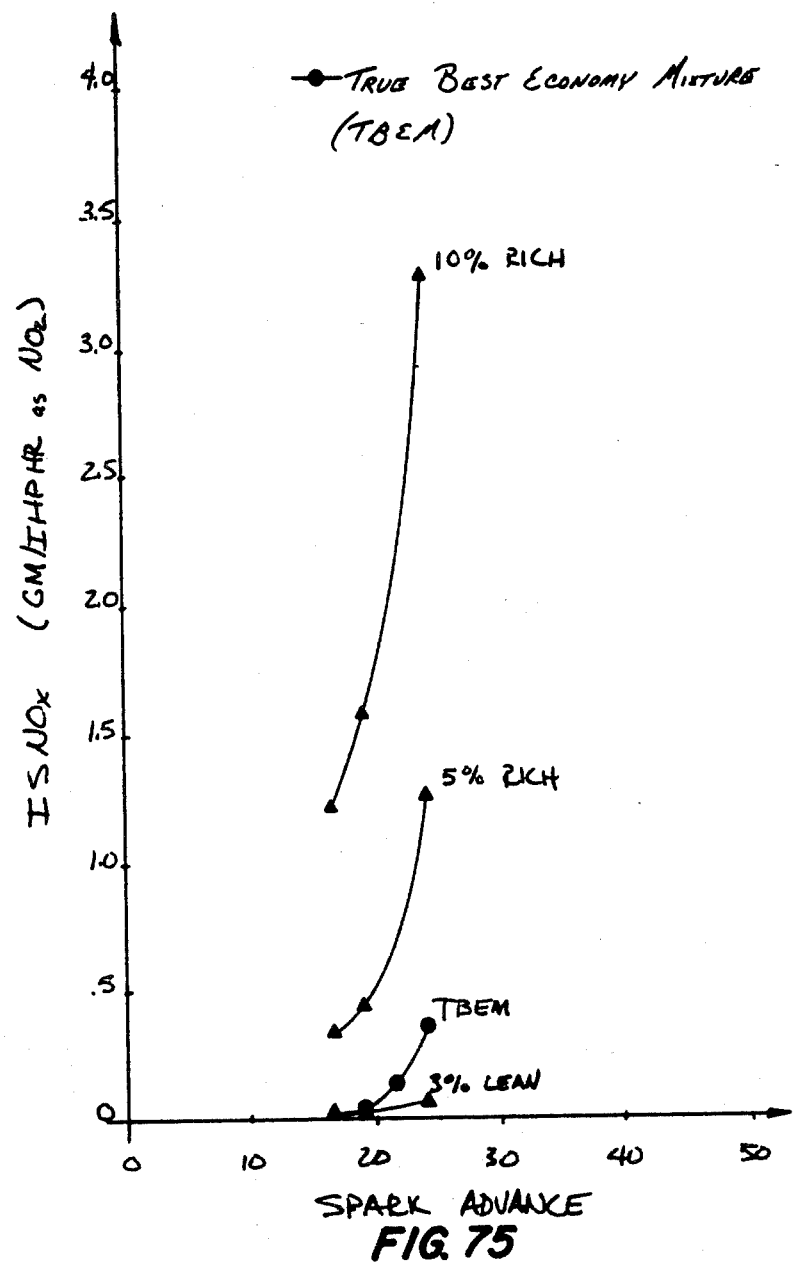

FIGS. 70 to 75 show the sensitivity of the $NO_x$ output of the fluidic port engine to variations of spark advance and variations of equivalence ratio. FIG. 70 plots $NO_x$ with respect to variations in equivalence ratio for Blumberg's matrix point one. FIG. 71 also shows the relationship between $NO_x$, equivalence ratio, and spark advance for Blumberg's point one. FIG. 72 is analogous to FIG. 71 but plots data for Blumberg's matrix point 4. FIG. 73 also deals with Blumberg matrix point 4. FIG. 73 also deals with Blumberg matrix point 4 and is analogous to FIG. 70. FIGS. 74 and 75 plot $NO_x$ sensitivity to equivalence ratio and spark advance for Blumberg matrix point No. 5 which is a higher load point.

Figure 76:
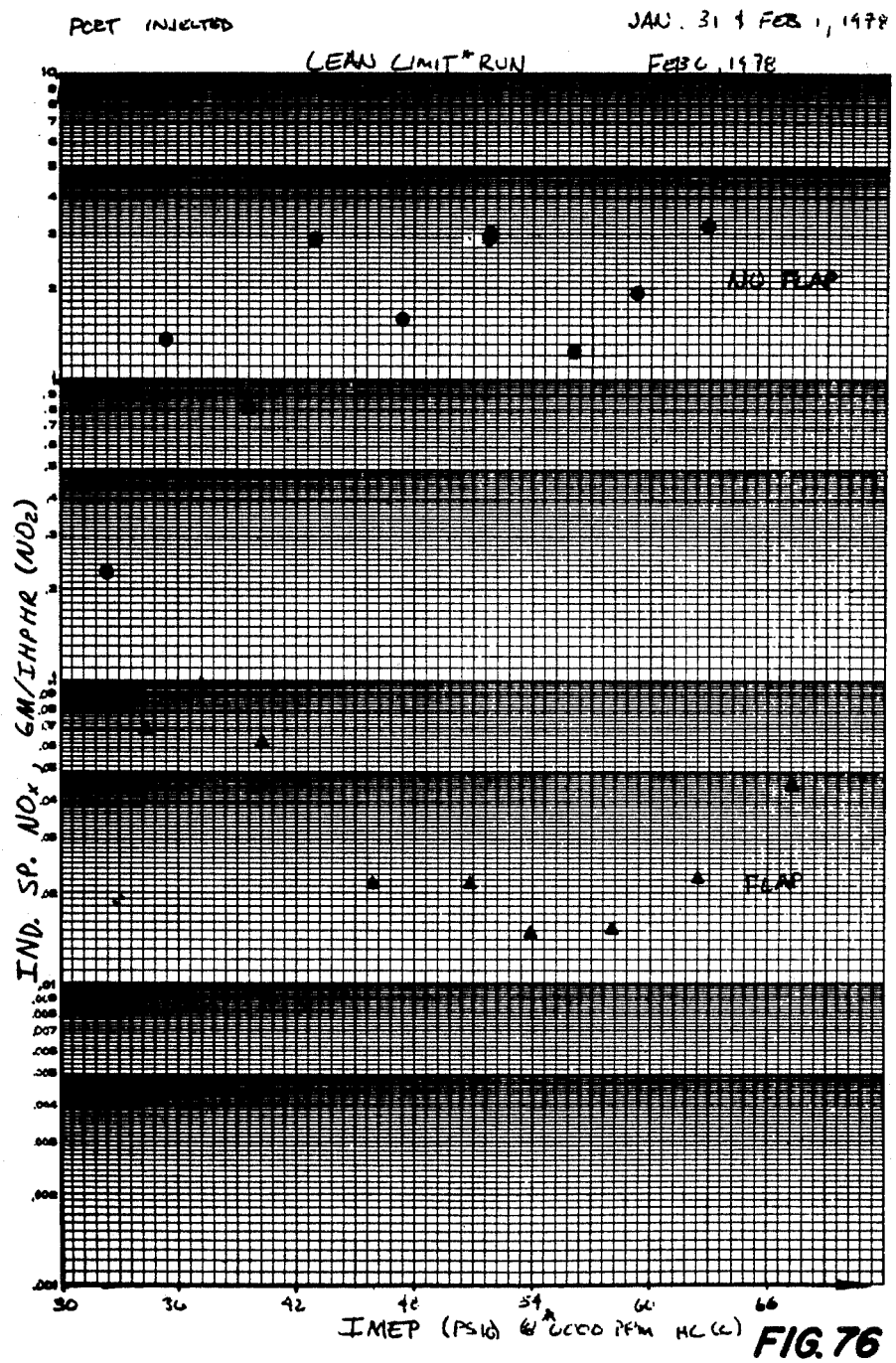

FIG. 76 compares the $NO_x$ output at the misfire limit for the engine with the flap restriction and without the flap restriction, showing the dramatic reductions in $NO_x$ output attainable with the restriction.

Figure 77:
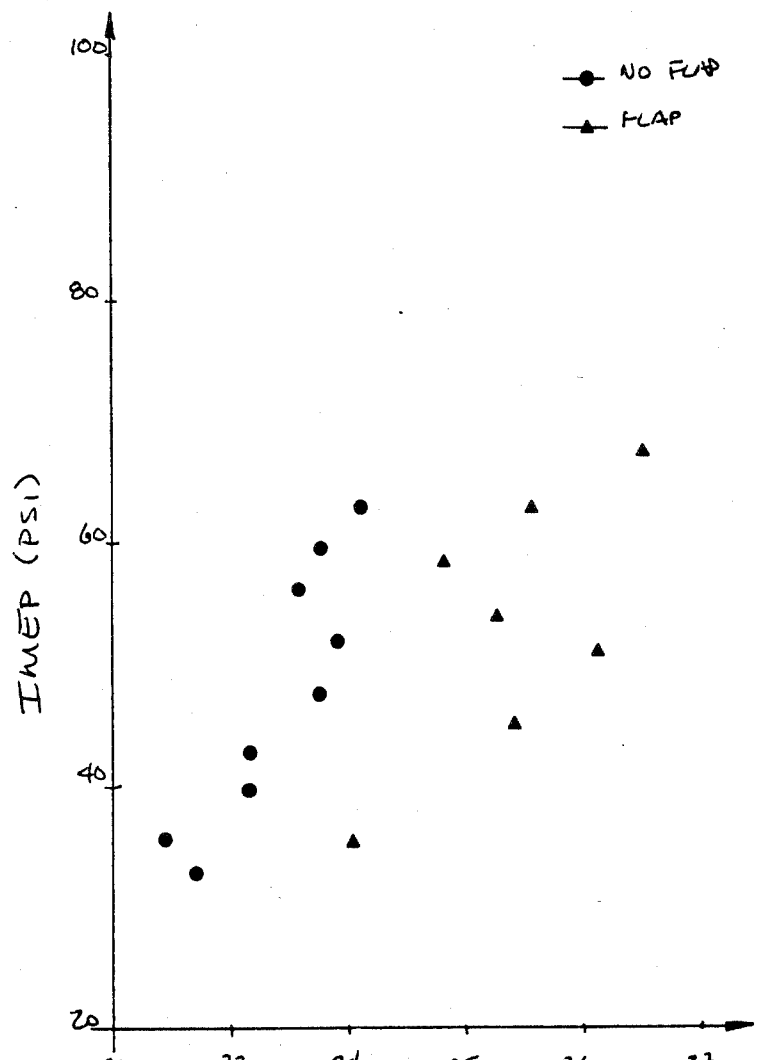

FIG. 77 plots the indicated mean effective pressure and the indicated thermal efficiency measurements recorded for the lean limit run described in FIG. 76 to show the advantage of the variable restriction flap.

Figure 78:
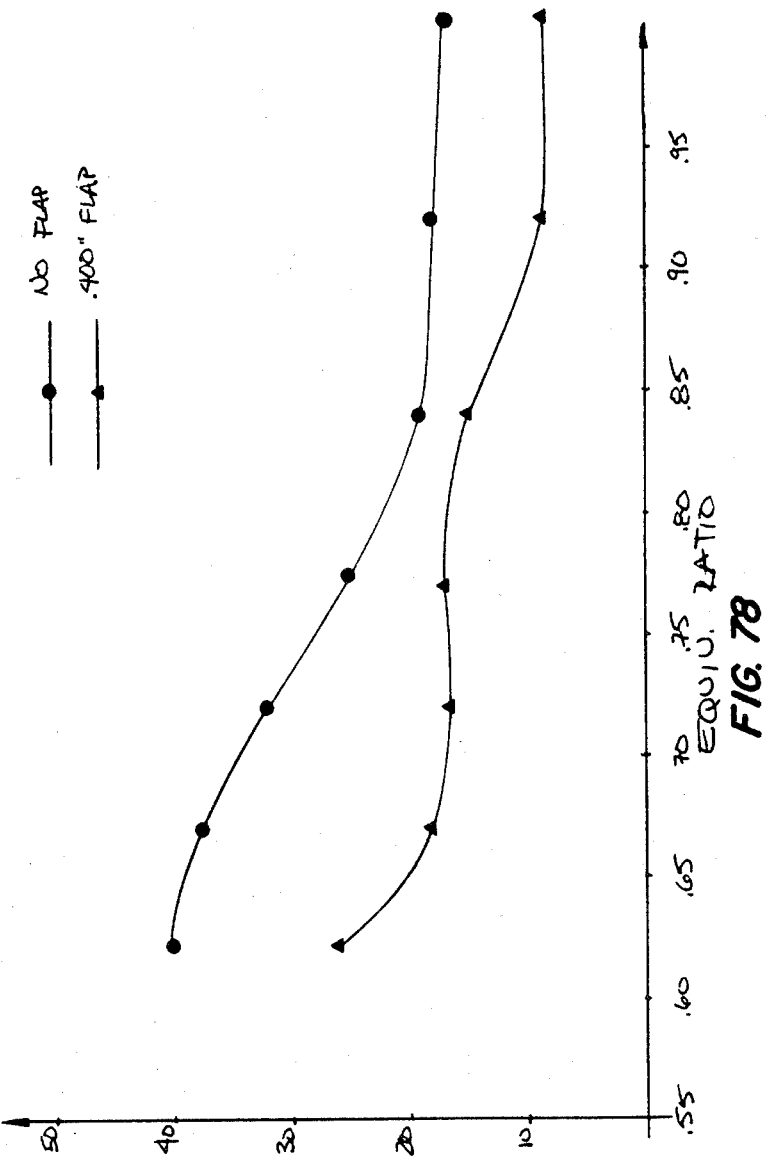

FIG. 78 shows the effect of the variable restriction flap at a large opening in comparison to the no-flap case.

Figure 79:
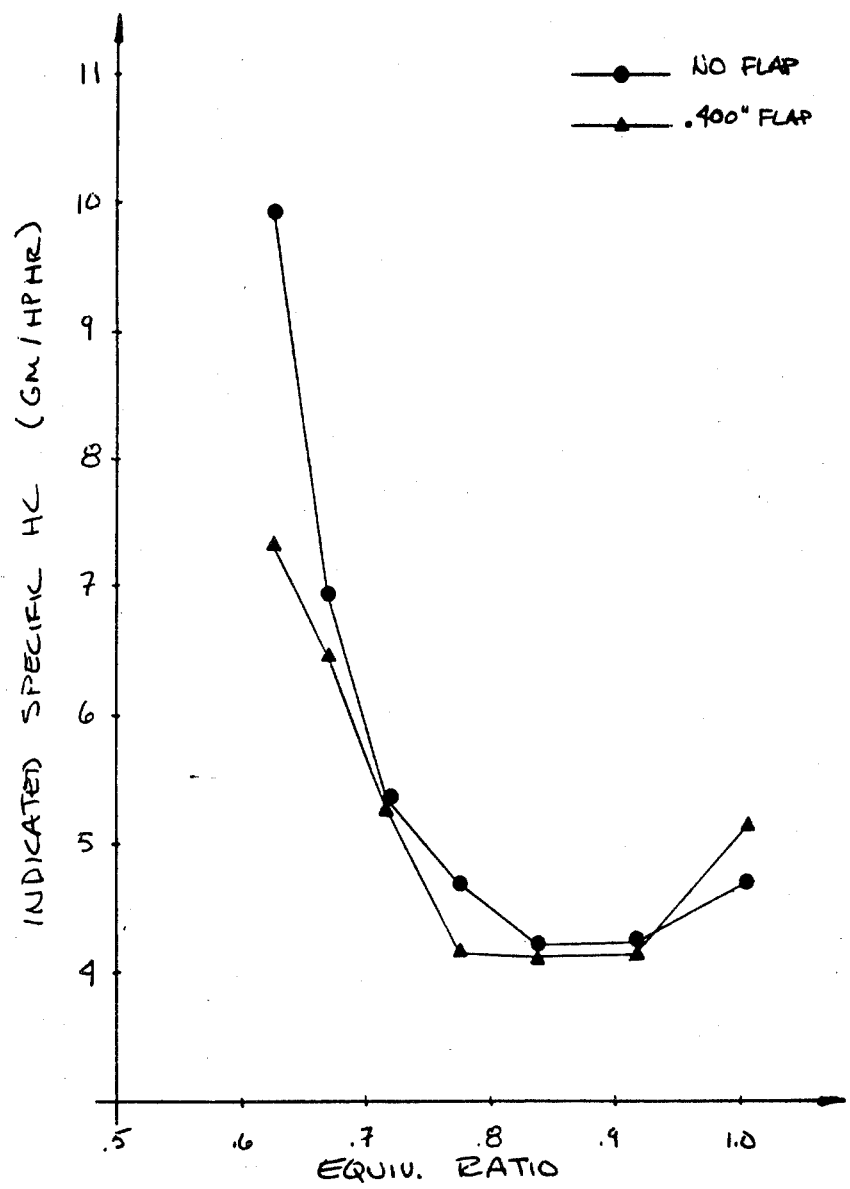
Figure 80:
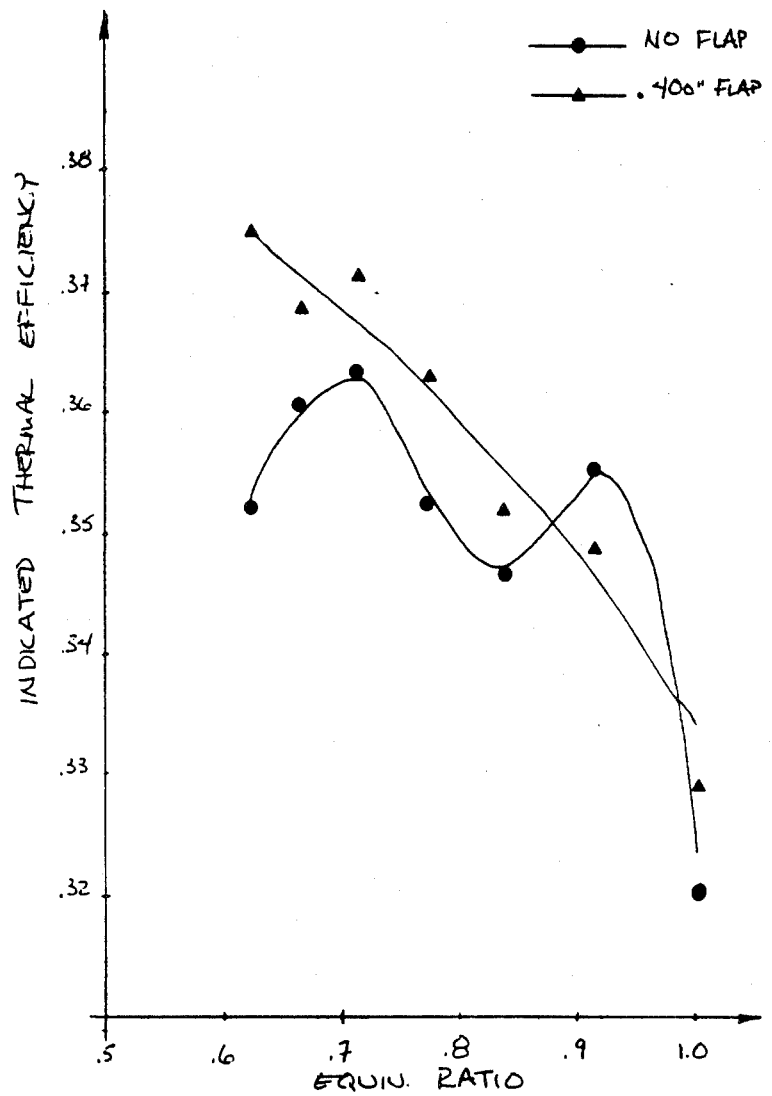

FIG. 79 plots indicated specific HC versus equivalence ratio for the same data points as those plotted for FIG. 78.

FIG. 80 is again a plot of the data points plotted for FIGS. 78 and 79 and plots the indicated thermal efficiency of the engine versus equivalence ratio.

Figure 81:
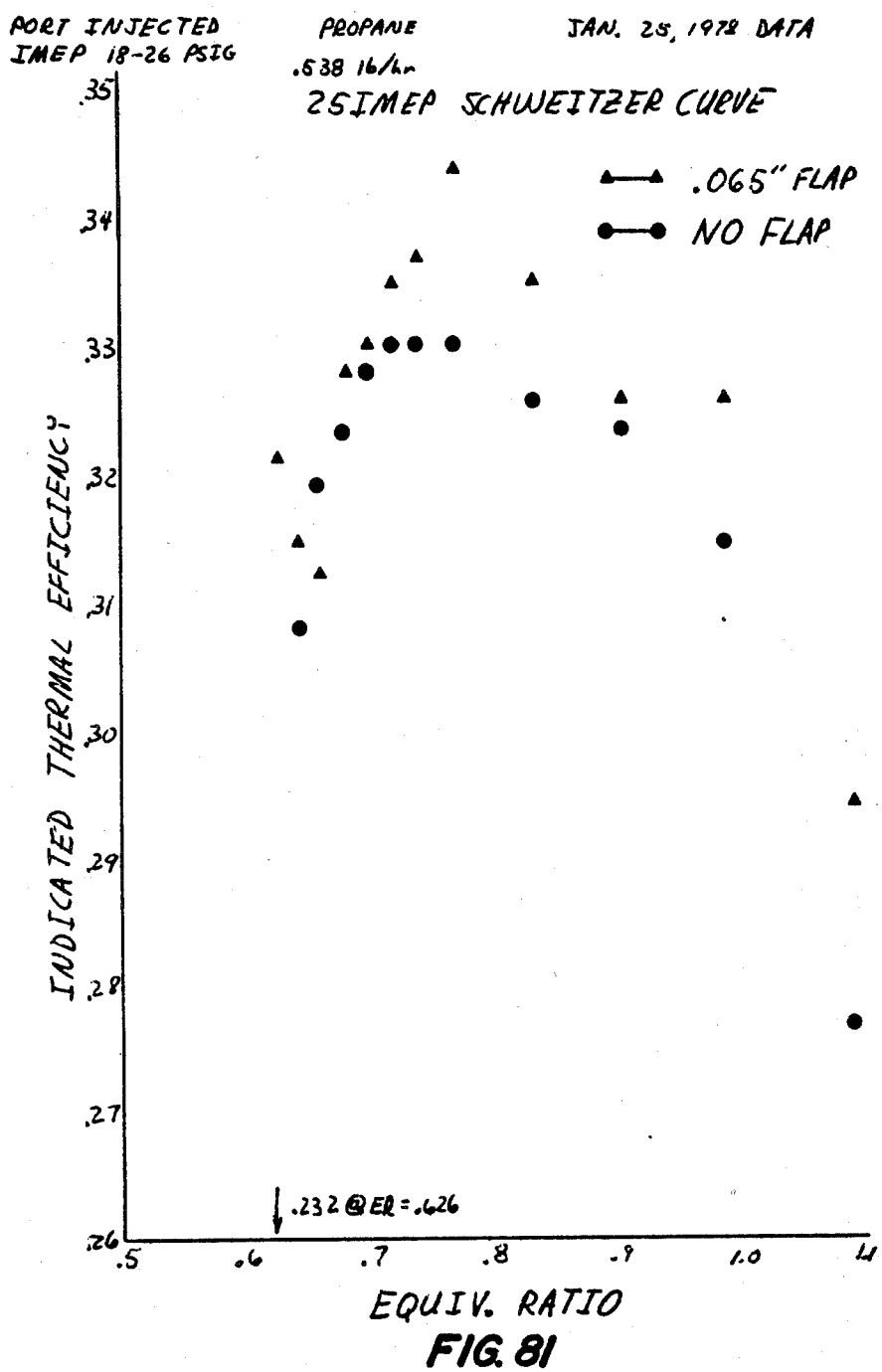
Figure 82:
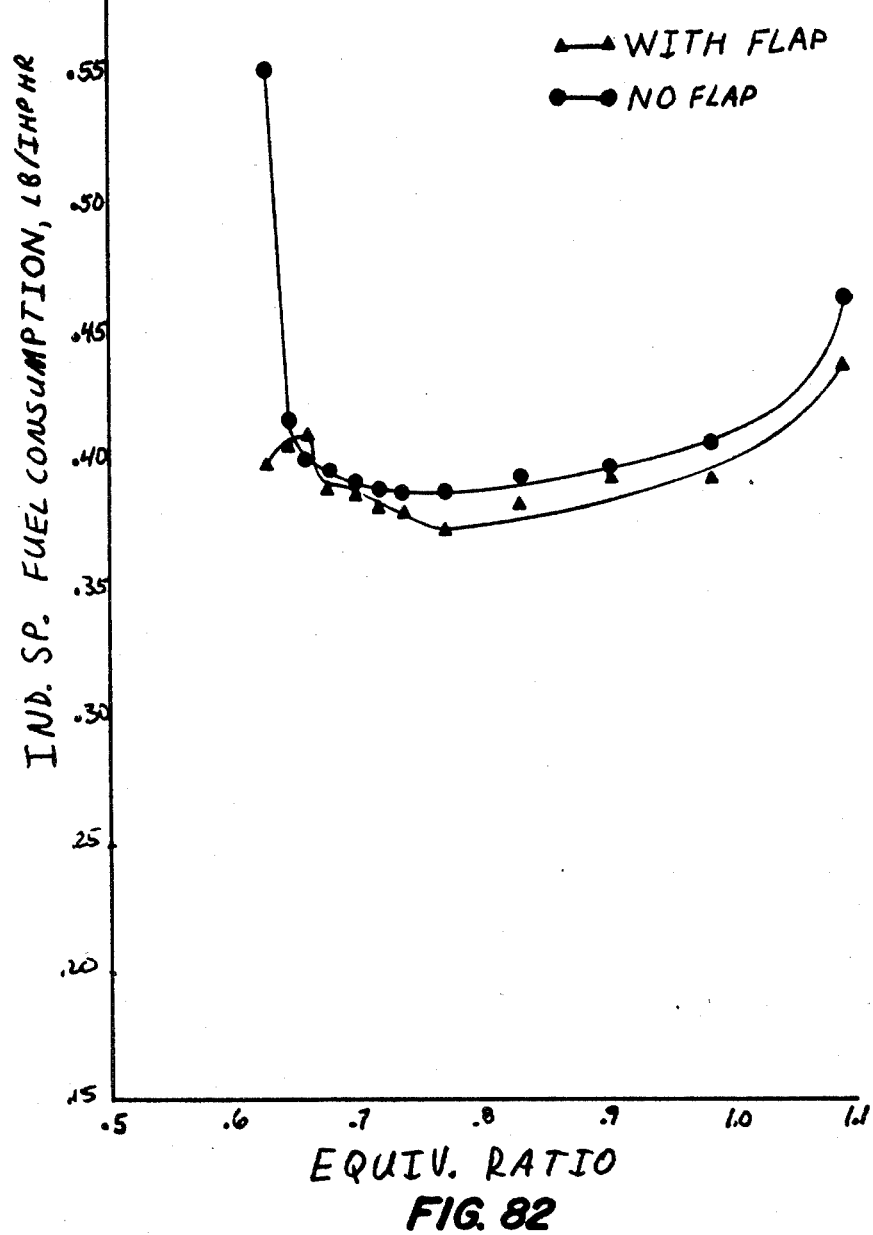
Figure 83:
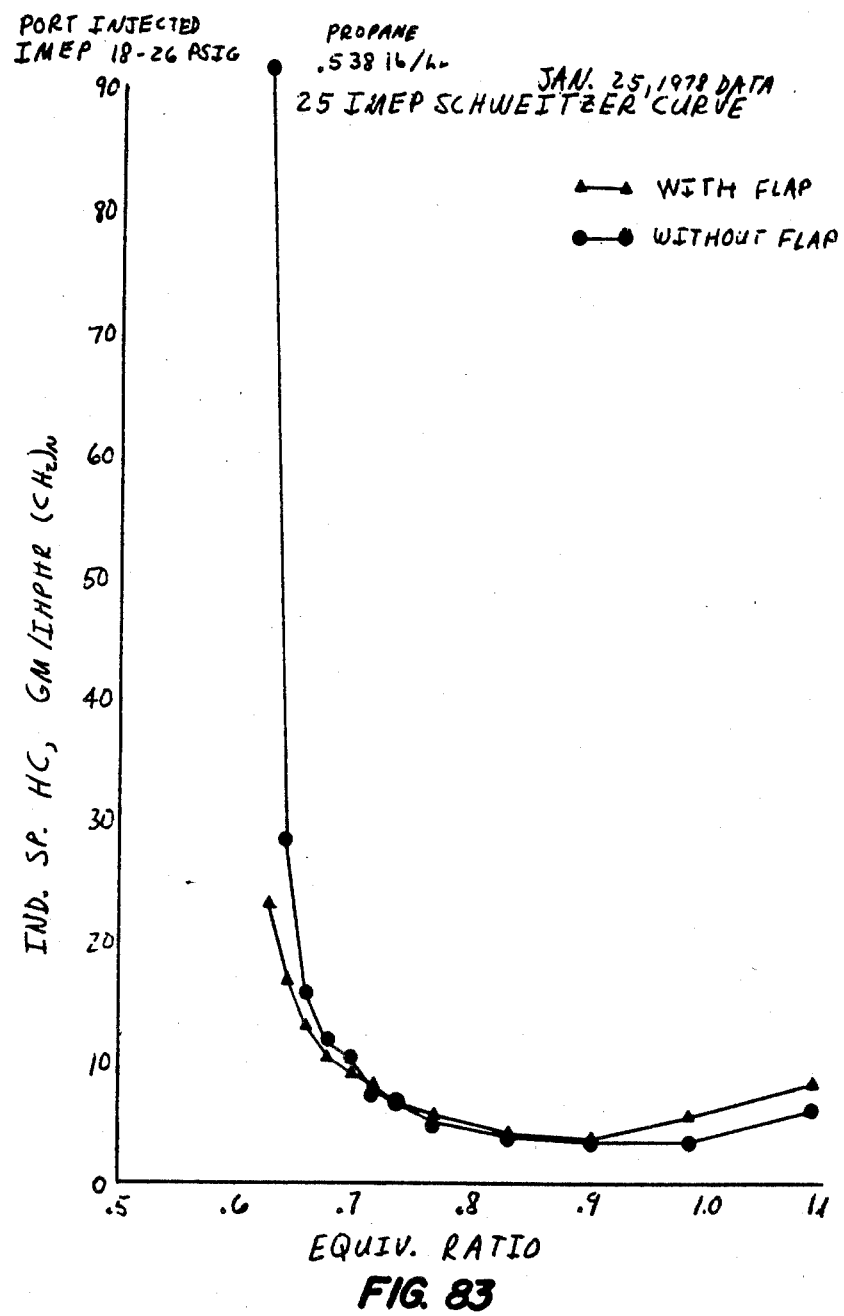

FIGS. 81, 82, and 83 plot various aspects of a Schweitzer curve (set fuel variable air flows variable spark advance optimization ) run.

DETAILED DESCRIPTION

Figure 1:
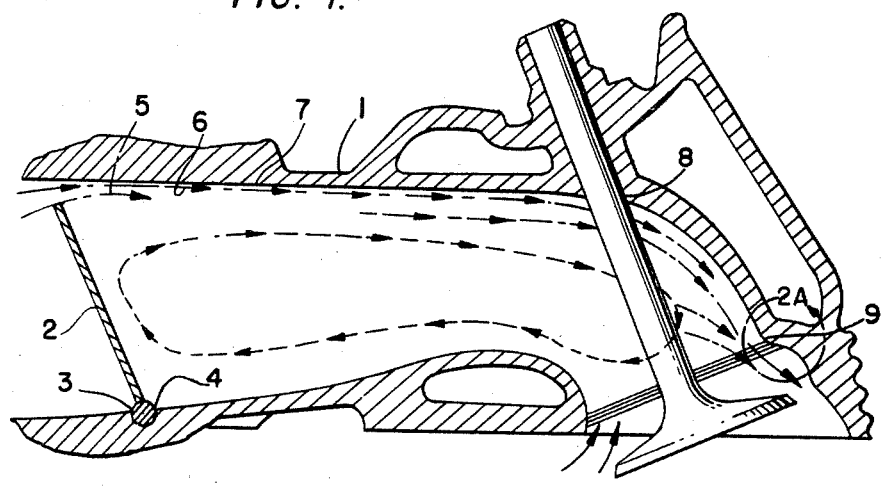
FIG. 1 is a cross section side view of the fluidically simplest of the inventor's fluidically efficient variable restriction ports.

See FIG. 1, which is a cross section side view of the fluidically simplest of the inventor's fluidically efficient variable restriction ports. In the port of FIG. 1, the variable restriction opens to form a wall attached stream flow along the top of the port surface, continuing smoothly out of the valve opening to provide a coherent and highly structured flow for controlled and rapid mixing and fast flame speeds in the engine. Port structure 1 includes swinging throttle plate 2 mounted on rotating shaft 3 located at the floor of the port in such a manner that there is little flow leakage between shaft 3 and the port floor juncture at 4. The port is shaped so that the sides of the throttle plate 2 (not shown) seal relatively well along the sides of the port as the throttle swings from open to closed position; thus the combination of the top opening throttle and the port forms an airflow opening of variable area at the top of the port. Because of well known fluid inertia effects, flow streamlines past the restriction converge to form the well known vena contracta at 5. At this vena contracta, point 5, flow velocity is very near the isentropic flow velocity corresponding to the pressure drop across the variable port restriction. Stream 6 is attached to the top surface 7 of the port 1 by means of the fluid principle of wall attachment (Coanda effect). (For a detailed explanation of the Coanda effect, see pages 131-139 of FLUIDICS, COMPONENTS AND CIRCUITS, K. Foster and G. A. Parker, Wiley Interscience, 1970).

The principle of wall attachment is important enough that it must be described in some detail here. Basically, a jet entrains flow on both sides. If the jet is near a wall, fluid entrainment generates a reduced pressure on the wall side with respect to the outside of the jet flow. Because of the pressure difference between the wall side and the outside of the jet, the jet flow path curves toward the wall (the jet is sucked towards the wall). As the jet bends toward the wall, the wall pressure becomes smaller, the suction stronger, and in consequence the jet attaches to the wall. This attachment effect is utilized in a number of important digital fluidic logic circuits, for example those invented by Raymond Warren et al., at Harry Diamond Laboratories. The Coanda, or wall attachment, effect is of great importance to the design of the inventor's fluidically efficient variable ports for several reasons. First, a wall attached stream spreads much more slowly than a free jet, so that the kinetic energy in the flow is dissipated much more slowly for a wall attached stream. The slower spreading permits the variable restriction to be placed at a much greater distance from the intake valve opening than would otherwise be possible. Second, a wall attached stream will follow a wall curvature when momentum effects on the stream would otherwise cause separation, and this curve following property facilitates stream control. Third, for the Reynolds numbers characteristic of intake ports, proper passage curvature control permits the jet flow to be controlled so that the wall attached stream can be made to detach from the wall cleanly at a specified point and moving in a specified direction.

Referring again to FIG. 1, the onrushing attached jet 6 rushed past the specially faired port surface in the vicinity of the valve guide at 8 and continues downward to the valve seating surface, where an intermediate curvature at 9 permits the Coanda wall attachment effect to curve the jet to be tangential with the valve seating surface. Thus the jet leaves the passage surface and rushes into the combustion chamber in the form of a still quite coherent high velocity sheet of flow directed to an angle from the valve stem of approximately 45° and with the flow occurring virtually exclusively over less than 180° of the valve face. This flow is oriented to produce both swirl about the engine cylinder axis and a useful axial velocity component for structured flow mixing parallel to the axis of the engine cylinder (not shown).

Flow velocity vectors 10 show a characteristic velocity profile at the point of flow introduction into the engine combustion chamber. Note that the high velocity flow does not extend out to the intake valve, but is thinner. This is important: in order for flow velocity for a fixed volume flow to be increased, the cross sectional area across which the flow occurs must be decreased. Fluidic variable restriction ports permit this without changing valve lifts and without constraining WOT engine performance.

Figure 2A:
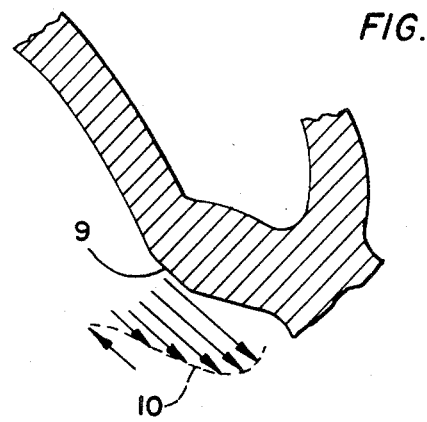
FIGS. 2A and 2B show the velocity distribution around the valve of the port design of FIG. 1.
Figure 2B:
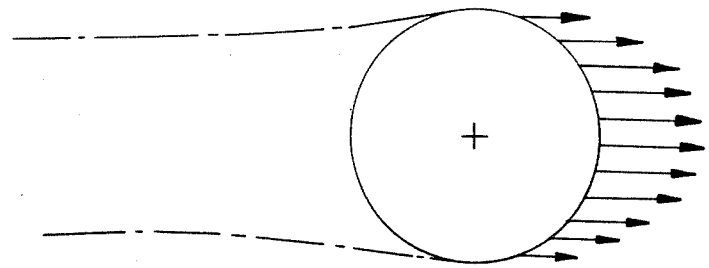

FIGS. 2A and 2B show the velocity distribution around the valve of the port design of FIG. 1, with broken lines in FIG. 2B to show the axis of the port passage. Shaping of the upper surface of this port shape involves a valve guide entry which is difficult to machine and a passage shape somewhat constrained in flow capacity when compared to a racing port design. Other port designs to be discussed later are better for flow and more practical. However, the port shape shown in FIG. 1 is fluidically the simplest of the variable restriction fluidically efficient ports. The port is characteristic of the class of fluidic ports in important ways.

For this port, as with the other fluidically efficient variable ports, the wall attached stream energy decay is sufficiently slow that the restriction can be placed a substantial distance from the valve seating surface from which the flow rushes into the cylinder. The restriction can be, for example, more than 15 cm. from the valve. Also, the variable restriction could be arranged to swing inwardly toward the valve rather than swinging outwardly away from the valve. Also, the variable restriction need not be a swinging throttle, but could be a guillotine type sliding throttle.

Most importantly, the fluidic port design of FIG. 1 characterizes its class in that it permits, by variation of the setting of its variable restriction, variations in the flow structure and flow energy into the engine cylinder. When restricted, the port design produces a coherent and strong flow pattern which will dominate the detailed structured flow patterns, turbulence, and flame speed of the engine. With a fluidic port which produces this controlled and structured intake flow pattern, it is possible to operate a homogeneous charge engine with excellent efficiency, excellent smoothness, and high peak power. For normal driving conditions the engine can operate with such dilute mixtures that the engine produces only trace values of $NO_x$, and with combustion characteristics such that the calibration for minimal $NO_x$ emissions produces optimal or near optimal economy.

This low $NO_x$ performance is very surprising from the point of view of conventional automotive engineering doctrine, and goes against great bodies of previous engineering work. The reasons for the excellent performance of a properly structured and high velocity intake flow involve central matters in the interaction of fluid mechanics with mixing and turbulence, and in the interaction of mixing and turbulence with the physical chemistry of flame stability and NO formation in engines. Many of these matters relating to flame limits and mixing are not well understood in automotive engineering, and are crucial to an understanding of the present invention. Consequently, included here is a detailed discussion of the chemical, statistical, and fluid mechanical matters which make the excellent performance of the present invention possible. Wherever possible, references supporting the central points have been taken from the automotive engineering literature in order to maximize the credibility of the explanations and to put the present invention in its context with respect to other automotive engineering work.

THE PROCESS OF $NO_x$ FORMATION IN ENGINES: EFFECTS OF EQUIVALENCE RATIO AND MIXING

First, an understanding of the mechanism by which $NO_x$ is formed in engines is important in order to understand the effects of stoichiometry and postflame gas heat transfer relations on engine $NO_x$ output.

Figure 4:
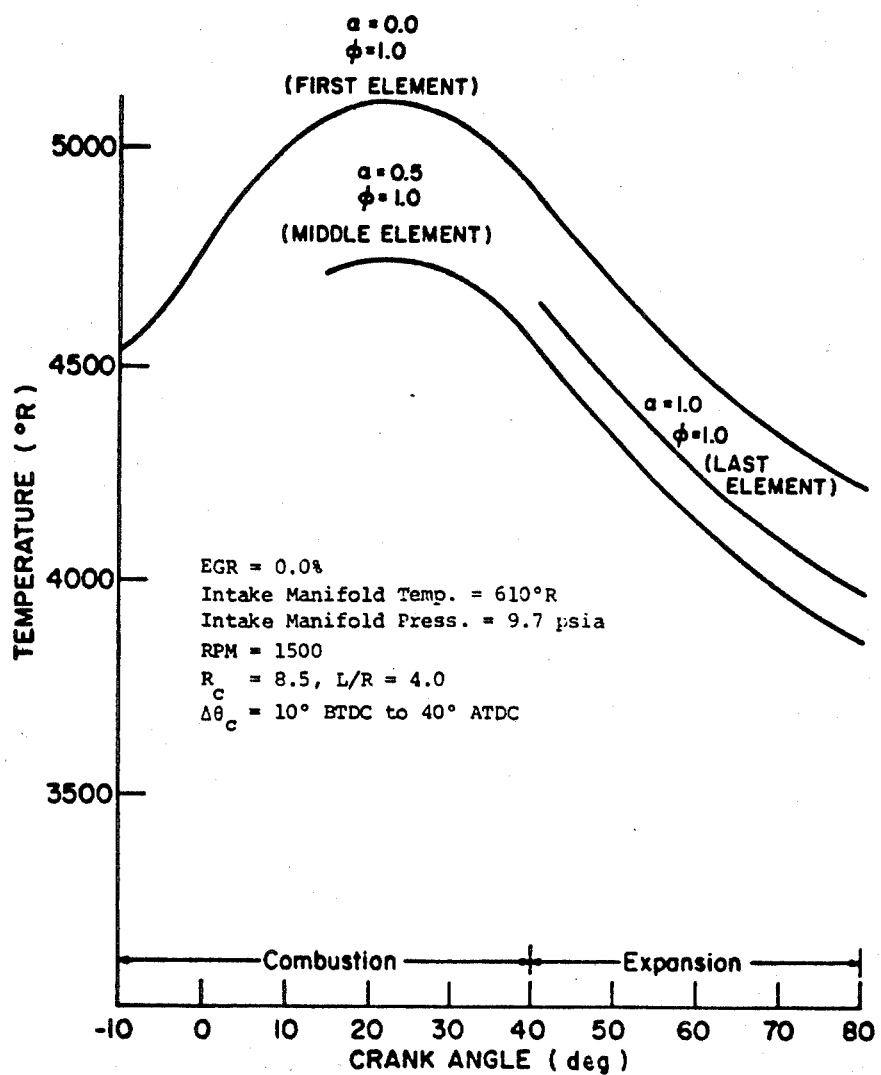
FIG. 4 shows a calculated temperature versus crank angle trajectory for the post flame gases which is relevant to the NO formation process.
Figure 5:
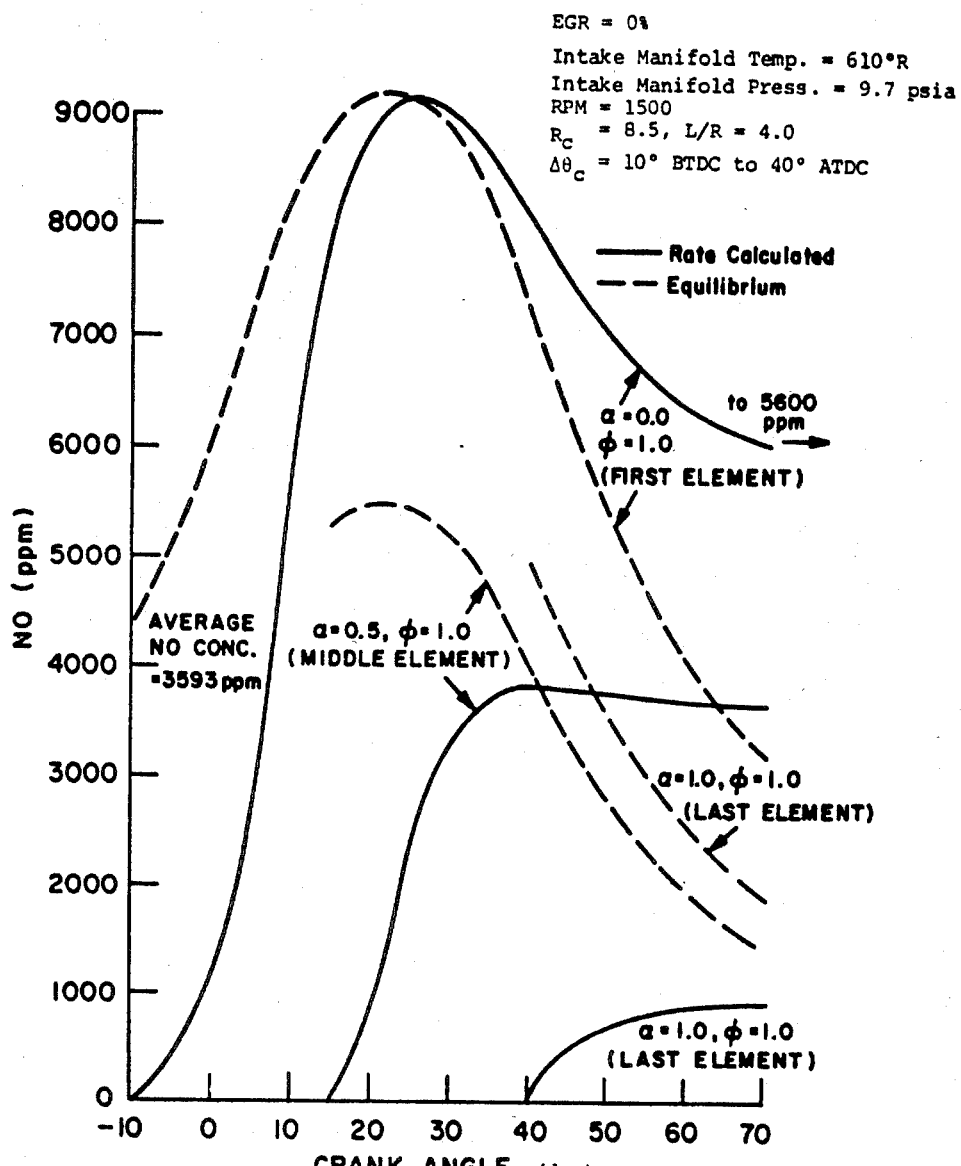
FIG. 5 shows the NO concentrations formed in the elements shown in FIG. 4 as a function of crank angle.

FIGS. 3, 4, and 5 are taken from "NITRIC OXIDE EMISSIONS FROM STRATIFIED CHARGE ENGINES: PREDICTION AND CONTROL," by Paul N. Blumberg, Scientific Research Staff, Ford Motor Company, which was published in March of 1973.

The chemical processes which produce $NO_x$ in engines are different in kind from the processes which generate CO and HC emissions. CO and HC are the result of incomplete combustion (due to local insufficiencies of temperature or of oxygen in the fuel-air mixture). Nitric oxide, on the other hand, is the product of an endothermic reaction at very high temperatures which bonds atmospheric oxygen to atmospheric nitrogen to form NO.

The NO forming reaction is an endothermic reaction which partly depends on the amount of oxygen which is left over after burning the fuel, so that the equivalence ratio of the mixture has an effect over and beyond the effect produced by temperature differences. However, NO formation rates even at peak temperature are slow enough that NO concentrations in any element of gas are only incidentally related to chemical equilibrium, and temperature effects tend to greatly overshadow concentration effects. NO formation is dominated by kinetic reaction rates. These reaction rates are very sensitive to temperature. Relatively small decrements in mixture temperature can produce large reductions in NO formation rates, and therefore produce large reductions in NO output concentrations. Because chemical kinetics of NO formation is so slow, NO formation is not a flame chemistry problem, per se. The NO is formed in the post flame gases.

FIG. 3 (which is also Blumberg's FIG. 3) shows the effect of equivalence ratio and EGR on NO production for a homogeneous charge engine, and is based on an important chemical kinetics model of the NO forming process. For efficient engine operation and CO and HC control, the interesting mixtures are at, or leaner than, an equivalence ratio of 1.0. (Relationships between equivalence ratio and air-fuel ratio are clearly shown on the ordinate of the graph.) For these lean mixtures, NO output levels are dominated by mixture variations which effect flame and postflame temperatures.

For example, on the E.G.R.=0% line, leaning the mixture from an equivalence ratio of about 0.96 produces very sharp decreases in NO output, even though available oxygen increases as the mixture is leaned out, because the leaner mixtures have less internal energy per unit mass and consequently have lower peak flame temperatures and lower temperatures during the power stroke of the engine. As the mixture is leaned out from roughly stoichiometric, peak temperatures decrease because the excess air serves as a diluent, and the thermal capacitance of this excess air lowers peak temperatures. (This dilution reduces temperatures and, therefore, cuts the dissociation of chemical species which otherwise produces a thermodynamic loss in the engine cycle, so that the diluent actually improves the fuel-air cycle efficiency of the engine).

Exhaust gas recirculation (EGR) serves as a diluent and lowers temperatures also because of its "thermal capacitance" (thermal capacitance is defined as mass times specific heat), and except for relatively small variations due to oxygen concentration changes, the effects of air and EGR as diluents are similar for like thermal capacitances. (Flame chemistry and inlet temperature relationships are such that most engines will tolerate more dilution via EGR than with simple enleanment.) It follows that combinations of excess air and residual gas can be used as diluents as well as either alone. in this specification dilute lean combustion will be defined as combustion of a mixture leaner than stoichiometric where the combined effect of the thermal capacitances of the excess air and the residual gases is such that peak flame temperatures and temperature trajectories for the postflame gases are depressed to the point where very little $NO_x$ is produced.

Even for a homogeneous charge engine, the formation of NO is not uniform throughout the charge because the NO formation is an integrated effect from the temperature-pressure-time history of the successive elements of the charge to burn. The $NO_x$ output of an engine will depend to a significant extent on the exact time-temperature-pressure path (kinetic trajectory) of its postflame gas elements, which will depend significantly on the mixing and flow structure of the engine and on spark timing.

FIGS. 4 and 5 (which are also FIGS. 4 and 5 of Blumberg, op. cit.) give as good a description as any two graphs might of the interrelationships of temperature, time, and pressure in the formation of $NO_x$ in an engine. The curves are calculated on the basis of no heat transfer between successive elements of mixture to burn, so that adiabatic relationships can calculate the temperature-time-pressure trajectories which will determine NO formation. The graphs will make clear how sensitive NO formation can be to mixing and heat transfer between successive elements of the postflame gases.

FIG. 4 shows the temperature versus crank angle trajectory for the postflame gases from the first element of (homogeneous) mixture to burn, the middle element of the mixture to burn, and the last element of the mixture to burn. FIG. 5 shows the NO concentrations formed in these elements culated concentrations, which represent the concentrations of No in the postflame elements as a result of past temperature-pressure-time conditions). Engine operating conditions are printed on the figures.

In FIG. 4, look first at the temperature trace of the first element (which begins when the flame passes through this element 10 before top dead center crank angle). After the mixture burns for this first element, successive elements burn in the chamber and increase chamber pressure, adiabatically recompressing these first postflame gases to burn. The consequence is that the temperature of the postflame gases from the first element are higher than the temperature of the initial flame for about seventy crank degrees after the flame has passed. Note also that the peak gas temperature for this element is achieved more than thirty crank degrees after the flame has passed in this calculation.

Temperature trajectories for the middle element to burn and the last element to burn are calculated in the same way and also plotted in FIG. 4.

FIG. 5 shows NO versus crankangle for the temperature-pressure-time trajectories plotted in FIG. 4. The difference between the NO concentration in the first element to burn (5600 ppm) and the NO concentration in the last element to burn (1000 ppm) is dramatic. Lower temperatures and lower high temperature residence times both greatly effect NO outputs.

Although the adiabatic element assumption of Blumberg's model is never entirely valid, the graphs show the relationships between temperature-pressure-time trajectories and NO concentrations and should help clarify the following important points:

1. Variations in heat transfer between successive elements of mixture to burn can change No outputs by changing temperature-pressure-time trajectories. Since NO formation increases with temperature at much more than a linear rate, any such mixing will tend to reduce NO outputs. The detailed effect will depend on the details of the mixing process due to flow structure which determines kinetic trajectories.
2. NO is formed on an element by element basis, and this means that the NO output from an engine operating on a specific fuel-air-residual mixture will depend on the degree of stratification or homogeneity which exists in the cylinder. From FIG. 3 it should be clear that, particularly for lean mixtures, homogeneity is much preferable to stratification both from the point of view of NO formation and from the point of view of efficiency. This point was made in Dr. Blumberg's paper from which FIGS. 3, 4, and 5 come.

The importance of temperature-time-pressure trajectories shown in the above-discussed figures also explains the importance of spark timing and flame speed on the NO results. Dramatic examples of spark timing effects on NO formation will be shown for the ultralean variable structured flow and turbulence engine of the present invention.

It should be clear from a consideration of FIGS. 3, 4, and 5 that mixing is very important in an engine if very low NO outputs are required. For dilute mixtures, any heterogeneity can drastically increase NO levels. Another reason mixing is important concerns flame stability and smooth operation of the engine. With the relatively low quality mixing of prior art engines, satisfactory combustion with the very dilute mixtures required for low NO is almost impossible because of statistical variations in mixture strength from cylinder to cylinder, from cycle to cycle and within the cylinder. It will be shown that flow within an engine is invariably a significantly structured (nonrandom) flow pattern, on the basis of well established automotive engineering data and the inventor's data. Automotive engineers commonly do not understand and cannot visualize the important effects flow structure has on the actual mixing phenomena in an engine cylinder. Since the operability of the present engine hinges on these effects, they must be explained.

TIGHT STATISTICS PERMIT STABLE OPERATION WITH MORE DILUTE MIXTURES

FIG. 6 gives a graphical explanation of how improved mixing within the combustion chamber can widen the equivalence ratio or dilution limits which permit stable combustion inside an engine. This statistical argument is at the very core of the conceptual background of the present invention but it involves statistical arguments which are difficult to visualize. FIG. 6 is an illustration of a statistical numerical example of the argument, and is intended to clarify an argument which is otherwise hard to follow. FIG. 6 illustrates variations in a hypothetical engine where the gross air-fuel-residual ratios from cycle to cycle are invariant but where the mixing inside the cylinder is less than perfect.

Experimentally, the inventor has shown that homogeneous engine operation with mixtures as lean as 0.55 equivalence ratio is possible, but for the purpose of the graphical example of FIG. 6, suppose that if the mixture within the spark plug gap is leaner than 0.55 equivalence ratio at the time of sparking, misfire will infallibly occur (this is a worthwhile oversimplification for the present purpose). As engines currently operate, the transition between steady firing and misfire is not abrupt—misfire is defined statistically, with a misfire frequency above a certain frequency scored as unacceptable. A 1% misfire rate is often used to define the misfire limit. (For detailed discussions of these matters, see "Lean Combustion and the Misfire Limit in Spark Ignition Engines" SAE paper 741055 and "What Limits Lean Operation in Spark Ignition Engines—Flame Initiation on Propagation" SAE paper 760760, both by Ather A. Quader of General Motors Research Laboratory.)

(Here, in addition to the misfire limit, a partial burn limit is defined; but partial burn need not concern us at this point in the discussion.) It should be clear that the mixing quality of the mixture, as measured by the statistical distribution of small charge element equivalence ratios about the cylinder mean equivalence ratio, will affect the misfire rate for any given cylinder mean equivalence ratio. Very much leaner overall equivalence ratio operation will be tolerable vis-a-vis misfire if the statistical uniformity of the mixture is much increased.

See FIG. 6. Curves A, B, and C are plotted as gaussian distributions, and the plots are for such small sample volumes (for example, cubes 1 mm/side, which is about the volume in the spark plug gap at ignition time) that the distributions can be taken as continuous distributions. The integrals under curves A, B, and C are equal. Curve A has a mean equivalence ratio of 0.75 equivalence ratio, but has a standard deviation of 0.1 equivalence ratio for its distribution. Under the assumptions of FIG. 5, this mixture distribution A will misfire in the engine 2.25% of the time: mixture quality A can be said to be at its lean misfire limit at a ratio somewhat richer than 0.75 stoichemetric. The standard deviation of the mixture plotted on curve B is half the standard deviation of curve A, or 0.05 E.R. A 2.5% misfire rate for distribution quality B occurs at an overall equivalence ratio of 0.65 stoichemetric, and so an engine with mixing such as that shown for curve B will have a misfire limit slightly richer than 0.65 equivalence ratio.

Curve C is shown with a standard deviation of 0.01 E.R., and with the overall equivalence ratio of the mixture at 0.585. This mixture is much leaner than that of curve A or curve B, but because of its tight mixing statistics, a mixture leaner than 0.55 E.R. will occur in the spark gap less than one tenth of one percent of the time. Mixture distribution C, with its mean at 0.585 stoichemetric, will have a misfire rate twenty-five times less than the misfire rate distribution A even though A has a mean equivalence ratio of 0.75 E.R., and distribution C will also have a misfire rate only one twenty-fifth as great as that of distribution B with its ratio of 0.65 stoichemetric. Better mixing (tighter statistics) than that shown in curve C would permit the misfire limit to be approached even more closely. Tightening mixture distributions in the cylinder permits a much closer approach to the ultimate physical misfire limits in an operating engine. Operation with these much more dilute mixtures produces dramatically reduced NO emissions, and if turbulence is right, engine efficiency is increased simultaneously.

The argument of FIG. 6 was addressed to an engine where cycle-to-cycle and cylinder-to-cylinder statistical variations in mixture quality were negligible. However, an exactly symmetric argument, easily visualized by reference to FIG. 6, exists showing that statistical variations of cycle-to-cycle or cylinder-to-cylinder mixture quality will limit the mixture dilution tolerable with respect to engine operation even if in-cylinder mixing were perfect on each cycle. Tight control of cylinder-to-cylinder, cycle-to-cycle, and microscale mixing statistics are all necessary conditions (none of which is sufficient in itself) to stable operation with the very dilute mixtures required for efficient low $NO_x$ engine operation.

The statistical argument illustrated in FIG. 6 is very fundamental to the function of the present invention. Although the illustration is oversimplified (for example, air-fuel-residual fraction proportions rather than just air-fuel ratios effect misfire), the oversimplifications do not change the principle. For best torque spark timings, misfire occurs primarily because of inadequate combinations of air-fuel-residual adjacent the spark gap at sparking time, and as the spatial distribution of chemical species in the cylinder becomes more and more uniform, the overall chemical ratios in the cylinder can approach the limiting conditions more and more closely. The inventor's data shows that this extension of combustion limits permits $NO_x$ outputs far below any proposed $NO_x$ standard to be achieved with excellent fuel economy.

A consideration of FIGS. 3, 4, 5, and 6 should make it clear that mixing of fuel-air and residual are important for engine operation and NO levels, and also that flow structures which effect heat transfer relations between adjacent elements of postflame gases can effect $NO_x$ outputs. These points are significant to the present invention, which produces rapid and controlled mixing which permits very dilute combustion and produces very efficient and low $NO_x$ operation with dilute mixtures.

RELEVANCE OF MIXING

The fluid mechanics of mixing in the engine must be understood for the function of the present invention to be understood.

Turbulent fluid mechanics as it is conventionally taught is an extremely forbidding subject, and the study of mixing in turbulent flows is a relatively complicated part of turbulence theory. It is not unfair to say that the in-cylinder fluid mechanics governing mixing inside cylinders is dismissed by the bulk of the automotive engineering profession as too complicated to consider. It is also fair to say that automotive engineers do not understand the way flow structure and turbulence interact in engines to produce mixing. Particularly, automotive engineers commonly do not understand the fact that the reproducible flow structure, which is the same from cycle to cycle and on which the random fluctuations of turbulence is superimposed, is at least as important as turbulence in eliminating any vestiges of charge stratification in the cylinder.

When the inventor commenced work on improving mixing in cylinders many years ago, he was convinced on the basis of detailed physical arguments and analogies with other mixing systems that mixing in conventional spark fired engines was inadequate for efficient dilute combustion. These arguments involved order-of-magnitude calculations which were admittedly inaccurate, but estimated magnitudes were persuasively large. These arguments were not obvious to a conventional automotive engineer, and indeed would have been considered unacceptable. Order-of-magnitude arguments are not considered an adequate basis for action in automotive engineering.

However, during the time that the inventor has been perfecting his invention, some very detailed measurements on turbulence inside engines have been undertaken using hot wire aenemometry and sophisticated data processing techniques. This data has made it possible to show mathematically how slow turbulent mixing per se is in engines, and also to show that structured turbulent flows can and do exist inside the combustion chamber.

MODELLING OF TURBULENT DIFFUSION IN CONVENTIONAL ENGINES

Probably the best work in this field of in-cylinder turbulence and flow measuring has been done at the General Motors Research Laboratories, and is reported in two SAE papers, "Effects of Engine Variables on Turbulence in a Spark-Ignition Engine" by David R. Lancaster, SAE paper 760159, and "Effects of Turbulence on Spark-Ignition Engine Combustion" by David R. Lancaster, Roger B. Krieger, Spencer C. Sorenson and William L. Hull, SAE paper 760160. This work was done on a standard split head CFR research engine. Another piece of work which produces very relevant evidence with respect to in-cylinder mixing rates was done on a basically identical split head CFR, permitting direct confirmation of mixing quality from the turbulence levels measured by Lancaster and associates. This work is "Cloud Combustion A Study of Performance and Emissions," an unpublished M.A. thesis in Chemical Engineering done by George A. Oliver at the California Institute of Technology, June 4, 1973.

With data from Lancaster's SAE paper 760159, one can show quite strikingly that mixing due to turbulent diffusion alone is very inadequate to produce homogeneous mixtures in the cylinder. In light of the argument related to FIG. 6, this is a crucially important point. Using the reference cited by Lancaster for calculating turbulent diffusion coefficients (Hinze, J. O. *Turbulence* McGraw Hill, New York, 1959 p. 361), we find that the turbulent diffusion coefficient E equals $$\epsilon_{Pt=\infty} = \mu' \Lambda_e$$

where
 $\mu'$ = root means square turbulent fluctuating velocity
 $\Lambda$ = integral turbulence scale $\cong 4 \times$ microscale spatial length Using the data of Lancaster's SAE paper 760159 cited on Page 13, the turbulent diffusion coefficients characteristic of his engine operated with a conventional inlet valve at 1200 RPM is 3.53 m²/sec. From the same source, the turbulent diffusion coefficient characteristic of 1200 RPM operation with a tangentially oriented shrouded valve is $15.2 \times 10^{-3}$ m²/sec. At 1200 RPM there are 50 milliseconds for the intake and compression stroke.

the CFR engine combustion chamber is a disk with varying thickness as the piston moves. For this reason, a two dimensional mixing model can be used to model the mixing process in the engine. Species diffusion calculations, which are exactly analagous to thermal diffusion calculations, are best modelled by computer using the finite element technique well known to the engineering arts. An associate of the inventor, Kenneth Kriesel, made a computer model of the turbulent diffusion process in the engine, assuming only turbulent diffusion, using the computation program of Professor Glenn Myers of the University of Wisconsin.

CONVENTIONAL ENGINE TURBULENT DIFFUSION SLOW

FIG. 7 shows the initial condition for the calculation. For reasons of computational simplicity, the initial conditions were set up so that all of the fuel was introduced in a pie shaped disk 11. The model then proceeded for the fifty millisecond modelling time.

FIG. 8 shows the concentration gradients resulting using the diffusivity calculated from Lancaster's data for the nonshrouded valve case (this turbulent diffusivity should be close to the turbulent diffusivity of a conventional production engine operation at 1200 RPM). After the 50 milliseconds concentration variations of $\approx 84:1$ still persist inside the cylinder.

FIG. 9 shows the concentration gradients resulting using the diffusivity calculated for the shrouded valve case (a diffusivity substantially higher than that typically seen at 1200 RPM in a production engine). For this case concentration variations of $\approx 4.6:1$ still persist in the cylinder after the intake and compression stroke are completed.

It is clearly true that the modelling process used is not perfect, and that the initial condition heterogeneity was worse than would occur in any engine practice. However, even changing diffusivities by factors much beyond any that are consistent with Lancaster's and other's measurements, the conclusion is still inescapable that turbulent mixing per se in engines as far from adequate to produce true homogeneity in the cylinder at ignition time.

Turbulent diffusion, in itself, is not nearly fast enough to produce adequate combustion in engines, particularly when the volume of residual gas which must be mixed with the incoming charge is large, or if the mixture inducted is in some way stratified as it usually will be if liquid phase is present. However, certain kinds of flow structures can increase mixing rates by extraordinarily large factors, while other flow structures can have little effect on mixing. An understanding of the interaction of flow structure and turbulence is vital to practical mixing in engines. So far as the inventor is aware, this vital interaction has not been clearly understood previously in automotive engineering.

FLOW STRUCTURE RADICALLY EFFECTS MIXING

FIGS. 10, 11, 12, 13, 14, 15, and 16 show that mixing, in a well defined statistical sense, can occur in totally laminar flows in the absence of diffusion, producing a close and predictable geometrical relation between the fluids to be mixed. The structured flow will produce a structured distribution of the different fluids, and in this way the mean distances over which turbulent and molecular diffusion will have to act can be dramatically reduced. For the idea for FIGS. 10–16, I am indebted to T. M. McKelvey (Page 299 *POLYMER PROCESSING*, John Wiley & Sons, 1962). Mathematically, it can be said that the flow structure will geometrically transform all the points in a concentration fluid in a determinate way as a function of time, and is a one-to-one transform function.

FIG. 10 shows the velocity distribution about the radius of an irrotational flow vortex. Irrotational vortices are among the most common flow patterns in nature (whirlpools, turbulent vortices, tornados, hurricanes, etc.) and there is evidence for the existence of a large irrotational vortex in the inventor's engine data. In an irrotational flow vortex, the fluid angular momentum, mvr, is constant at any radial distance from the center of the vortex. For a velocity at any radius $V_r$, the tangential velocity equation is $V_r = r_0/r \, V_o$, where r is radial distance of the fluid element from the vortex center, $r_o$ is the outside radius of the vortex, and $V_o$ is the tangential velocity characteristic of the fluid at radius $r_o$.

FIG. 11 shows an irrotational flow vortex where a line of mixant has been introduced instantaneously. FIG. 12 shows how the structured flow of the irrotational flow vortex has stretched out the mixant, assuming zero turbulence and zero molecular diffusivity, in the time required for the outside of the vortex to rotate 90°. The flow stretching occurs because the angular velocity of an element in the vortex, varies as $\theta_r = r_o \theta_o / r^2$. It is important to notice that this flow stretching is important for mixing but that it does not involve any randomness at all.

Figure 14:
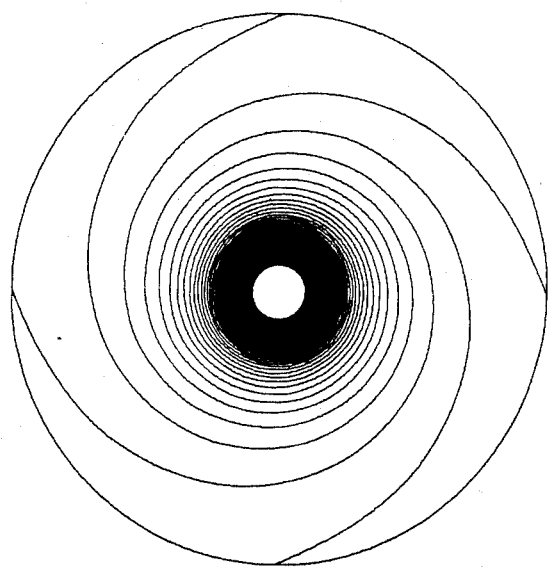

FIG. 13 shows an irrotational vortex analagous to the vortex of FIG. 11, wherein four perpendicular radial lines of mixant have been introduced instantaneously. FIG. 14 shows how the structured flow of the irrotational flow vortex has stretched out the mixant, again assuming no diffusivity, after the outside edge of the vortex has rotated 90°. It should be noted that much more than 90° outside rotation should be expected under engine conditions.

Clearly, there are structured flows which stretch out fluid elements in such a way as to greatly increase interfacial area and much reduce the mean distances over which turbulent and molecular diffusion must act. However, other structured flows have little or no such effect.

FIG. 15 shows the velocity distribution for a rigid body fluid rotation to show a flow structure which does not mix. Rigid body flow rotation has been shown to exist in a number of engines (See, for example, "Measurement of Air Movements in Internal Combustion Engine Cylinders," by M. Horvatin and A. W. Hussman in DISA INFORMATION FF 8, July 1969) and is the flow model generally used to model swirl in internal combustion engines. FIG. 16 shows a radial line of mixant introduced instantaneously in the rigid body fluid rotation. Since the angular rotation of the fluid elements is the same for each radius, rotation does not produce stretching or redistribution of the fluid concentration structure for the rigid body rotation case. FIG. 16 will serve as a picture of the mixant distribution after any integral number of revolutions of the solid body fluid rotation, just as surely as a stripe on a wheel would appear the same after n revolutions. Clearly, solid body fluid rotation is of no use to the mixing process.

Many structured flow patterns more complex than those shown exist. In general, those which produce large local velocity gradients in the cylinder will be useful for mixing in an engine.

The interaction of flow structure and turbulence in engines is of very great importance if homogeneity is to be achieved. By decreasing the distance over which turbulent diffusion (and on a smaller scale, molecular diffusion) will have to act, structured flow can homogenize a fluid mass very quickly. Fundamentally, this is because the rate at which turbulence destroys heterogeneity goes as the inverse square of the distance over which the diffusion must act. The differential equation for turbulent diffusion is as follows:

$$N_a = -D_v \frac{\partial c}{\partial s}$$

$N_a$ = diffusion rate at a point
$c$ = concentration
$s$ = distance  (Perry's Handbook 14.4)
$D_v$ = diffusivity If a flow structure cuts the distance across which diffusion must act threefold, the concentration gradient in the fluid increases by threefold, and mixing rates increase by a factor of three on this account. But the distance across which the diffusion must occur is also cut threefold. This means that the mass flow across any plane which must occur to equalize concentrations is also cut threefold. The mass flux effect and the gradient effect are multiplicitive, so that cutting the mean distance across which diffusion must act threefold cuts the time required for equalization three times threefold, or ninefold.

If the mean distance across which diffusion must occur had been cut tenfold, the time of mixing to produce a set level of homogeneity would have been cut a hundredfold. With this inverse square mixing rate in mind, another look at FIGS. 10–16 should convince the reader that flow structures within an engine cylinder can have overwhelmingly large effects on the mixing quality achieved by ignition time.

Even though an exact calculation of the convolutions of the structured flow and the nature of the turbulent flow field is essentially never possible in an engine, an understanding of this interaction between flow concentration stretching structured flows and turbulent mixing is of very great importance. Variations in flow structure from engine to engine can make very great differences in the mixture homogeneity of the engines. Many of the unpredictable "driveability" variations from combustion chamber to combustion chamber are probably due to variations in in-cylinder mixing rates due to variations in flow structure.

STRUCTURED FLOW EXISTS IN ENGINES AND CAN HAVE DOMINANT EFFECTS ON MIXING

Flow inside any reciprocating piston engine must involve a definite flow structure for basic physical reasons. All the fluids in an engine have inertial mass, and the velocity of the flow into the engine combustion chamber through the intake valve(s) is always much greater than the velocity of the center of mass of the gases in the cylinder. The center of mass of the fluid inside the cylinder moves generally at less than half of piston velocity. For conventional engines as presently produced, the mean inlet velocity is generally more than nine times piston velocity. The ratio of the inlet mean velocity to the in-cylinder charge center of mass velocity is, therefore, more than 18 to 1. In terms of momentum fluxes, this means that the intake flow will have to produce some sort of ordered swirling motion whereby the fluid momentum can be contained in the cylinder as the momentum of the flow is dragged down by interactions with the cylinder, head, and piston surfaces. The swirling motion need not be what automotive engineers call swirl, which is rotation of the whole charge about the axis of the cylinder, but may for instance involve a system of larger and smaller vortices and flow paths, with significant flows parallel to the axis as well as perpendicular to the axis of the cylinder. The momentum of the fluid will not instantly disappear as it enters the cylinder: therefore, some ordered flow inside the cylinder has to happen. Because the basic inertial input conditions will be nearly identical from cycle to cycle, the gross flow pattern in the cylinder, which is dominated by nonrandom inertial and pressure effects, will be nonrandom, too. A good way of thinking about the flow inside the cylinder is as a convoluted three dimensional hydrodynamic "dance" which will be dominated by the reproducible intake flow conditions and will, therefore, be much the same from cycle to cycle. Superimposed on this large scale hydrodynamic "dance" will be the more or less random perturbations of turbulence.

The concept of a structured flow on which turbulent fluctuations are superimposed is an uneasy one for most automotive engineers. Fortunately, Lancaster in SAE paper 760159 measured the flow inside a motored engine with both a shrouded and unshrouded intake valve, and definitely showed a pronounced flow structure for both engine cases. Since the concept of a structured turbulent flow is central to an understanding of the function of the present invention, and since the concept is solidly established by means of the work of Lancaster et al., so that it is no longer a matter of conjecture, the data of SAE paper 760159 needs to be considered in detail here.

The following figures are taken from Lancaster's SAE paper 760159. FIG. 17 (Lancaster's FIG. 3) shows the layout of the hot wire aenemometer sensors on the CFR split head used in the experiments (shown with the shrouded valve installed). FIG. 18a, 18b, and 18c (Lancaster's FIGS. 4a, 4b, and 4c) shows the relationship between the engine cycle (18a) the hot wire signal of instantaneous velocities (18b); and the separation of the hot wire signal averaged for many cycles into a mean velocity trace and RMS turbulent intensity trace corresponding to turbulent fluctuations superimposed on the mean flow. The ensemble averaged mean velocity shown in FIG. 18c is the result of averaging digitized degree-by-degree velocities for 100 successive cycles. Any average over 100 cycles will strongly smooth out random fluctuations. Therefore, the very sharp peaks and valleys of the mean velocity curve in FIG. 18c are extremely conclusive evidence of a structured flow within the cylinder charge. It should especially be noted that the mean velocity component of the fluid motion is very much greater than the turbulent fluctuations superimposed upon it. The kinetic energy of the flow is dominated by the hydrodynamic "dance" described above. The hydrodynamic dance is caused by basic inertial physics.

Lancaster's very commendable paper shows similarly conclusive evidence for structured flow from the nonshrouded intake valve characteristic of conventional production engines. FIG. 19 (Lancaster's FIG. 5) shows the ensemble averaged mean velocity and turbulence intensity characteristic of the nonshrouded valve under the same operating conditions as those of the previous figures (1500 RPM, 50% volumetric efficiency, 8.72:1 compression ratio). Note again that the mean velocity is much greater than the turbulent fluctuations imposed upon it. However, in FIG. 19, note how much smoother the mean velocity curve characteristic of the nonshrouded valve is: this indicates that the velocity gradients within the flow are less in this case, so that mixing ought to be much less. The data of George Oliver will be shown to prove that the mixing, in fact, is much less for a nonshrouded valve than for a shrouded valve.

Other data from Lancaster's paper strongly reinforces the idea of the flow inside the cylinder of an engine during the intake and compression stroke as a hydrodynamic "dance" with random turbulence superimposed on the very nonrandom mean flow pattern. FIG. 20 (Lancaster's FIG. 6) shows effects of engine speed on ensemble averaged mean velocity with the shrouded intake valve. The similarity of the flow structure (hydrodynamic dance) from engine speed to engine speed is striking. FIG. 21 (Lancaster's FIG. 7) shows the effect of engine speed on the ensemble averaged mean velocity for the nonshrouded intake valve case. Again, the similarity of the hydrodynamic dance from speed to speed is striking.

FIG. 22 (Lancaster's FIG. 8) shows the effect of changing volumetric efficiency on the ensemble averaged mean velocity with a nonshrouded intake valve for a set engine speed. The shape of the mean velocity is much the same from one throttle setting to another. FIG. 23 (Lancaster's FIG. 9) shows the effect of volumetric efficiency changes on ensemble averaged mean velocity for the shrouded valve for a set engine speed. Again, the concept of a basically reproducible and stable hydrodynamic dance is very strongly supported.

A comparison of FIG. 18c and FIG. 19 shows clearly that the velocity gradients of the flow structure in the cylinder are significantly greater with the shrouded than with the unshrouded valve case. Consequently, mixing of the shrouded valve engine must be much better than that with the unshrouded valve case. The work of George Oliver very strongly shows this mixing difference, and gives vivid demonstration of just how heterogeneous the charge inside an engine with a nonshrouded valve can be (Cloud Combustion, A Study of Performance and Emissions, M. A. Theses, Chemican Engineering Department, California Institute of Technology, June 4, 1973). Oliver's work was done on an engine essentially identical to the engine for which Lancaster took his flow structure and turbulence measurements. Oliver ran an engine where the mixture in the intake passage was stratified by means of gas injection into a long intake tube. Since on a one-cylinder engine, flow in the intake passage occurs only about one quarter of the time, injecting the fuel (propane) continuously at a specific length away from the intake in the intake tube assured that most of the fuel would enter the cylinder as a plug (with fuel smeared out due to the fact that a quarter of the fuel was injected with the gas column moving, and also smeared out because of viscosity effects). Running this engine with a shrouded valve showed that the combustion performance of the engine was insensitive to this intake stratification. However, with a nonshrouded valve, Oliver's data shows an extremely marked combustion effect due to stratification in the intake passage. Oliver's data strongly shows that mixing in the cylinder was sufficiently slow that a definite charge stratification in the cylinder existed at ignition time because of intake flow stratification. Oliver's data is, therefore, evidence both for definite and reproducible flow structures in the engine and for the relatively very slow mixing characteristic of nonshrouded valve conventional intake geometries. For basic physical reasons (because the mixing events in-cylinder are dominated by intake induced flows) there is strong reason to expect that mixing in conventional engines as they are currently built is much like that in Oliver's engine. For this reason, conventional engines require much richer mixtures than would otherwise be necessary (for reasons explained graphically in FIG. 6).

A high swirl flow inside an engine does not necessarily mix well, as the description of FIG. 15 points out. It should be pointed out that flows from swirl ports quite frequently do produce a flow which is very close to rigid body charge rotation. Data showing this beyond question was presented in "Measurement of Air Movements in Internal Combustion Engine Cylinders," by M. Horvatin and A. W. Hussmann in DISA INFORMATION, #8, July 1969. FIGS. 24 and 25 are Horvatin and Hussmann's FIG. 5. FIG. 24 shows the cup in piston and cylinder design of the diesel engine tested. FIG. 25 shows positions of hot wire aenemometer sensors in the cylinder head, and shows shadow lines showing the shape of the intake and exhaust ports. FIG. 27 is Horvatin and Hussmann's FIG. 7, showing the measured flow pattern in the cylinder head 10 mm. below the cylinder head. The FIG. 27 contains its own explanation: note particularly how closely the flow pattern during the intake and compression stroke resembles rigid body rotation. This flow pattern which approximates rigid body rotation is characteristic of a number of swirl ports, and does well with a diesel engine. However, it is very bad for mixing during the intake and compression stroke.

It is expected that the FIGS. 3-27 have explained that mixing and structured flow are important in engines, shown how different flow structure have very different mixing properties inside combustion chambers, and shown that different engines have flow structures having very different mixing properties. These are points which have not been clearly understood by the automotive engineering fraternity, and points which are most important to the function of the present invention.

STRUCTURED VORTEX FLOW WITH PRESENT INVENTION ENGINE

At this point, a competent automotive engineer should be able to appreciate the strong evidence for an irrotational flow vortex much like that shown in FIG. 10 in the inventor's test engine, shown as a photographic reproduction as FIG. 28. This photograph shows the deposit pattern on the flat top piston used with the engine for which much data will be included in this application. The deposits were caused by an oil control problem not related to the present invention. The same deposit pattern occurred on several engine teardowns. The very clear deposit pattern on the piston top, as a result of some hours of engine operation, shows vividly that there was a structured flow inside the combustion chamber. A knowledge of fluid mechanics permits the pattern to be clearly interpreted: the accumulated deposit at 13 and the spiral pattern in toward this center is characteristic of the boundary layer flow of a surface perpendicular to the axis of an irrotational flow vortex. This boundary layer flow occurs because of a depressed pressure in the center of an irrotational flow vortex. Within the boundary layer, velocities are sufficiently low that centrifugal force is relatively much less significant than outside the boundary layer, and consequently, oil in the boundary layer is sucked into the low pressure center of the vortex, where it evaporates. A conventional rigid body rotation vortex has a much weaker pressure depression in its center, and would not produce this pattern. The deposit markings of FIG. 28 are conclusive evidence of a strong irrotational velocity component in the flow structure inside the engine's combustion chamber. In light of the mixing structure produced in irrotational flow vortices and illustrated in FIGS. 10, 11, 12, 13, and 14, it is clear that mixing, at least within the volume of the large vortex inside the engine's cylinder volume, must be very complete. Other evidence substantiates that the mixing inside this engine of the present invention was indeed excellent.

EVEN WITH PERFECT MIXING, TURBULENCE IS REQUIRED AT IGNITION TIME FOR FLAME SPEED

Excellent mixing is required to consistently burn the very dilute mixtures required for ultralow $NO_x$ emissions without catalytic reduction of $NO_x$. However, for the resulting combustion to be commercially useful, combustion duration must be fast enough. With conventional production engines, the dilute mixtures required for low $NO_x$ burn so slowly that the thermodynamic losses due to late heat addition overshadow the theoretical cycle advantages of dilute combustion. This is a large part of the reason why the idea that there is a fuel consumption penalty associated with dilute combustion has become entrenched. However, the speed at which a mixture is burned in an engine is not a simple function of concentration of fuel, air, and residual gas. In conventional engines, flame speed for a set air-fuel ratio varies by about a factor of eight for a ten to one variation in engine speed. The reason is that flame speed depends on turbulence.

The best work on this flame speed versus turbulence relation is probably "Effects of Turbulence on Spark-Ignition Engine Combustion" by David R. Lancaster, Roger B. Krieger, Spencer C. Sorenson and William L. Hull, SAE paper 760160. In this paper, the flow and turbulence measurements of Lancaster's SAE paper 760159 are applied to flame speed. The most important result of this paper is reproduced as FIG. 29 (SAE paper 760160's FIG. 15) which plots the flame speed ratio $$\frac{\text{Turbulent flame speed}}{\text{Laminar flame speed}}$$

versus the root mean squared turbulence intensity. It is important to point out that this turbulence intensity is the root mean square value of the random fluctuations from the flow mean velocity, and would correspond to the "intensity" line of FIG. 18c.

FIG. 30 (FIG. 17 of SAE 760160) shows the correlation Lancaster and associates found between the flame speed ratio (of turbulent to laminar flame speed) and the inlet flow velocity (which was proportional to RPM). The conclusion of Lancaster et al. vis-a-vis FIG. 30 was that for a set engine geometry, flame speed correlated with inlet velocity.

The correlation between flame speed and inlet flow velocity means that in order to increase the flame speed ratio to compensate for the slower laminar flame speed of very dilute mixtures, the area through which the inlet flow comes into the combustion chamber must be decreased. For a fixed cam timing conventional engine, this requires that peak engine flow capacity be restricted, but of course this power-flame speed trade-off goes away if the inlet flow restriction is variable.

TIGHT STATISTICS AND CONTROLLED STRUCTURED FLOW MAKE EFFICIENT LOW $NO_X$ ENGINE POSSIBLE

The matters which have been discussed concerning NO formation, mixing, and flame speed are complex and interrelated. The conceptual complexity becomes greater when the problem of producing mass producible engine hardware is fully understood. It is therefore not surprising that the automotive industry has decided (and frequently testified under oath) that very low NO operation with a homogeneous charge engine is impractical without catalytic reduction of NO, or at least substantial performance penalties.

However, it is in fact possible to achieve ultralow $NO_x$ outputs and excellent performance with a homogeneous charge engine format. This is accomplished according to the present invention by producing an engine which combines the following: (1) a very dilute fuel-air mixture, (2) very tight cycle-cycle and cylinder-cylinder mixture statistics to each cylinder, (3) a variable and highly structured intake flow pattern which produces sufficient turbulence for rapid flame propagation with very dilute mixtures. An engine with these attributes in combination will have both extremely low NO emissions and excellent fuel economy, as data in this application will show. With the intake flow controlling restriction a variable restriction, and with full power mixture enrichment, this very low emission operation is completely compatible with outstanding peak engine power for the relatively rare times when peak engine power is required of an automobile engine. Also, the controlled flow structure and turbulence permits the low $NO_x$ operation to be achieved with excellent engine smoothness.

It is important to emphasize that the structured flow patterns's mixing function and the structured flow's combustion turbulence generating function are distinct. The mixing statistics and the detailed mixing stratification function in space inside the cylinder are the result of the history of the flow, including all the details of mean flows and turbulence, up to the instant in time where the mixture state is considered. Mixing is the effect of turbulence and flow structure integrated over time. The turbulence which determines the turbulent to laminar flame speed ratio (and therefore the actual flame speed with a set ratio of fuel, air, and residuals) is the turbulence actually present at combustion time.

The detailed fluid mechanics during the entire intake and compression stroke is important for mixing. Only the fluid patterns actually existing during combustion time are important in determining turbulent to laminar flame speed ratios. This is an important distinction in comparing the present invention with other means of increasing flame speed (for example, air jets from auxiliary pistons and squish pistons) which may have large effects of flame speed and yet operate with much less tolerance for dilute mixtures because of inferior mixing.

DETAILS OF FLOW GEOMETRY CRITICAL FOR MIXING, TURBULENCE, AND STABILITY

Another issue with respect to turbulence is of very great importance. The rate at which flow kinetic energy decays to heat (internal energy) varies drastically from flow geometry to flow geometry. For properly designed intake port passage shapes, flow patterns are such that the flow energy past a variable port restriction organizes itself in a fashion such that differential velocities between adjacent fluid elements are minimized, with smooth velocity gradient variations. Under these conditions, significant fractions of the pumping energy flowing past a variable restriction can be organized in such a way as to generate flow patterns in the cylinder which produce very excellent mixing, and the flow energy in these patterns can decay into turbulence slowly enough so that large amounts of turbulence are available to facilitate combustion at and after ignition time. A number of such shapes will be disclosed in the present application. However, such flow structuring is not particularly likely to happen by accident: many flow geometries involve such rapid decay of flow kinetic energy to fine grain turbulence that they are effectively useless for mixing and increasing flame speed at combustion time, since the vortices are too small scale for large scale mixing, and decay too rapidly to assist combustion. Other flow geometries are only marginally useful.

The inventor has spent a considerable amount of time with hot wire aenemometry steady flow setups investigating flow in a cylindrical passage downstream of an engine cylinder head investigating various variable restriction inlet flow geometries. The inventor was most surprised to find that the flow energy from a number of variable restriction inlet geometries decayed so fast that, with these geometries operated with signficant restrictions, turbulence in the cylindrical channel about 10 cm. downstream of the head was less intense than the turbulence which occured without the restriction using a conventional nonshrouded intake valve (these tests were conducted for the most part on a modified 350 CID Chevrolet cylinder head). Unless the flow geometry is correct, a variable restriction intake port can be useless or worse than useless.

In addition, there are inlet flow geometries which produce useful results if shapes are exactly correct, but which produce bad results with only very small changes in passage shaping, so that they are impractical to manufacture. Moreover, even for basically good geometries, certain shaping issues are critical if the variable restriction intake port passage is to operate properly.

To think about the fluid mechanical effects relevant to controlled structured flow via variable restriction intake port geometries an automotive engineer will have to turn to studies foreign to conventional automotive engineering, and particularly to the study of fluidics.

NECESSARY FLUIDICS BACKGROUND

Fluidics is a field which applies fluid mechanics to information handling. The development of fluidics has greatly advanced the development of the conceptual tools required to think about structured turbulent flows. The inventor was primarily instructed in fluidics by Raymond Warren, one of the founders of the field. The conventional fluid mechanical training taught to engineers generally treats turbulent flows as predominantly random: in fluidics it is shown that, if the passage shaping relationships are right, reproducible flow patterns such as wall attached streams and stabilized vortices can dominate the flow, with the smaller order turbulence of much secondary importance. Applying the fluid mechanical effects used in fluidics to intake ports is not a trivial exercise: problems arise due to the manufacturing variations to be expected of intake ports, and due to the fact that an intake port is a three-dimensional flow passage much constrained in shape both at its inlet and outlet, and a flow shape where flow restriction of the passage is important. Moreover, essentially all fluidic devices have fixed geometry, and the variable port restriction geometry varies. However, an understanding of fluidic effects is vital to the function of the present invention, and this understanding can best be attained by considering practical fluidic devices.

FIGS. 26a, 26b, 26c, and 26d (taken from FIG. 1.16, Page 18, FLUIDICS, COMPONENTS AND CIRCUITS, by K. A. Foster and G. A. Parker) show a number of important fluidic effects in a compact way, by showing the function of Parker and Jones' cusp half adder binary fluid device. FIG. 26a shows the device with its flow pattern in the A=0, B=1 state; FIG. 26b shows the device with its flow pattern in the A=1, B=0 state; and FIG. 26c shows the device in its A=1, B=1 (carry) state. FIG. 26d shows the passage shape of the half adder without flow streamlines to emphasize the critical dimensions relevant to this device.

An observer must be struck, in observing FIGS. 26a–c, by the extremely structured flow pattern produced by this flow geometry, with the momentum of the streams effecting the flow, and with vortices stabilizing in cusps in the flow passages, drawing flow energy from the main stream(s) in the manner of a roller engaging a surface, and with the parasitic vortices actually serving to stabilize and organize the flow. It should be emphasized that there is turbulence everywhere in the fluid, so that the flow lines are mean flow lines. Nevertheless, the mean flow lines show the much predominant flow patterns, on which turbulence superimposes as small perturbations of relatively little importance. The flow has turbulence, but it is very far from random.

Virtually, all of the fluid mechanics shown with respect to Parker and Jones' of FIGS. 26a–26d is relevant to the function of the fluidic ports which enable continuously variable flow and turbulence to be produced in an engine. Effects which must be kept in mind are the following:

a. As the fluid elements move, they follow a path such that the sum of the forces acting on each element (including inertial forces) is balanced, in a way well known to designers of turbomachinery. In rectangular coordinates: $\Sigma F_x=0$, $\Sigma F_y=0$, $\Sigma F_z=0$. Much of the shaping of port passages for efficient fluidic performance depends on this simple dynamics.

b. Turbulent streams interact with adjacent fluid, and tend to entrain fluid and thereby spread, with reductions in velocity and increases in stream mass (and with, as a first approximation, conservation of momentum). When a high velocity jet is near a surface, the surface blocks flow into the jet and, therefore, the pressure on the wall side of the jet is reduced. The consequent pressure imbalance across the jet forces the jet toward the wall (at a rate so that inertial forces balance the pressure imbalance): the jet is "sucked" toward the wall. As the jet comes closer to the wall, the pressure difference forcing the jet toward the wall increases, so that the jet tends to lock onto the wall and becomes a wall attached stream (Coanda wall attachment effect).

When the stream is attached to the wall, the jet can only entrain fluid on its free side, and so the jet entrains less fluid and consequently spreads more slowly. Over a unit of flow distance, the reduction in spreading is more important than the viscous drag of the surface, so that a wall attached stream conserves its kinetic energy with distance downstream much better than an unattached jet. Also, if the high speed jet is shaped so as to minimize its free side surface area, entrainment effects will be minimized and energy conservation as the flow moves downstream will be better.

c. As was illustrated in FIGS. 26a, 26b, and 26c, a high velocity stream can induce, in a properly shaped flow passage, rather stable vortices or zones of recirculation, which are driven by the main flow. These recirculation patterns can very much stabilize the action of a wall attached stream, and by greatly reducing the velocity gradient between the wall attached stream and other flow in the port, the secondary recirculation flow can greatly decrease entrainment of fluid into the high speed jet, and thereby much reduce spreading of the jet. By reducing the spreading of the jet, the fraction of maximum jet velocity and kinetic energy which can be recovered in coherent form can be much increased over the fraction that would obtain without these zones of recirculation. For this reason, portions of the flow passage well away from the attached stream can change the spreading angle of a wall attached jet in the flow passage, by changing the flow and stability of the recirculation pattern.

d. The stability of a wall attached stream is a function not only of the intrinsic instabilities which come from high local Reynolds numbers: small variations in flow geometry which might at first appear to be insignificant can, by producing large disturbances in the jet, cause a magnification of turbulence causing the jet to "break up" in a way causing great reductions in the fraction of the velocity and kinetic energy of the jet as it travels downstream. In FIG. 26d, dimensions important to this stability are shown both as cusp setback y and wall set back x. The issue of setback is important to the successful and reliable function of fluidically efficient variable restriction ports. Streams which flow past a setback will, unless the setback is too great, reattach cleanly to the wall. An example of this is shown in FIG. 27a. Near the setback, as shown in FIG. 27a will be a recirculation zone or vortex 30 known in the fluidic arts as a "separation bubble." In FIG. 27a the setback dimension a is shown. As setback is decreased, the separation bubble shortens and the fraction of the fluid energy given up to the separation bubble decreases.

However, if the setback becomes a "step-up," a high velocity element of fluid will collide with the stepup as with a brick wall, and will deflect in a way which strongly perturbs the flow, breaking up and destroying the coherence of the jet, and so ruining the fluidic efficiency of the device. See FIG. 27b The high velocity jet 32 hits the stepup 33 and breaks into intense turbulence, spreading at such an angle that the pressure recovery from the jet downstream will be very small. Once a jet is well attached to a surface, surface roughness (for instance sand casting roughness) has surprisingly little effect. However, a stepup, or an intervening gasket protruding into the channel at the jucture between two passages, can completely break up the fluidic pattern which would otherwise occur. In the present invention, this stepup effect is important in two different ways. For fluidic efficiency of a restriction-caused jet into the combustion chamber, stepups must be avoided, and for mass production this means that parts must be assembled with tolerances which always involve setbacks and never involve stepups on the passages relevant to flow into the combustion chamber. Also, to eliminate perverse wall attached jets of backflow into the intake manifold during the valve overlap period, a stepup with respect to backflow near the variable restriction is effective in destroying the coherence of the backflow jet, and so simplifies intake manifold design.

A point of great importance with respect to fluidic principles applied to intake ports must be made. The inventor had great trouble with his initial port designs, which initially worked very well and then with what seemed to be very small geometrical changes did not work at all (or worse, some cylinders worked well and others worked badly). Detailed flow patterns, on which the mixing and flame speed in the engine depends, can be metastable or bistable in the port unless geometries are right. This is often a manner of details, and a very large part of the inventor's effort since the filing of this application's parent case has been development of fluidic port designs that are stable, so that small variations in passage geometry did not have catastrophic effects on the function of the ports.

Many fluidic devices are designed to be metastable, since they often function as binary switches. Even so, the sensitivity of the flow to geometry can be very great, and not easily appreciated by one skilled only in the conventional automotive engineering arts. A quote with respect to senstivity of a binary fluidic switch should emphasize the point:

"The problem, however, was that at small setback distances, the sensitivity changed fairly rapidly so that the effect of errors in the manufacture of an element could create great differences in characteristics; this is particularly noticeable in that similar elements from a batch may vary from monostability on one side through bistability to monostability on the other side, even though they appear superficially to be accurately made." (Page 314, Foster and Parker, op.cit.).

Such sensitivity is clearly unacceptable in a mass produced automobile part, and is particularly unacceptable in a sand cast geometry such as an intake port. Therefore, the design of the intake port shape for stability is a vital issue. In general, to achieve stability, all the fluidic effects must be such that they strongly push the flow into the desired pattern, so that the flow is insensitive to small variations in geometry. This can be done so long as stepup is avoided: in the inventor's experience, stepup, unless it was vanishingly small, has always been disastrous to the fluidic efficiency of a port geometry. If the basic shape is correct and stepup is avoided, it has been found that fluidically efficient ports can be made with sand cast surface quality and within the range of geometrical variations to be expected in mass production castings.

FLUIDICALLY STABLE VARIABLE PORT RESTRICTION GEOMETRIES

See FIG. 31, which is a side view showing an inwardly opening flap restriction which opens on the floor of an intake port. Flap 35 hinges on pivot shaft 36, and swings inwardly inside port 37, sealing along the sides of the flap (not shown) and forming an opening between the bottom of said flap 35 and port floor 38. Flow toward the restriction has vector components onward along the y axis as well as along the x axis, and in consequence, the flow contracts past the restriction according to the well known vena contracta effect to form a minimum flow cross section less than the restriction cross section at vena contract point 39. The jet flow at 39 has a velocity very closely corresponding to the isentropic velocity caused by the pressure drop across flap 35. For straightforward inertial reasons, the flow jet attaches to the floor of the port 38: no switching time is required for this attachment process, since inertia forces the stream against surfaces 38. The high velocity jet 40 will entrain flow, and impart momentum to the air inside the port passage, which will rapidly form a recirculating vortex 41: this recirculating vortex will strongly increase the fluidic efficiency of the port by reducing the velocity gradient between the top of jet 40 and the remaining fluid inside the port, and so reducing the spreading angle of jet 40 and increasing the velocity which will be delivered across the valve seat 42. The jet 40 detaches relatively cleanly at curvatures 43, and rushes across the valve, so that the great majority of the flow happens across only a small fraction of the valve opening area, in a way which produces structured flow and controlled mixing inside the combustion chamber of the engine (not shown) and, therefore, permits stable and rapid combustion with the very dilute mixtures required for $NO_x$ control and improved fuel economy. Clearly, by pivoting flap 35, the flow energy delivered into the engine combustion chamber (not shown) can be varied over a wide range, and when the flap is fully open, very low flow resistance is possible with good passage design.

The flow pattern of FIG. 31 illustrates important points about the use of fluid momentum to assure that a high speed jet attaches to the desired surface according to the Coanda effect. FIG. 31 also shows the parasitic vortex patterns inside the port geometry which reduce spreading, and so increase port fluidic efficiency. However, FIG. 31 is somewhat oversimplified, because it takes a fundamentally two dimensional view of a fundamentally three-dimensional flow passage. Furthermore, jet 40 jumps a gap as it goes across the valve opening, and this jump involves flow passage shaping issues which are geometrically touchy. Because of the geometrically touchy nature of curvature 43, it is likely that ports having a flow jump across the valve opening, such as that which occurs from curvature 43, will be difficult to mass produce.

For reasons concerning the geometry of a swinging door type flap restriction, fluidic ports work best when they are of generally rectangular cross section. A high speed stream attached to one wall in a rectangular passage will tend to move into one of the two corners adjacent to the wall to which it is attached. For straightforward fluidic reasons, the stream would rather be attached to two adjacent walls in a compact pattern than in a less compact pattern spread out over one flat wall. This preference of the stream for corners can be very useful in the design of fluidic ports. However, the issue of which corner of the rectangular passage the stream flows to is vital, and if the flow pattern is metastable, with the flow sometimes attaching to one wall and sometimes attaching to another, the effect can be disastrous.

FIG. 32 is a perspective cutaway view of a rectangular passage with a bottom opening flap, (flap not shown) so that the high velocity flow will attach to the floor of the passage 45. Section lines a, b, and c show cross section cuts which are shown in FIGS. 33a, 33b and 33c. In FIG. 33a–c, the shaded area is the area containing the high speed wall attached flow: clearly, the shapes and edges of this high speed flow are somewhat arbitrary, since there will be smooth velocity transistions within the flow—the edges of the shaded regions could, for example, indicate the flow at 60% of the vena contracta velocity. However, the major point of the FIGS. 32 and 33a–c is that the wall attached stream tends to contract itself into a minimum surface area configuration and go into a corner of the passage.

FIG. 34a shows actual measured results with a port arranged as shown in FIGS. 34a, 34b, and 34c to flow in the manner explained in FIGS. 32 and 33a–c. FIG. 34a is a view of the combustion chamber area of the head with the view perpendicular to the plane of the head cylinder sealing surface and showing the general shape of the intake port passage 50 in shadow lines. The numbers and vectors shown around the intake valve show actual measured percentages of the isentropic velocity past the flow restriction 54 in this particular setup for steady flow tests. FIGS. 34b and 34c are additional views of the intake port passage and variable restriction. FIG. 34is a cutaway of the intake port generally along the center line of the flow of the port and shows rectangular throttle 54 in relation to port section 50 and adjoining intake manifold passage 52. FIG. 34c is a cutaway view of the same head arrangement on a cutaway plane passing through the center lines of the intake and exhaust valve stem. The port arrangement shown was modified from a 350 cu. in. displacement Chevrolet engine head. Velocity measurements were taken with Pitot tubes modified from medical syringe needles. Pressure differences were measured with water inclined manometers.

For efficient fluidic ports designed so that the flow goes into a corner of the generally rectangular port passage, it is most important that the flow always, even with small production variations from passage to passage, goes into the proper corner. Unless this is done, the design cannot be commercial.

The following drawings show ways to insure that the flow goes into the proper corner so that it is delivered in coherent form into the cylinder.

FIGS. 35, 36a, 36b, 37 and 38 are each drawings for a system having outwardly swinging flaps and where the outwardly swinging flaps are part of a separate intake manifold assembly which mounts to the intake port on the cylinder head in the manner of FIG. 39 which will be discussed in more detail subsequently. FIG. 35 shows how the flow can be biased to attach to a specific corner by the simple expedient of arranging the setback so that the setback on one wall is significantly less than the setback on the other. FIG. 35 is a view looking in the direction of the port runner of the intake manifold near where it mounts to the cylinder head for a specific port and showing the swinging flap 60 in the closed position generally perpendicular to the runner. Dotted line 61 denotes the outline of the intake port in the cylinder head against which the manifold section would mount. The alignment of the manifold passage and the intake port is such that there will be setback all around the intake port. However, the setback B on the left side of the port will be significantly less than the setback A on the right side of the port. In consequence, the flow from the bottom opening flap will tend to attach to the port runner on the lefthand corner port side.

FIGS. 36a and 36b illustrate the use of deflectors to deflect the wall attached stream from the variable restriction towards the desired intake port corner. Manifold runner passage 70 mounts variable restriction flap 72, which pivots on control shaft 73. The manifold passage 70 mounts onto an intake port runner 74, which is integral to an engine cylinder head not shown. On the floor of intake manifold passage runner 70 are deflector fins 76 which serve to deflect the flow towards wall 79 so that it will attach on the corner between the floor of the port and wall 79. Again, note that the juncture between manifold passage 70 and port runner 74 has setback.

FIG. 37 shows another very simple way of biasing the flow toward a specific corner by arranging the predominant fraction of flow when the flap 60a is relatively closed on the left side by providing an opening along the left side of a variable restriction flap section 80.

FIG. 38 illustrates how the wall attached stream can be biased to the proper wall by means of a deflection stream. Variable restriction flap 86 includes a flow passage 87 on the downstream face of the flap 86 which connects flow from the upstream side of the flap through hole 88 to be delivered in the proper deflecting direction at opening 89.

Those skilled in the fluidic arts will recognize that there will be other ways to assure that the flow stream attaches to the proper wall of the port runner and that FIGS. 36 to 38 are exemplary only.

It has been discussed before that the variable port restrictions serve to control the blowback of exhaust gas during the intake and exhaust valve overlap period, as well as control the fluid mechanical details of the intake flow into the cylinder. Referring specifically to FIGS. 36a and 36b, the opening of the variable restriction flap 72 shown by height H in FIG. 36a, is not only the flow cross section through which all intake flow must pass; gap H is also the flow path through which any exhaust gas from the intake port must flow in order to flow into the intake manifold port runners. Therefore, it is very clear that changing the angle of flap 72 to reduce gap H will reduce the internal exhaust gas recirculation for a given engine speed and load which is produced with a set valve overlap. Therefore, controlling the angle or opening of the variable restrictions at each intake port will serve as a programmable internal EGR control device. Because the port restrictions can be very restrictive, the variable restrictions will permit engines to be built with very substantial intake and exhaust valve overlap periods, since the mass flow of exhaust gas recirculation at low speeds and loads can be completely controlled by the variable restriction settings. The ability of the variable restrictions to permit very high valve overlaps eliminates one of the most important trade-offs between engine smoothness and peak engine power in prior art engines. In addition, the variable restriction in conjunction with high overlap camshafts (which are also desirable for peak power) will provide an extremely effective programmed EGR device and will eliminate the need for any external EGR plumbing. The elimination of external EGR valves and plumbing will represent a substantial cost saving to engine manufacturers. However, it has been found experimentally that the exhaust blowback flow during the valve overlap period can produce very bad cylinder-to-cylinder distribution of residual gases unless the flow downstream of the variable restriction during the valve overlap period (which during the intake stroke is upstream of the valve restriction) is properly arranged to break up Coanda wall attached streams. The function of stepup in breaking up a Coanda wall attached stream has already been discussed. It has been found experimentally that provision of a stepup such as 78 (which is a setback during the intake flow) will effectively break up the blowback flow so that it dissipates into turbulence and does not penetrate too far into the intake manifold assembly. The provision of this step 78 is very important for the practical operation of the variable restriction system with significant valve overlap. Without the breakup of the exhaust blowback wall attached stream, it is very much more difficult to build an intake manifold arrangement having adequate cylinder-to-cylinder exhaust gas distribution and proper fluid mechanics. It should be noted that setup 78 is very different in function from the steps sometimes provided in intake manifold assemblies to reflect pressure waves. A wall attached stream is clearly not a pressure wave.

For manufacturing reasons, it will be much more convenient to have the variable restriction arrangement part of the intake manifold assembly rather than part of the cylinder head. Cylinder head manufacture is conventionally done by sand casting, which does not lend itself to super close tolerances or to smooth surfaces. The intake manifold assembly, however, can be arranged as an assembly of die case aluminum parts which can be made inexpensively to much higher tolerances than are obtainable with the cylinder head. FIG. 39 illustrates these points. A cylinder head 100 has attached to it an intake manifold assembly 102-110 including the variable restrictions. Manifold main section 102 includes within itself intake manifold passage runners 103 corresponding to each intake port and any step ups or fins which are fluidically worthwhile (such as those illustrated in FIGS. 35a and 35b). The manifold main section 102 has a top section (also a die casting) 106 and at the parting line between 102 and 106 is accomodation for a flat shaft assembly 104 which mounts the variable restriction flaps 105 for each intake port. A homogeneously mixed vaporized fuel air mixture (produced in a way which will be discussed later) is delivered to the intake manifold through inlet section 108. The control of the flap shaft angles as a function of carburetor throttle angle and other engine parameters is controlled by control means 110 which is not shown here in any detail. Die cast manifold assemblies such as those shown in FIG. 39 may be adapted to both straight and V engine types, and significantly increased geometrical complexity is possible with the die cast technique. However, the realities of engine manufacture make it very desirable to arrange the variable restriction arrangement as an integral part of the intake manifold assembly so that the entire variable restriction arrangement (excepting simple core changes in the intake port shape) is part of one assembly which may be put together on a sub assembly line in a manner which causes minimum disruption of the engine assembly line itself.

The variable restriction flap arrangement of FIG. 39 is adapted for outwardly swinging flaps such as those shown in FIGS. 36 and 36b. However, other variable restriction arrangements are possible. Two alternative arrangements are illustrated in FIGS. 40 and 41. FIG. 40 illustrates a variable restriction arrangement having a sliding vane 120 to control the flow. FIG. 41 illustrates a variable restriction flap which swings in toward the intake port. An inwardly swinging flap has small advantages with respect to the fraction of the isotropic velocity past the restriction delivered in coherent form past the intake valve face. However, inwardly swinging flaps in manifold assemblies are less compact than outwardly swinging flaps.

The variable restriction intake ports do an excellent job of homogeneously mixing the fuel, air and residual gases in the cylinder. However, no amount of in-cylinder mixing can correct for variations in the air fuel ratio or fresh charge residual ratio delivered to the cylinder from cycle to cycle, nor can in-cylinder mixing correct for variations in air fuel delivery or residual charge delivery from cylinder to cylinder. Those skilled in the art of combustion engines will recognize that getting completely perfect cylinder to cylinder mixture distribution is a very difficult thing. The statistical argument in FIG. 6 was intended with respect to microscale mixing in the cylinder. However, this argument is just as valid with respect to cylinder to cylinder or cycle to cycle statistical variations. To take full advantage of the fluidic variable restriction ports (that is to say to go very lean for maximum nitric oxide reduction) it is necessary to have homogeneously mixed charge delivered to each cylinder.

Apparatus for producing very tight in-cylinder species concentration statistics and for increasing flame speeds in engines have now been disclosed. However, with respect to the critical issue of nitric oxide formation, the chemical events governing nitric oxide formation require that the species concentrations of fuel, air, and residual gas at each point in the combustion chamber for each cylinder be dilute enough to produce the low $NO_x$ levels. No matter how good the in-cylinder mixing is, relatively high $NO_x$ levels and/or relatively high misfire levels can occur if too much statistical variation in fuel-air-residual delivery occurs between cylinders or cycle to cycle for a given cylinder. For efficient, low $NO_x$, dilute combustion, very tight cylinder-to-cylinder and cycle-to-cycle mixing statistics are required in addition to the requirement for in-cylinder mixing. The overall cylinder air-fuel-residual gas ratio is determined at the end of the intake stroke, and no amount of in-cylinder mixing can change this ratio. Therefore the requirement for tight cylinder-to-cylinder and cycle mixture delivery statistics is inescapable. As has already been discussed, the requirement for microscale in-cylinder mixing is also inescapable if dilute combustion is to be achieved.

Conventional engines have relatively bad cylinder-to-cylinder and cycle-to-cycle fuel-air delivery statistics, particularly under transient operation conditions and under cold start conditions. Referring back to the statistical illustration of FIG. 6 and consideraing the source of statistical deviation to be cycle-to-cycle or cylinder-to-cylinder variations, it is clear that the tighter the cylinder-to-cylinder and cycle-to-cycle mixing statistics the more dilute combustion mixtures can be wihout unstable combustion or misfire, and therefore the lower $NO_x$ emissions can be and the better engine fuel efficiency can be.

It is possible, although technically quite difficult, to get very tight cylinder-to-cylinder and cylce-to-cycle mixing statistics with fuel injection nozzles at each intake port. Even with perfect cylinder-to-cylinder distribution at the injection nozzles, much of the liquid fuel wipes out on port surfaces and there is a surprisingly and inconveniently large lag under transient conditions due to the two-phase flow in the port sections, so that even the best port fuel injection systems are less than perfect with respect to delivery characteristics to the cylinder under transient conditions. In addition, individual port fuel injection is quite expensive and tends to be difficult to maintain. For these reasons, the inventor, working with co-workers Charles L. Siewert and Kenneth W. Kriesel, has developed a vortex fuel-air mixing device employing turbulent structured flow fluid mechanics to produce the required steady state and transient fuel-air distribution statistics. This vortex mixer is the subject of a co-pending patent application, Ser. No. 945,388. However, means to economically achieve the very tight cylinder-to-cylinder and cycle-to-cycle statistics required for very low $NO_x$ emissions are sufficiently important and the structured flow fluid mechanics effects used by the vortex mixer are sufficiently important, that the device is discussed in detail here.

FIGS. 50, 51 and 52 show a preferred form of the vortex mixer. FIG. 50 is a top plan view of the vortex mixer with the vortex top removed. FIG. 51 is a side cross section view of the mixer showing the arrangement of heat transfer fins and the internal shape of the device with the top included. FIG. 52 is a side elevation view of the vortex mixer showing its mode of connection to a carburetor (or other fuel-air metering device) and to the engine intake manifold.

See FIG. 50. The vortex comprises an integrally die cast housing 239. Flow through carburetor throttles (not shown) at 250 passes into chamber 251. Flow from chamber 251 into the main mixing section of the vortex is controlled by variable restriction throttle arrangement 254 which pivots on shaft 252, which is mounted directly so that its coefficient of discharge is linked to the coefficient of discharge of the carburetor throttle (not shown). Flow past the restriction forms wall attached streams which flow past fluid mechanically clean transitions into a vortex section which is basically a circular section around the outlet 242, which feeds the intake manifold of the engine. The outside peripheral walls of the vortex chamber, in interaction with deflector 256 are arranged so that a very significant fraction of the isentropic velocity past restriction 254 is conserved so that the flow in the generally circular vortex section of the mixer has very high angular momentum with respect to the center of the outlet 242. In consequence, a strong irrotational flow towards the central sink 242 is formed. This flow is dominated by the physical effects of conservation of angular momentum as will be described below. For this flow system the tangential velocity of the flow is inversely proportional to the radial distance from the vortex center. Deflector vanes 240 are arranged at the outlet to recover a significant fraction of this tangential velocity back to pressure and to smooth the transition of the flow into the outlet, so as to very substantially reduce the total flow resistance of the vortex mixing device. Referring now to FIGS. 51 and 52, it can be seen that the outside peripheral wall of the vortex is heated by exhaust passage 268 extending around the outer walls of the vortex which includes heat transfer fins 270 and a closure member 272. The exhaust flow through the vortex can readily be arranged using a crossover arrangement analogous to the arrangements currently used for intake manifold heating. Consideration of FIG. 52 should make clear the positioning of the vortex with respect to the carburetor 282 (or other fuel-air metering device) and with respect to the engine intake manifold. Those skilled in the art of internal combustion engines will recognize that the vortex mixer of FIGS. 50, 51, and 52 can be constructed as a simple and inexpensive die csting.

Experimentally determined engine operating characteristics with the vortex mixer of FIGS. 50, 51, and 52 have been extremely excellent and the flow inside the mixer is an excellet approximation of the analytically predicted flow and mixing relationships. Because the fluid mechanics inside the vortex mixer illustrates structured flow turbulent mixing analogous to the structured flow turbulent mixing inside the cylinders disclosed in the present invention, it is worthwhile to discuss the fluid mechanics and mixing in the vortex mixer. A distinction between the vortex flow in the cylinder according to the present invention and the vortex flow in the vortex mixer should be emphasized. In the cylinder, an irrotational flow vortex has tangential velocity but no mean flow towards the center of the vortex (except for a recirculation due to boundary layer effects which will be small). In the vortex mixer, on the other hand, there is, in addition to the tangential flow, flow from the outside of the vortex to the center of the vortex. In consequence, the flow stream lines of the two vortex systems are appreciably different. However, the analogies in the reasoning involved in the flow inside the cylinder and the flow inside the vortex mixer should be clear.

In the vortex mixer, conservation of angular momentum, $MV_t r$, dictates the increase in the tangential velocity of the fluid as it flows towards the center. It is easy to verify that the velocity in the tangential direction as a function of radius r, $V_{tr}$, will be expressible according to the relation $$V_{tr} = \frac{V_{tr_o} r_o}{r}$$

where $V_{to}$ is the tangential velocity at the outside of the vortex, $r_o$ is the radius at the outside of the vortex, and r is the radius where the velocity tangential is taken. FIG. 53 illustrates the flow velocities which are produced in an irrotational flow vortex according to the above equation.

Because the flow is flowing from the outside of the vortex to a sink at the center of the vortex, the mass flow rate in the radial direction through any cylindrical cut of the vortex section will be the same, so that the radial velocity will be inversely proportional to the radius $$V_{rr} = \frac{V_{rr_o} r_o}{r}$$

where $V_{rr}$ is the radial velocity at radius r, and $V_{rr_o}$ is the radial velocity at the outside radius of the vortex. Clearly the above two equations are of the same form. It follows that for a set tangential velocity input (set by a given intake manifold vacuum) and a set volume throughput through the vortex (set for a specific rpm) the ratio of the velocity tangential to the velocity radial will be constant for all the radii of the vortex.

It should be emphasized that the flow relations which have just been written down are not valid at radii less than the radius of the outlet. However, it should be clear that even though the irrotational vortex is not a perfect approximation of the flow, the physical relations of conservation of angular momentum make it conceptually rather close to the mean flow streamlines which do, in fact, occur and have the perturbations of turbulence superimposed upon them, if the boundary layer flows are properly controlled as they are in the vortex of FIGS. 50, 51, and 52. This boundary layer control, discussed in detail in the copending vortex patent application, will not be discussed here. It should also be clear that drag interactions between successive radial elements will tend to reduce the velocity increase of the flow as it flows toward the center, because the angular momentum as the flow flows towards the center will be reduced by these drag interactions. Nonetheless, the irrotational flow vortex form, as a flow mode, is extremely stable, and flow in the vortex mixer approximates this ideal fairly closely.

As has been discussed previously in this application, the interaction between mean flow streamlines and turbulence must be understood if one is to understand mixing. A consideration of FIGS. 54, 55, and 56 should clarify some of the points important with respect to understanding of the interaction between flow structure and molecular and turbulent diffusive mixing in the vortex mixer. It should be emphasized that the graphical illustration of FIG. 54, FIG. 55, and FIG. 56 are exemplary only. However, the examples are important ones. FIG. 54 shows a streamline 354 of a clockwise rotating vortex from an outside radius 350 to a sink 352 where the streamline obeys the flow equations previously discussed. This flow streamline would occur, for example, in an irrotational flow vortex where the streamline was well away from entrance condition perturbations and where turbulence in the vortex was zero, if one were at point 356 to introduce, for example, ink into a water vortex and watch the ink line as it flows towards the sink. The streamline, in other words, shows what the flow path would be in the absence of any random mixing, either by turbulent diffusion or by molecular diffusion. If there were any diffusion, the width of the line would increase as it flowed towards the sink, as should be clear to those who understand mixing. In summary, FIG. 54 would show a flow streamline for an irrotational flow vortex if a line of mixant was introduced at only one point along the outside of the vortex and in the absence of either molecular or turbulent diffusion.

FIG. 55 shows what would happen if the same flow situation as that of FIG. 54 had an additional line of mixant introduced 180° around from the initial point of introduction. The vortex would have an outside circle 357 and a sink 358. At point 360 along the circle 357 a line of mixant would be introduced 359. The numbers 359 are shown as the flow swirls in towards the sink to identify that streamline. 180° from point 360 along circle 357 mixant is introduced at 362 and produces flow streamline 361. Flow streamline 361 is identified at several points to make it clear the manner in which the spiral 359 and the spiral 361 nest. Again, FIG. 55 illustrates what would happen in a mathematically perfect irrotational flow vortex with a sink, in the absence of either molecular diffusion or turbulent diffusion.

FIG. 56 is analogous to FIG. 55, except now, rather than having two nested spiral streamlines, mixant would be introduced evenly around 10 points around the circumference of the vortex; and therefore, 10 different spiral lines would nest as shown.

With respect to FIGS. 54, 55, and 56, it should be clear that the presence of small-scale turbulent perturbations and molecular diffusion would tend to thicken out the lines as they flow from the outside towards the sink of the vortex and therefore that the mixing pattern would be more and more homogeneous as the mixture flowed towards the sink of the vortex. For example, with respect to FIG. 56, it should be clear that only a relatively small spreading angle of the mixant lines (corresponding to a relatively small turbulence intensity) would so smear out the lines of mixant by the time the flow had spiraled from the outside of the vortex to the sink, that the mixture at the sink of the vortex would be very homogeneous. With respect to the nesting of spiral streamline patterns shown in FIGS. 55 and 56, it should be pointed out that the fuel evaporation mixing of the vortex mixer shown in FIGS. 50-52 will come from fuel evaporating around the entire peripheral wall 260 of the vortex and that this will correspond to introduction of mixant not around 10 points around the periphery but around an effectively *inifinite* number of points around the periphery. This means that if the liquid is well distributed around the circumference of the vortex peripheral wall (it has been determined experimentally that this is adequately near true), the mean distance across which diffusion needs to occur in order to achieve essentially perfect homogeneity at the vortex sink is very short. A consideration of the turbulent or molecular diffusion differential equation should make clear that an n-fold decrease in the mean distance across which diffusion needs to occur for a set interfacial area, will decrease the time required for equilibrium by a factor of n. However, in addition, introduction of mixant from many points around the periphery of the vortex is tantamount to very vastly increasing the interfacial area across which diffusion can occur, and, of course, this effect increases mixing rates, too. Again, it must be emphasized that the flow streamlines shown in FIGS. 54, 55, and 56 are only exemplary. However, the geometrical relations with respect to mixing illustrated by these figures are extremely important and do not become less important as the flow structures become more complex; for any given flow structure, the flow structure will serve to stretch out the concentration gradients of species to be mixed and therefore, the flow structure will dramatically affect the rate at which mixing proceeds. Mathematically, the flow structure, or non-random streamline pattern, can be thought of as a spatial transform of concentration fields as a function of time as was discussed before. There are flow transforms which are very conducive to mixing, and the vortex mixer's irrotational flow vortex is such a flow transform. It should be clear that flow patterns which are not exactly irrotational flows can also have flow patterns very much conducive to mixing. For example, the flow pattern in the vortex of the present invention will not be a perfect irrotational flow vortex. With respect to the spiral streamlines, it will differ from a conventional irrotational flow vortex in that the ratio of tangential to radial velocity will not quite be constant as a function of radius for the real flow. However, nonetheless, Reynolds number modelling of the flow pattern produced by the present invention using water as the model and ink as tracer shows that the flow pattern which actually occurs in the system is much like an irrotational flow vortex and that the flow pattern is extremely conducive to mixing. In fact, when a single point mixant introduction (using ink from a syringe) was used, the mixing was so rapid that the flow looked effectively homogeneous well before the flow reached the outlet of the vortex. The ratio of tangential to radial velocity was about constant over various radial distances, verifying that the flow was basically an irrotational vortex. Consideration of the flow nesting relations in FIG. 54, FIG. 55, and FIG. 56 should make it clear that the mixing must have been even better for the multiple mixant introduction case in the real vortex where fuel is distributed for evaporation around the circumference of the outer wall of the vortex. While it is recognized that viewing a Reynolds number model operating on water with ink as a tracer in a plexiglass one-to-one model is not quite a perfectly analogous modelling (because the water is not compressible as the air is), the analogy is still a close one, and the mixing observed in the system was very, very intense, so that even significant decrements in mixing rates due to compressibility effects (which are not likely) would not affect the conclusion that the vortex flow pattern actually produced in the vortex mixer system is extremely conducive for mixing, so that with the multiple fuel point evaporation characteristic of the evaporation process of the vortex mixer, the mixture at the outlet will be effectively homogeneous.

The theoretically excellent performance of the vortex mixer shown in FIGS. 50, 51, and 52 has been vertified by a number of experiments. In a Ford six cylinder engine equipped with a vortex mixer, cylinder to cylinder variation was measured with a Horiba air-fuel ratio meter, and cylinder to cylinder variation was undetectable under all the conditions tested. The air fuel ratio meter should have been able to resolve an air-fuel ratio variation of a tenth of a ratio. The Air-fuel ratio meter, however, has relatively slow response and therefore the transient characteristics of the system were measured as follows.

A Ford five liter eight cylinder engine was equipped with oxygen sensors at each exhaust port, in addition to an oxygen sensor collecting off one four cylinder bank of this engine. The oxygen sensors were the same oxygen sensors now used for three-way catalyst controlled engines. These sensors can be made into extremely fast acting and sensitive devices by removing the protective diffusion barrier shroud around the ceramic sensor element, leaving the ceramic sensor surface directly in the flow. When this is done, the tau (1/e response) of the sensor when hot appears to be in the vicinity of 5 milliseconds. It is believed that when the oxygen sensor is exposed to a truly homogeneous exhaust mixture (on the microscale), it will switch from a low voltage to its full output voltage in something less than one tenth of an air-fuel ration when the oxygen sensors are hot. The full-scale response of the oxygen sensor is therefore expected to represent less than a one percent variation in air-fuel ratio. With present production techniques, oxygen sensors are not yet quite identical, so that absolutely perfect comparisons of oxygen concentration and air-fuel from cylinder to cylinder cannot at present be made. However, use of the oxygen sensors makes it possible to verify the tightness of cylinder-to-cylinder distribution, and since the oxygen sensor cannot respond to individual exhause stroke oxygen concentrations, the oxygen sensors also give an excellent read on cycle-to-cycle mixing statistics. For these reasons, the inventor and his associates Kenneth W. Kriesel and Charles L. Siewert adapted the Ford five-liter engine to have oxygen sensors directly downstream of each intake port (in a position where the oxygen sensors operated very hot increasing their sensitivity and reducing their full-scale switching range). In addition to the eight oxygen sensors corresponding to the eight cylinders, an additional oxygen sensor at the outlet of one of the exhaust manifolds was added. In this way, cylinder-to-cylinder and cycle-to-cycle variations which could in no other manner be measured were measurable. FIG. 57 shows actual engine test data obtained with these oxygen sensors under a condition corresponding to a very heavy accel on the EPA cycle and with the carburetor operated without any accelerator pump. In the chart trace, the upward direction is the direction of increasing time. Heavy, horizontal automatically written grid lines represent seconds and the lighter horizontal grid lines represent tenths of a second. The right most trace, trace 10, is the trace for voltage on the servo-electric linkage used to actuate the carburetor throttle during these tests. The one-second period when the throttle was opened in the specified way is shown on the trace. Proceeding from right to left are traces for cylinders 1, 5, 4, 2, 6, 3, 7, and 8 and the left most trace is the average trace for cylinders 5 to eight (the trace from the oxygen sensor at the collector of the left exhaust manifold). The temperature, and therefore the output of the cylinder 5 to 8 average trace are different from those of the oxygen sensors directly in the exhause ports of the various cylinders. The test was conducted with the air-fuel ratio from the carburetor prior to the servo-controlled opening of the carburetor throttle adjusted so that the oxygen sensors were on the rich side just at the edge of switching (in practice operated so close to the switching point that the switching noise on the oxygen sensors were clearly seen). During an accel with a carburetor unequipped with an accelerator pump, it is expected that the fuel will lag the air and therefore that the engine will suffer a lean excursion. With usual engine arrangements this lean excursion for the conditions of test for FIG. 57 would constitute several air-fuel ratios and the lean excursion would last for several seconds (and involve quite noticeable decrements of engine performance). The test illustrated in FIG. 57 was conducted with the Ford engine equipped with a mixing vortex such as that shown in FIGS. 50, 51, and 52. After the carburetor throttle began to open on this test, there was a lean excursion, but it was of the order of a tenth of an air-fuel ratio or less (significantly less than one percent). Also looking at the traces of the various sensors, it is clear that the variation is little different from one cylinder to the next (particularly in view of the fact that the oxygen sensors themselves are not identical). This data, and much data like it, verifies that the cylinder-to-cylinder and cycle-to-cycle mixing statistics of the vortex are much tighter than a standard deviation of one tenth of a percent. The mixing statistics achieved by the vortex mixer are significantly better than those of any other mixing system, of any type or at any price, of which the inventor is aware. Experimentally, it was found that at present the major source of statistical variation in air-fuel delivery to the cylinders was due to statistical variations in the metering characteristics of the carburetor itself. Improvements in fuel-air metering systems are proceeding rapidly in many laboratories, and it is expected that very tight fuel-air metering, particularly from a single point fuel introduction arrangement can be commercially achieved. In all events, the vortex mixer is a very straightforward way to achieve the tight cycle-to-cycle and cylinder-to-cylinder mixing statistics which when combined with excellent in-cylinder mixing and turbulent flame speed control, permit ultra-low nitric oxide emissions with optimal fuel economy.

SINGLE CYLINDER TEST DATA VERIFIES NO$_x$ AND FUEL ECONOMY ADVANTAGES OF THE INVENTION

Automotive engineering requires, for clear commercial reasons, very high standards of proof, particularly with respect to technology concerned with so sensitive a subject as emissions. The present application has been detailed and lengthy because it contains the information required to teach skilled automotive engineers, who are not commonly acquainted with fluidics and have difficulty visualizing and thinking about structured flows and the mixing interactions related to structured flows, how to understand, make, and use fluidic ports in combination with homogeneous lean mixtures to produce very efficient and ultralow NO$_x$ output engines with improved peak power and excellent driveability. Up to this point, the invention has been explained largely in light of quite complex interrelated theoretical arguments, with relatively little test data specifically considered. Any automotive engineer with experience knows that theory is not enough. Also it is very well established that theory, even very carefully contrived theory, very often founders in practice due to effects inadequately understood by the theoretician. Because of many negative experiences in the application of theory to practical engines, the automotive engineering profession tends to be quite dubious when confronted with theoretical arguments, even when these arguments are short. In the present case, the arguments and theoretical bases of the present invention are quite complex and interrelated. It is an elementary proposition of practical logic that an argument is the more suspect the longer and the more complicated it is. Also, an argument is rightly held to be suspect when its conclusions are at substantial variance with what is commonly believed in the discipline to which the argument relates. For these well founded reasons, the arguments of the present inventor, considered as logical propositions, were not obvious or considered as adequate bases for action by men of experience, responsibility, and power in automotive engineering. For these men, skilled in the art of internal combustion engines, it can be said that no logical proposition, no matter how carefully crafted and no matter how carefully related to other engine data, is obvious. The tradition of automotive engineering is, and has been for some decades, a tradition of rigid empiricism. For these reasons, the inventor's effort to secure support from major auto companies on the subject matter of the present invention was unsuccessful, even after a rather substantial body of data relating to the fluidic port variable restriction engine was available. At the same time when the major auto companies were spending several billions of dollars a year on emission control research and development, the inventor's work was held to be unworthy of support, in the face of extremely complete (and in the even correct) technical arguments and much fluid mechanical data. This was true even though the inventor was given no technically coherent argument on why his invention would not work as he expected, and even though several engineers agreed that the invention, if it operated as expected, would be by a large margin superior to the technology on which these major companies were working. The inventor's support level from the academic community was significantly greater, but still highly tentative. The plain fact was that low $NO_x$, high efficiency results which the inventor held to be possible and which motivated the inventor's work were held to be impossible by an overwhelming consensus in the automotive engineering profession. The only answer to such a consensus must be data, and the data must be accurate and conclusive beyond question. The inventor therefore had to accumulate a great deal of data at the Internal Combustion Engine Research Laboratory of the University of Wisconsin under the quite close supervision of Professors P. S. Myers and O. A. Uyehara. The support of Professors Myers and Uyehara was significant, since without resources under their control, the research could not have been conducted. Myers and Uyehara were also a very significant disciplining force on the inventor and worked very hard to assure themselves that the inventor drew no overoptimistic conclusions from his work. At this time, Myers and Uyehara had great practical power over the inventor, since they would have quickly disowned his work and so discredited him, if he had presumed to say something was true which they had not themselves seen proved beyond any reasonable doubt.

Because of the controversial nature of the research, the single cylinder engine test facility set up to test the variable restriction port engine development was built to uncommon standards of accuracy. A very great deal of novel technical work was done in order to secure the very high standards of accuracy needed. A special hydraulic torque sensing arrangement where torque was read on a mercury manometer, where damping was strictly linear, and where all sources of static friction were essentially eliminated was built. It is believed that this torque meter was at all times accurate to within plus or minus one tenth of one percent, which is very substantially superior accuracy to the accuracy available with more conventional torque measuring means. Engine speed was measured with the conventional sixty tooth gear and one second electrical timer apparatus to give a digital readout of engine r.p.m. Air flow metering was accomplished using critical flow orifices and specially calibrated air gauges, with special compensation of air temperature to compensate for effects of temperature variation on air supplied to the test setup. This air metering arrangement was tested and found to be within plus or minus 0.2 percent, which is again substantially more accurate than the conventional air metering setup held acceptable for conventional engine research. Fuel flow metering for gaseous fuels was also accomplished using critical flow orifices (watch jewels) with specially calibrated gauges and with a heat exchange arrangement which assured that the temperature of the fuel gas upstream of the critical flow orifice did not vary by more than approximately $\frac{1}{2}°$ C. For the propane metering arrangement, reproducibility and accuracy in the vicinity of +/−0.1 percent was attained and measured with the most accurate volumetric measuring apparatus available at the University of Wisconsin. The fuel metering apparatus was very much more accurate than that conventionally used for automotive engine tests. Intake manifold vacuum and other relevant near atmospheric pressures were measured with mercury manometers. The effect of pressure fluctuations on the manometers was filtered by laminar flow elements in each pressure pickup line, so that manometers measured true linear averages for the fluctuating pressures. Pressures inside the cylinder were monitored with a Kistler pressure probe, but this probe was not precisely calibrated since the research did not require such calibration. Emission tests were taken with the emission measuring cart available at the Internal Combustion Engine Research Laboratory. $NO_x$ was measured with a chemiluminescent analyzer by Thermo-Electron. Hydrocarbon emissions were measured with a Beckman flame ionization flame detector hydrocarbon meter. Oxygen was measured with a Scott Research oxygen meter as a check on fuel-air ratios. Carbon monoxide was measured with an infra-red absorption meter; however, in the lean range of the present research the carbon monoxide concentrations proved to be too small to be reliably measured with this instrument (and too small to be of practical concern). The research was conducted on an electric dynamometer with motoring capability, and was done on a single cylinder engine set up on a CFR crankcase. The engine used for the tests was a one-to-one one-cylinder mode of a 1951 Oldsmobile engine having a bore of 3.5 inches and a stroke of 3.75 inches and a compression ratio of 8.3 to one. This engine, although obsolete, was the only single cylinder test engine available to the inventor which had the tangential ports with respect to the cylinder center which are characteristic of multiple cylinder engines and which are required for the proper function of the fluidic port.

The single cylinder engine used was not ideal, although it was sufficient to establish a great deal of useful data. The main problem with the engine was that it was characterized under all operating conditions with unburned hydrocarbon emissions very much in excess of those of more modern engines. Another problem was that the intake ports of the engine tested were not quite optimal. However, the inventor had little choice but to use the heads available and, of course, could do a less adequate job of port modification with welding and filing than he would have been able to do had he been permitted to vary port cores on an original casting. Nonetheless, the fluidic ports did function well, although the fluidic efficiency of the ports on the test engine was always significantly below the fluidic efficiency of the intake ports which the inventor had modified from a 350 cubic inch displacement Chevrolet engine head.

Many of the data points taken were taken to find the optimal performance with respect to fuel economy for the engine holding certain variables constant. For the technique, the inventor is indebted to the optimization process described by Professor Paul H. Schweitzer, who was also a signficant teacher for the inventor. In this optimization process, the fuel flow is set constant, the r.p.m. of the engine is set constant, and the other variables (except perhaps some specifically held constant) are varied so as to maximize the torque (hence the horsepower) of the engine. Mathematically, what is done in the Schweitzer optimization process is to take the partial derivative of horsepower holding fuel flow and r.p.m. constant and varying the other variables. In this way, that combination of fuel-air ratio, spark advance, EGR, and in the case of the present invention flap setting which gets the maximum power from a given fuel flow can always be found. It should be pointed out that the slope of the power curve very near the optimal is very flat, and so one must measure torque very accurately in order to accurately determine the actual optimal point. In addition, since a number of variables must be changed, the discovery of an optimal point is a relatively time consuming experimental process, so that each optimal point on a graph represents the end point of a relatively long experimental sequence. Nonetheless, a great many of the following data points are the result of the optimization process because it was felt that this offered the toughest and ultimately the fairest test of the data. Using the optimization process, it has been shown that the conventional trade-off between nitric oxide emissions and fuel economy disappears if the fuel-air mixing process is sufficiently good.

The first single cylinder experiments were done with the engine adjusted to a 10:1 compression ratio and operated on methane fuel introduced into a mixing tank. FIGS. 58 and 59 show representative results of this engine. The results made clear that the variable restriction fluidic port significantly improved efficiency and shifted the optimum fuel economy mixtures significantly leaner, as the inventor had expected. During that time when the date of FIGS. 58 and 59 was taken, the engine was not set up for emission measurements.

One important difference between the data of FIGS. 58 and 59 and the lower compression ratio data to follow was that the fraction of fuel-air cycle efficiency shown with the high compression ratio engine was significantly higher than that shown with the lower compression ratio engine. The inventor believes that the explanation is as follows. With the high compression ratio engine, there was significant squish around top dead center piston position, and this squish distrupted the flow structure inside the combustion chamber, reducing heat losses during the power stroke. With the lower compression ratio piston, tdc clearances were great enough that squish was insignificant, and this is believed to be the explanation for the higher heat losses of the lower compression ratio engine. If this explanation is correct, squish is highly desirable for a fluidic port equipped engine. However, the inventor has not directly verified that squish is useful for reducing heat losses, although the effect seems very likely.

The experimental sequence which produced FIGS. 58 and 59 made clear that the test results that the inventor had gotten with his full size engine were not a fluke, and that, indeed, the best economy air-fuel ratio could be extremely lean, and the efficiency could be improved with improved in-cylinder mixing. However, Professors Uyehara and Myers felt that methane was a somewhat unrepresentative fuel (although easy to meter, since it was an ideal gas) and suggested that the test setup be modified to run with propane, a more typical fuel and a fuel where automobile companies have accumulated large masses of test data. The data points plotted in the following figures were accumulated with the test engine operated on propane.

DRASTIC REDUCTION IN $NO_x$ AND IMPROVEMENTS IN FUEL ECONOMY WITH THE VARIABLE RESTRICTION ENGINE

The effects of equivalence ratio and mixing on $NO_x$ formation in engines have been discussed in some detail with respect to FIGS. 3, 4, 5, and 6. In addition, very advanced computations, too complicated to be considered in a patent application, were conducted for the inventor by Dr. J. Carl Pirkle (then of the Johns Hopkins University and now of Exxon Research and Engineering Corporation) which integrated the kinetic equations characteristic of engine operations in enough detail to make quite sure that very low $NO_x$ results were possible with extremely dilute combustion. These calculations by Dr. Pirkle were a strong encouragement to the inventor to persevere in his work in the face of many discouragements. It should be said that a significant body of the engine literature evidence stood against the inventor in his belief that ultralean engine operation with very good mixing would permit the ultralow $NO_x$ results he was seeking. It was, for example, well established in the literature that at the normal lean limits of engine operation there were no great effects of additional mixing with respect to $NO_x$ output. In addition, the inventor had been told by authoritative researchers actually working in the field that the degree of in-cylinder turbulence and swirl required in the present invention would result in heat losses such that any thermodynamic advantages of the system would be outweighed by the additional heat losses. In addition, the inventor was setting out to burn mixtures so dilute they were, according to the conventional wisdom, substantially incombustible under engine operating conditions.

FIG. 60 shows very important experimental results which verify the basic theory and practice of the invention, and which also show why the advantages of superhomogeneous combustion would not be apparent to one who was extrapolating engine data in the conventional way. The data in FIG. 60 was taken at a set engine speed of 1200 r.p.m. with the fuel flow set at a constant rate of 1.30 pounds of propane per hour. For each data point spark advance was set at the MBT setting (as will be shown, this significantly understates the advantage of the present invention with respect to more conventional spark settings) and because of the very important nature of the results shown in FIG. 60, many of the data points were repeated. Because of the requirement to establish MBT spark timing within at least one degree, the data in FIG. 60 represents a significant amount of experimental time. It is believed, and it will be made clear later, that the bulk of the scatter in the data of FIG. 60, even with careful determination of spark timing, is due to statistical variations in the MBT spark timing determination from point to point. The experimental sequence for taking the data was as follows: The engine was fully warmed up (about the power of steady state running) at roughly the stoichiometric ratio; during this time the $NO_x$ measuring apparatus was also warmed up and calibrated when fully warm (the calibration of the $NO_x$ meter was rechecked after each experimental day, and drift was found to be neglible). For the data points marked wide-open flap port injected, the variable restriction flap of the engine setup was fully open, so that the engine produced a flow pattern not too different from that of a conventional stock engine (although with a irrotational flow component which was necessitated by the fluid mechanics of the particular port used). The propane fuel was injected approximately six inches ahead of the intake port itself, so that there was significant heterogeneity of the charge inducted into the engine. It is believed that the degree of heterogeneity characteristic of this wide-open flap port injected run is fairly characteristic of the heterogeneity actually delivered in conventional engines under normal operating conditions. For the data points marked with X's the variable restriction flap was closed until only a 0.300 inch gap (measured with a very precise variable restriction Vernier arrangement) was open between the floor of the port and the flap restriction which was a flap restriction similar to that shown in FIG. 34B. For the 0.300 inch flap opening port injected points the port injection arrangement was identical to that of the wide-open flap port injected run. For the data points marked with triangles the flap opening was again 0.300 inches, but the mixture was premixed with a vortex (which was not heated since propane was already a gaseous mixture) prior to delivery to the engine. It is believed that the mixture from the cold vortex mixer was substantially homogeneous prior to introduction to the engine intake port, although the vortex mixer used in these experiments was substantially more primitive than that which has previously been discussed.

FIG. 60 graphs the variation of $NO_x$ output versus equivalence ratio with the $NO_x$ output expressed as grams $NO_2$ per indicated horsepower hour, on a logarithmic scale, since the $NO_x$ output varied by more than a factor of a thousand from point to point. The ordinant of the graph is equivalence ratio. Relationships between equivalence ratio and the more typically used air-fuel ratio are clearly shown on the ordinant of FIG. 3 (which was taken from a publication of Paul N. Blumberg).

In FIG. 60 it is shown that at the relatively rich ratios characteristic of conventional engine operation, there is not much advantage to the extreme homogeneity supplied by the present invention. Between an equivalence ratio of 1.0 and 0.8 stoichiometric, the difference in $NO_x$ output among the wide-open flap port injected case, the 0.300 inch flap port injected case, and the 0.300 inch flap cold vortex mixer case is neither particularly large nor very convincing. However, in the range leaner than 0.8 equivalence ratio, the situation changes drastically. For the no port restriction case, the best fuel economy happens at an equivalence ratio of 0.735, so that enleanment beyond this point results in quite significant fuel economy penalties. From the equivalence ratio at the very leanest limit where engine operation was possible (0.59 equivalence ratio) to the richest mixture tested at stoichiometric, there is only a little more than a factor of ten change in the $NO_x$ output in the conventional case. Furthermore, most of this $NO_x$ range involves a fuel consumption penalty: the optimal indicated specific fuel consumption level for the conventionally set up engine involves $NO_x$ outputs of almost half the maximum $NO_x$ outputs for this engine under these conditions. It is results like those shown here for the conventionally set up case which have convinced the industry that $NO_x$ control via charge dilution is a relatively unattractive procedure incapable of producing the very low $NO_x$ output levels which will be required by the federal government. It should also be said that the relatively low reductions in $NO_x$ level with enleanment are anomalous with respect to chemical kinetic calculations in engines, and that the industry has largely discounted these chemical kinetic calculations in the face of this data.

In the range leaner than 0.8 equivalence ratio, the $NO_x$ performance of the variable restriction engine is drastically better. Quite clearly, for a set equivalence ratio leaner than 0.8 equivalence ratio, the variable restriction engine with its superior in-cylinder mixing had significantly lower $NO_x$ levels. For example, for the 0.300 inch flap restriction port injected case, the optimum fuel consumption (miminum indicated specific fuel consumption point) occured at an equivalence ratio of 0.59 equivalence ratio at a $NO_x$ level of 0.27 grams per indicated horsepower hour. This represents a 48 fold reduction in $NO_x$ level from the maximum for the variable restriction engine, in contrast to only a 2.4 fold reduction in $NO_x$ output from the maximum for the conventional engine setup when comparing the fuel consumption optimal $NO_x$ output to the maximum $NO_x$ output. In addition, the indicated specific fuel consumption with the variable restriction engine was significantly and reproducibly less than the indicated specific fuel consumption of the optimal setting for the conventionally set up engine, so that the drastic reduction in $NO_x$ was attained with a simultaneous (although relatively small) improvement in the fuel economy of the engine. The advantages of homogeneity and structured flow turbulence are even more dramatically shown for the case where the variable restriction engine is supplied with a mixture homogenized by the vortex. In this case the optimum indicated specific fuel consumption is even lower, and the reduction in $NO_x$ from the maximum is a very large factor of 420. The relationship between equivalence ratio and $NO_x$ characteristic of the variable restriction setup engines is extremely close to that predicted by the chemical kinetic calculations of Pirkle and others and stands in significant contrast to the kinetically anomalous $NO_x$ versus equivalence ratio characteristic of the conventional engine. The anomalously small reductions in $NO_x$ with mixture dilution for the conventional engine setup are due to inadequate mixing. Several points with respect to the data shown in FIG. 60 should be emphasized. The data shows the effect of mixture dilution via enleanment but does not show data employing exhaust gas recirculation because of the great practical difficulty in metering exhaust gas flows to an engine to the level of accuracy characteristic of the inventor's test setup. Those skilled in the internal combustion engine arts, and those skilled in chemical kinetics will recognize that exhaust gas recirculation is generally considered to be a more effective diluent than excess air, due to the fact that flame stability is generally better with high EGR than with very lean mixtures having the same $NO_x$ output. There is every reason to expect that the variable restriction engine would show the same qualitative and quantitative advantages with respect to $NO_x$ reduction and improved fuel economy if EGR was employed as a significant part of the diluent; however, it is expected that the absolute value of the $NO_x$ levels with exhaust gas recirculation would be even lower than those shown here. It is also believed that there is still room for considerable improvement in the in-cylinder mixing rate of the engine. The fluidic performance of the intake port of this test engine was significantly inferior to the fluidic performance of prototype port designs which the inventor has modified from a 350 c.i.d. Chevrolet head, and it is expected that with improved port fluidic efficiency improved mixing would be attainable. A reader who has carefully considered the fluidic information in this case will recognize that a significant amount of careful experimental work will be necessary to produce an absolutely optimal flow structuring in any engine. Nonetheless, if the fluidic ports do produce the tangential flow disclosed in the present case, a structured flow in the engine having excellent flow results will occur. It is expected that it will be relatively easy to produce fluidic results superior to those of the test setup generating the data described here for any production engine.

A very important point which can be seen by looking at FIG. 60 is the extremely rapid rate at which $NO_x$ output falls off in the very lean area. In this very lean range, a few percent variation in equivalence ratio can account for an order of magnitude change in the $NO_x$ output. This result is extremely reasonable kinetically. The result also has very practical implications: In the very lean range there is a very large payoff to widening flame stability limits, and even a relatively small change in flame stability limits can result in a substantial reduction in the $NO_x$ output of the engine at best fuel economy trim. Another point which is very clearly emphasized by FIG. 60 is that there is in the lean regime a very substantial payoff to mixture homogeneity.

FIG. 60 shows very dramatic reductions in nitric oxide output, in addition to improved fuel economy with the variable restriction homogeneous charge engine of the present invention. With the fluidic port engine, $NO_x$ outputs a factor of a hundred less than those attainable with the conventional engine are available. The fluidic port structured flow mixing arrangements of the engine of the present invention represent a breakthrough in $NO_x$ control and drastically change the conventionally understood tradeoff between fuel economy and $NO_x$ to a point where the optimal setting from the point of view of fuel economy also produces ultralow $NO_x$ emissions. It should be emphasized that the load of the engine for FIG. 60 varied between 61 and 69 p.s.i. indicated mean effective pressure, that the indicated mean effective pressure was at its maximum at the optimal indicated specific fuel consumption points, and that the indicated mean effective pressure of 69 p.s.i. is a relatively heavy load for conventional driving. A consideration of the data of FIG. 60, in combination with the data to follow, should make the detailed and complex arguments of this case with respect to FIGS. 3, 4, 5, and 6 more meaningful, and should serve to verify a close relationship between the theory put forth in that discussion and the actual results in the engine.

FLUIDIC ENGINE DATA CORRELATED AGAINST THE EPA-CVS EMISSION CYCLE

Emission control in practice must be achieved on full size vehicles capable of flexible operation under all the many conditions where automobile engines are expected to behave well. However, setup of an engine in a vehicle with a particular control strategy is an extremely expensive process, and it has therefore become well established to predict the emission control characteristics of an engine control strategy from correlations before the actual effort of engine buildup is undertaken. In this way, many more strategies can be evaluated than would otherwise be possible, and the tradeoffs between one engine characteristic and another become more clear. One of the better correlations schemes between steady state engine performance and cycle performance in a vehicle is the correlation scheme of Paul N. Blumberg which is used by the Ford Motor Company (Powertrain Simulation: A Tool for the Design and Evaluation of Engine Control Strategies in Vehicles, SAE Paper 760158). In Blumberg's correlation procedure, the cycle is approximated by a matrix of speed-load points, with each point weighted so that the sum of the emission outputs from these points should predict the emission output of a well set up vehicle, using the control strategy evaluated with the correlation matrix.

Since a full size engine buildup with the improved fluidic ports has not been completed, the correlation scheme offers a useful check on the emission control advantages which could be expected from the present invention engine. Blumberg's correlation scheme was originally set up plotting brake mean effective pressures versus engine speeds; it is well established that single cylinder engines have anomalously high friction when compared with multi-cylinder engines. To correct for this friction effect, the indicated mean effective pressure from the test engine was determined using the motoring method, and a friction mean effective pressure of 20 p.s.i. under all conditions was assumed. This friction mean effective pressure estimate was used because it was held to be an extremely conservative (pessimistic) estimate of the advantages attainable with the fluidic port engine. Those skilled in the internal combustion engine arts will recognize that the fuel consumption predictions from any such correlation scheme will be extremely sensitive to the value of friction mean effective pressure assumed. With a lower friction mean effective pressure assumption, predicted fuel economy would be significantly improved and $NO_x$ emissions would also be reduced.

The Blumberg correlation matrix which the inventor was able to obtain applied to a 1972 Mark IV vehicle with a curb weight of 5500 pounds, which is drastically heavier than the weight of most new vehicles, and with a 351 cubic inch displacement engine. Clearly, the predicted emission levels would be less for a lighter vehicle.

FIG. 61 shows the indicated mean effective pressures and rpm's for the Blumberg 8 point matrix approximation of the Environmental Protection Agency CVS hot cycle which will be applied in the data immediately following. Blumberg was able to show that the correlation procedure when applied to Ford data, produced an excellent prediction of actual vehicle performance. Note that points are labeled by number.

FIG. 62 plots $NO_x$ emissions in total gram contribution for the cycle, for each of the eight points on the Blumberg matrix. Comparing the Blumberg data points with the points for the maximum fuel economy setting for the variable restriction engine, using a mixing arrangement much inferior to that of the vortex (It is expected that had the vortex been used on this data, $NO_x$ levels from the fluidic port engine would have been reduced by something of the order of a factor of two). Note that the great bulk of the nitric oxide emitted over the cycle is represented by points 4, 5, 6, 7, and 8. For each of these points, the $NO_x$ reduction of the fluidic port engine when compared with the base line Ford 351 cubic inch engine is dramatic. The advantage is even greater than it appears, since the data for the fluidic port engine was done with MBT spark timing, while the spark timing on the '74 Ford engine involved a significant amount of spark retard. It should also be emphasized that the $NO_x$ reduction of the fluidic port engine was attained without benefit of exhaust gas recirculation. FIG. 63 plots in graphical form the $NO_x$ emissions in grams per mile $NO_2$ which would be predicted for the fluidic port engine using the Blumberg eight point correlation running the engine on propane for fuel metering accuracy. In FIG. 63 is also plotted the very drastic relation between $NO_x$ output and spark timing, and also the strong relation between $NO_x$ output and equivalence ratio. For the absolute optimal equivalence ratio and MBT spark timing, the $NO_x$ output from the vehicle was predicted to be 0.313 grams $NO_x$ per mile. For the same air-fuel ratio, with a spark retard of 5 degrees, the $NO_x$ output was predicted to be less than 0.1 grams per mile $NO_x$. The 5 degree retard involved an approximately 2 percent penalty on fuel consumption and in exchange produced more than a three-fold reduction in $NO_x$ output. The graph also shows the very important effect of changing equivalence ratio. For the power optimal setting, if spark advance is held constant and the mixture is then set 10 percent richer than its optimal setting, the $NO_x$ output of the engine increases by essentially a factor of ten. A similar effect is present for the retarded spark cases. Clearly, the $NO_x$ output of the engine depends to a very great extent on the spark timing and the air-fuel ratio supplied to the engine. These points will be discussed in more detail in subsequent figures.

FIGS. 64, 65, and 66 discuss the HC emissions from the engine, which are high. Although the test engine which was employed always had HC emissions more than a factor of two in excess of those of more recent engines, the HC emission output from the engine are still relatively high. The HC emissions, however, are in the catalyst controllable range and are, for example, in the same range as those of the Ford Proco engine which is currently under very heavy development. FIG. 64 for HC is analogous to FIG. 63 for $NO_x$. From FIG. 64, it can be seen that the HC emissions at the power optimal are significantly higher than those for a 10 percent richer mixture, and one can see the common effect of spark retard for reducing HC emissions. FIG. 65 shows the HC emissions of the variable restriction engine on the Blumberg eight point matrix compared with the data for the 1974 Ford 351 baseline engine. The HC emissions with the variable restriction engine are significantly higher. It is not known to what extent the HC penalty is due to enleanment and to what extent the HC penalty is due to the very dilute combustion of the present invention. However, the HC increase with the very lean combustion was less than a factor of two over the HC output of this same test engine when adjusted to minimize HC. This is a relatively small percentage HC penalty for enleanment, when compared to the HC penalties more commonly encountered. However, the extent of the HC problem with present invention has not yet been definitively established, and, although experimental work to control engine-out HC with this engine is at the conceptual stage, actual experimental work has not been undertaken.

FIG. 66 answers the question, "How does HC emission vary with the setting of the variable port restriction, when other variables are held constant?" In the run plotted in FIG. 66 air flow and fuel flow were both set approximately constant, spark advance was held constant, and the flap setting was changed. There are two points which are plotted which could not later be reproduced and therefore have question marks; however, these points are included for completeness. An opening of 1.55 inches was the full open flap position, and the minimum flap opening position plotted was the minimum opening which was possible wihout changing air-fuel ratio by restricting air flow. It can be seen that the total range of indicated specific HC emissions for this run is between approximately 7.8 and 6.25 grams per indicated horsepower hour hydrocarbon, which is a relatively small range. One could, perhaps, gather from the data of FIG. 66 that the variable restriction has a small but positive effect on HC emissions. However, the most conservative conclusion, for the equivalence ratio of the run of FIG. 66, is that the variable restriction has no significant effect on HC emissions. In all events, it is quite clear that the variable restriction does not make HC emissions worse.

A very important issue with respect to dilute combustion is combustion smoothness. The commercial acceptability of an engine is not simply a matter of emissions and fuel consumption: The driver must feel that the engine is smooth and responsive and he will respond very badly to a rough running engine. FIG. 67 plots the variation in peak pressure measured with the Kistler pressure probe for the eight point Blumberg matrix. The data was taken by looking at peak pressures recorded in oscilloscope photographs taken under the operating conditions of the Blumberg optimals which have been discussed previously. The peak pressure variation of the engine was not zero, but it was well within the range typical of commercial engine practice. The peak pressure variations recorded correspond to less than a one percent variation in torque from cycle to cycle. It is expected that with a fluidically superior port arrangement these statistical variations in peak pressure could be further reduced.

FIG. 68 records experimental data set up to answer the question, "What is the effect of the variable restriction flap opening on flame speed?" Those skilled in the internal combustion engine arts recognize that spark advance is a convenient variable to estimate flame speeds. The lower the best torque spark advance, the faster the flame speed. As can be seen from FIG. 68, as the flap restriction begins to close, there is a significant reduction in MBT spark advance initially, and then a range where the dependence of spark advance on flap setting is essentially negligible, and then a relatively rapid transition, and then, at the smallest flap openings, a range where MBT spark advance is again insensitive to flap setting. (A significant amount of data like that of FIG. 68 has been accumulated and the qualitative performance of the flap with respect to MBT spark setting is typical for a significant range of speeds and loads. Several points with respect to FIG. 68 are of interest. First, within certain rather well defined ranges, spark advance is not a sensitive function of flap setting. This is important, since it means that the spark setting will not be too sensitive to changes in flap setting. Another point, of course, is that the variable restriction flap does have a quite significant effect on flame speed.

FIG. 69 plots the same experimental data points shown in FIG. 68 in a different way. In this run the indicated mean effective pressure of operation is plotted against flap opening. Several points with respect to FIG. 69 are important. First, it can be seen that the first effect of restricting the fluidic port is a small but definite and reproducible decrement in engine efficiency. Only when the flap restriction is significantly restricted is the efficiency of the engine improved with the variable restriction. It should be noted that an extrapolation of engine performance from small port restrictions would lead to the erroneous conclusion that additional engine turbulence infallibly hurt efficiency, while improvements in fuel economy could be obtained if the port restrictions were restricted more significantly. An additional point is commercially important. The engine output is not too sensitive to variations in flap setting. The flap setting is not such a critical parameter that it is difficult to control commercially. Relatively primitive flap actuation arrangements are therefore satisfactory, and the cost of the system is therefore much less than it would be if the engine performance was very sensitive to flap setting.

FIGS. 70 to 75 show the sensitivity of the $NO_x$ output to variations of spark advance and variations of equivalence ratio. These curves should give a clear sense of the importance of proper equivalence ratio control and proper spark timing. FIG. 70 plots $NO_x$ with respect to variations in equivalence ratio for Blumberg's matrix point one. Lines are plotted for MBT spark timing, for MBT minus 5 spark timing, and additional points for MBT minus 7.5 degree spark timing are shown also. The penalty for enrichment of the mixture beyond the best economy mixture is substantial with respect to $NO_x$. For the low load conditions of Blumberg's point one, there is also a slight but relatively insignificant penalty in being leaner than the optimal setting.

FIG. 71 also shows the relationship between $NO_x$, equivalence ratio, and spark advance for Blumberg's point one. The lines are relatively clearly labeled. The graph should make quite clear that there are substantial penalties to advancing the spark beyond the MBT spark setting, and significant advantages in retarding the spark from the MBT setting with respect to $NO_x$. FIG. 72 is analogous to FIG. 71 but plots data for Blumberg's matrix point 4. For this higher load point, the penalty in nitric oxide of additional spark advance is small for mixtures leaner than the true best economy mixture. Also, it can be very clearly seen from FIG. 72 that if the mixture is richer than the true best economy mixture, $NO_x$ levels are much increased and penalties from spark advance are increased also. FIG. 73 also deals with Blumberg matrix point 4 and is analogous to FIG. 70. Note that there is an extremely heavy penalty of mixture enrichment beyond the best economy mixture. FIGS. 74 and 75 plot $NO_x$ sensitivity to equivalence ratio and spark advance for Blumberg matrix point number 5 which is a higher load point. From these figures the very significant advantage of mixture enleanment should be clear, and the very significant $NO_x$ advantage of spark retard should also be clear. Specifically, for FIG. 75, note that with a mixture which is 3 percent leaner than the true best economy mixture (a mixture which involves less than a one percent fuel penalty) the very heavy penalty with respect to spark advance is very much softened from that which occurs with the richer mixtures.

Those skilled in the internal combustion engine arts will recognize that the $NO_x$ sensitivity of the variable restriction engine to variations in equivalence ratio is significantly less than that shown by the three-way catalyst engine. Nonetheless, it is very clear that calibration of the engine is vitally important for low $NO_x$ to be achieved simultaneously with good fuel economy. Considerations of FIGS. 70 to 75 should also make clear how heavy the penalties of cylinder-to-cylinder statistical variation can be, even if smooth engine operation were attainable with the cylinder-to-cylinder variations. It should also be noted that there are very substantial advantages in operating the engine slightly leaner than the true best economy mixture (or improving mixing so as to somewhat widen flame stability limits and lean out the true best economy mixture): As the mixture becomes more lean, the system is much more forgiving of spark advance variations and small percentage variation in equivalence ratio about the set point. With respect to the data involving the Blumberg correlation, it should be emphasized again that these data points were taken without the vortex mixer, and that substantial reductions in $NO_x$ output beyond those shown should be attainable with the addition of the vortex. Although a complete data set for the Blumberg points were not taken with the vortex, for Blumberg point 5, which is responsible for a very significant fraction of the total $NO_x$ output for the correlation, the $NO_x$ output was reduced by more than a factor of ten with use of the vortex, and the fuel consumption was simultaneously improved.

The structured flow and turbulence homogeneous charge engine of the present invention has the potential for $NO_x$ emissions very much below any proposed emission standard for $NO_x$, with the hydrocarbon emissions in a calalytically controlled range. With respect to the catalytic control, it should be mentioned that the lean operation of the engine will eliminate the requirement for an air pump. Significant oxidation catalysis can be purchased for the manufacturing cost of an air pump with its auxiliary equipment. It should also be pointed out that the data shown here is probably not near the limit of the $NO_x$ control available with the fluidic port engine. With the use of exhaust gas recirculation, vortex mixing, or efficient fluidic ports, and some detail design with respect to combustion chamber shape, it is expected that the results can be significantly improved. This is important, since it is commercially useful to work with designs which produce emission levels significantly below the emission control targets, to compensate for the problems of unavoidable manufacturing variations. The very homogeneous charge engine of the present invention should permit $NO_x$ emissions to be held so low that $NO_x$ control is not a determining factor in engine design, so that engines can be built for best fuel economy and with excellent driveability.

Because the engine of the present invention operates in a lean and homogeneous manner, its carbon monoxide emission rates are very low (so low that they could not be accurately measured with equipment available at the Internal Combustion Engine Research Laboratory of the University of Wisconsin). It should also be mentioned that the fuel economy predicted for the variable restriction port engine was 11.5 percent better than that of the baseline Ford engine. With more usual assumptions with respect to engine friction, the advantage of the variable restriction engine with respect to fuel economy would have been larger. The fuel economy penalty from the optimum optimorum for a 5 degree spark retard was approximately two percent, so that operation of the engine with a 5 degree spark retard would still have substantial fuel economy advantage over the baseline Ford engine.

Other data with respect to the fluidic port variable restriction engine follows. FIG. 76 compared the $NO_x$ output at the lean limit (defined operationally as that equivalence ratio producing 6,000 parts per million methane equivalent) for the engine equipped with the flap and for the engine operated without the variable restriction. In both cases the engine was port injected. The lean limits were investigated over a substantial range of indicated mean effective pressures (engine loads). It can be clearly seen that the $NO_x$ output at the lean limit is drastically lower with the variable restriction employed than when the variable restriction is fully open. Usually this reduction in $NO_x$ output amounts to more than a factor of ten reduction. It should be emphasized that the $NO_x$ output levels would be lower yet if the vortex had been employed. FIG. 77 plots the indicated mean effective pressure and the indicated thermal efficiency measurements recorded for lean limit run described in FIG. 76. The advantage of the variable restriction flap can be clearly seen.

FIG. 78 shows the effect of the flap at the very large opening of 0.400 inches compared with the no flap case. A flap with an opening of 0.400 inches under the 1200 r.p.m. engine operating conditions plotted here has an almost zero pressure drop across it, and therefore a relatively quite small velocity of flow across the port flow restriction. Nonetheless, it can be seen that the variable restriction systematically reduces the best torque spark advance, by changing structured flow patterns.

FIG. 79 plots indicated specific HC versus equivalence ratio for the same data points as those plotted for FIG. 78, again where the flap engine was set up for 0.400 inches. For the relatively rich mixtures, the flap has only a small advantage, but for very lean mixtures the HC emission levels are very substantially less with the flap than they would be without it.

FIG. 80 is again a plot of the same data points plotted for FIG. 78 and FIG. 79 and plots the indicated thermal efficiency of the engine versus its equivalence ratio. On the no flap run there is what appears to be a wild point which produces an anomalous hump in the curve, but the plot has been plotted to include it since the point was not shown to be wrong by actual checking. In all events, for the flap case, it can be seen that the indicated thermal efficiency of the engine (likewise the brake thermal efficiency) of the engine continues to increase as the mixture is enleaned all the way to the leanest point run. For the case of FIG. 80, it can be seen that the minimum $NO_x$ point, the leanest point, is also the best engine efficiency point.

FIGS. 81, 82, 83, 42, and 43 plot various aspects of a Schweitzer curve (set fuel variable air flow spark advance optimal) run. FIG. 81 plots indicated thermal efficiency versus equivalence ratio. For this very low load, there is more scatter than would be desirable. However, the flap variable restriction points are generally significantly superior to the no flap points. FIG. 82 plots the same points in a manner which makes them look significantly more coherent, by plotting indicated specific fuel consumption in pounds of fuel per indicated horsepower hour versus equivalence ratio. Here, the superiority of the flap is somewhat clearer. FIG. 83 plots the same points plotting indicated specific hydrocarbon in grams HC per indicated horsepower hour versus equivalence ratio. It can be clearly seen that at relatively rich ratios there is no significant difference between the engine equipped with a flap and the engine with the flap restriction. However, in the very lean range the variable restriction flap is substantially superior to the conventional engine with respect to HC emissions. FIG. 42 plots MBT spark advance (a variable analogous to flame speed) versus equivalence ratio. It can be clearly seen that the flame speeds with the variable restriction very substantially faster than the flame speeds which occur without the restriction in the port. FIG. 43 shows the superiority of the fluidic port variable restriction engine much more dramatically than FIGS. 81 to 83. In this relatively low load regime, the importance of in-cylinder mixing with respect to residual gases is so important that each and every data point plotted shows that the flap produces $NO_x$ emissions substantially below the $NO_x$ emissions which would occur without the flap. A consideration of the discussion with respect to FIGS. 3 to 6 should make this data quite reasonable: The data shown in FIG. 43 should clearly emphasize the importance of in-cylinder homogeneity for $NO_x$ control.

FIG. 44 shows the MBT spark timings which correspond to the data points of FIG. 60. The increase in flame speeds with the flap restriction in the fluidic port are clearly shown. It is also clearly shown that the homogeneity of the mixture is not a significant determinant of flame speed, since the MBT spark timings of the port injected flap case and the vortex mixed flap case are not significantly different. This, of course, is consistent with the data and theory that flame speed is determined by in-cylinder turbulence levels.

FIG. 45 shows peak pressure variation measured from oscilloscope photographs of the trace from the Kistler pressure probe. It can be seen that the variation in peak pressure with the flap is less than the variation in peak pressure without the flap. The data points on FIG. 45 are also plotted in FIG. 60. FIG. 46 plots intake manifold vacuum in inches of mercury versus equivalence ratio. The most significant point with respect to FIG. 46 is that with a 0.300 inch flap opening at 1200 r.p.m. the intake pressure drop across the flap restriction amounts to only about two inches of mercury. The flap has a significant combustion effect (shown dramatically in the $NO_x$ data plotted in FIG. 60) without having much of an effect on intake manifold vacuum. It should also be emphasized that FIG. 46 shows that even under the very leanest conditions in FIG. 60, further mixture enleanment was not limited by intake manifold vacuum, but was limited by flame stability. Skilled automotive engineers will recognize that a significant increase in torque for a set equivalence ratio is possible by changing intake manifold vacuum from four inches of mercury to roughly zero inches of mercury (something like a 40 percent increase). The very lean operating conditions for ultralow $NO_x$ emissions are possible under relatively quite high engine loads, although for absolute maximum power the fuel-air ratio must be richened to the maximum power ratio and under these (extremely infrequently encountered) conditions $NO_x$ output from the engine will be high.

FIG. 47 plots indicated specific $NO_x$ versus equivalence ratio for a load condition higher than any which occurs in the Blumberg correlation. For this particular run, it can be seen that the flap is actually worse with respect to $NO_x$ at the mixtures which correspond roughly to the maximum output level, but that the variable restriction becomes advantageous under the (fuel economy optimal) leaner ratios. It should be noted that the data of FIG. 47 was run with the engine port injected and that the minimum $NO_x$ values could have been reduced substantially with addition of the vortex.

FIGS. 48 and 49 compare the inventor's fluidic port data to data published by Peters and Quader of General Motors Laboratories on a stratified charge engine ("Wetting the Appetite of Spark Ignition Engines for Lean Combustion" S.A.E. paper #780234, July 1978). FIG. 48 plots indicated specific fuel consumption in micrograms per joule versus equivalence ratio. The fluidic port data with respect to fuel economy is substantially as good as that of the best injection timing (BIT) data in the figure for the engine stratification scheme. FIG. 49 plots the inventor's fluidic port variable restriction data versus Peters' and Quader's plot. It can be seen that the fluidic port plot is very similar to that of Peters' and Quader's premixed plot except that the lean misfire limit for Peter' and Quader's data is very much richer than the lean misfire limit for the fluidic port engine. Because the plot in FIG. 91 is not a logarithmic plot on $NO_x$, the drastic reduction in $NO_x$ for the fluidic port leaner than 0.62 stoichiometric cannot be plotted. However, it is important to compare the $NO_x$ performance of the fluidic port engine at its best economy (TBEM or true best economy mixture) with that for the Peters and Quader engine. For like equivalence ratios the Peters and Quader engine, because it involves charge heterogeneity, has much higher $NO_x$ output levels. Under conditions leaner than 0.62 equivalence ratio, when the $NO_x$ output with the fluidic port engine is almost zero, the $NO_x$ output of the Peters and Quader engine is still substantial. In addition, the lean misfire limit for the fluidic port engine is as lean as the lean misfire limit for the Peters and Quader (wet injection) stratified charge engine. It is worth pointing out that the Peters and Quader work has been considered important enough to be significantly noticed in the automotive engineering press, and that in the writeup of the Peters and Quader paper, no clear understanding of the stratification process in the Peters and Quader engine (which involves a structured flow process) existed.

DISCUSSION OF PHRASES IN THE CLAIMS

In a case so long and so complicated as this one, it is well to have a discussion of some of the terms used in the language of the claims in a form compact enough for ready reference. Since the present case involves interrelated concepts either novel or quite infrequent in automotive engineering, precise definition of the terms used in the claim language is also somewhat more important that it might be otherwise.

The present invention intimately involves the use of controlled, structured, turbulent flows to produce intimate mixing and adequate flame speeds for the very dilute mixtures required for very low $NO_x$ emissions. Producing these controlled, structured, turbulent flows involves attention to details of flow geometry not previously appreciated in automotive engineering. The terms involved are, however, well understood by men skilled in the art of fluidics and references to this fluidic field have already been given. A high speed flow near a reasonably well shaped passage wall or surface will tend to attach to that surface to form a wall attached "Coanda" stream, and this stream will tend to spread and dissipate its kinetic energy into random turbulence much more slowly than would an unattached, free jet stream. It is this Coanda wall attachment effect which permits a significant fraction of the flow energy past a variable port restriction to be delivered into an engine combustion chamber in sufficiently coherent form to produce a useful structured flow in the cylinder. Some of the fluid mechanics of the wall attachment effect has been discussed in this case, and much more detailed descriptions exist in the fluidic literature. If the flow energy past the variable restriction is to be preserved for delivery into the engine cylinder, it is important that the port be "shaped to preserve the Coanda flow." A number of rules, sufficient to guide one skilled in fluidics or fluid mechanics in the shaping of a fluidically efficient port, have been given in the current case, and an important negative rule, the avoidance of step-up, has also been discussed. Since an infinite number of small variations in port shape is possible, a complete enumeration of all port shapes, "shaped to preserve the Coanda flow," is not possible, but one skilled in fluidics should be able to in most cases tell whether a port is shaped to preserve the flow or not. In all cases, the ability of the port to preserve the energy in the Coanda flow can be determined by simple steady state flow experiments which are very inexpensive in terms of the issues involved.

The concept of a structured turbulent flow is central to the present invention. In a structured turbulent flow, most of the kinetic energy in the flow exists in the form of a relatively well defined pattern, or hydrodynamic dance, and random turbulence is superimposed on this structured flow pattern. Much effort in the current case has gone towards explaining the concept of structured turbulent flow and showing its great relevance to internal combustion engine mixing. In the present invention, very rapid mixing is attained by having the flow energy from the variable port restriction produce a structured turbulent flow in the cylinder where any initial concentration field is stretched, distorted, and spread so that even if charge stratification existed early in the mixing process, the flow would distribute the rich and lean elements widely within the volume to be mixed so that the mean distance across which random turbulent molecular diffusion would have to occur in order to complete the mixing process would be relatively short. An important example of this sort of a rapidly mixing turbulent flow structure is the irrotational flow vortex, although a great many other efficient mixing flow structures also exist. An example has also been given of a turbulent structured flow relatively very ineffective for mixing in the form of the rigid body rotation vortex. Flow structures characterized by high velocity gradients tend to stretch, distort, and spread the mixants in a desirable way.

The term turbulence, in the sense in which it is used with response to structured turbulent flows and in the sense in which it is used in the claims, is the random fluctuating motion which may be distinguished from the structured flow motion. The concept of turbulence as it is used here is rather well exemplified by the analysis of David Lancaster's data shown in FIGS. 18A, 18B, and 18C of the present case.

The present invention is intimately concerned with questions of mixing which are fundamentally statistical issues. Terms such as "completeness of mixing," "very tight statistics," and "tight air-fuel-residual microscale mixing statistics" occur in the claims. A distribution is held to be "tight" when the standard deviation of individual elements from the mean is small. As the graphical illustration of FIG. 6 showed, tight air-fuel mixing statistics permit adequate combustion with much leaner ratios than would be permissible with worse statistics. It should be pointed out that the best combustion results under the present invention require tight cylinder-to-cylinder air-fuel-residual statistics, tight statistics cycle to cycle for each cylinder, and then mixing inside the cylinder and combustion chamber so that the microscale fuel-air-residual mixing statistics are also tight. Means to achieve these goals using structured turbulent flows have been disclosed in the current case.

The excellent mixing and flow control disclosed in present case will not produce low nitric oxide emissions unless the engine is operating with a dilute fuel-air-residual mixture. For example, the data of FIG. 60 show that unless the mixture is quite dilute, there is essentially no $NO_x$ advantage to the controlled structured turbulent flow system, but that with sufficiently dilute mixtures, very dramatic reductions in nitric oxide output are available with the improved mixing and controlled turbulence. The definition of the properly dilute mixture is made complicated by the fact, illustrated in FIG. 3 that the mixture may be made dilute by the addition of air in excess of the stoichiometric proportion, or by exhaust gas recirculation products of previous combustion, or by some combination of exhaust recirculation and excess air. In the claims, dilute combustion means combustion with a fuel-air-residual gas mixture leaner than the stoichiometric mixture and having a high enough concentration of diluents (some combination of excess air and products of previous combustion) so as to have low $NO_x$ output at best power spark timing. In some of the claims, an attempt is made to define the required level of mixture dilution in a determinant way, and this definition necessarily involves an experimental determination of the misfire limit dilution corresponding to the engine speed-load map at a number of points. This experimental determination of misfire limits is straightforward and relatively inexpensive and forms an unambiguous test as to the level of mixture dilution required.

What is claimed is:

1. In a multicylinder four stroke engine having an exhaust passage and a common intake manifold passage volume for several cylinders with depending intake ports wherein said intake manifold passage volume is maintained below atmospheric pressure during low power operation of said engine wherein said engine has in each intake port a variable restriction adapted to close off at least 70% of each port's flow cross section wherein for each such port the restriction is configured so that flow past it will form a wall attached stream and a step-up protrusion intake manifold passage wall to break up any wall attached backflowing stream of exhaust backflow past said restriction so that said exhaust backflow does not penetrate deeply enough into said manifold passage to disrupt the even delivery of air, exhaust gases, and fuel to the individual cylinders of said engine.

2. A method for achieving stable and rapid dilute combustion to produce very low $NO_x$ output in a piston type engine, wherein the engine includes an engine head, an air throttle, fuel input means, intake volume in an intake manifold fluidly connected between said air throttle and an intake port in the engine head, said head being mounted on a cylinder block including a cylindrical passage in which a piston reciprocates, so that the geometrical combination of said head and said cylinder and said piston form a combustion chamber having a volume of cyclicly varying displacement, said intake porting being connected to the combustion chamber, a variable restriction element to variably restrict flow in the intake part, intake valve means opening and closing fluid connection between said intake port and the combustion chamber in phase relation to the piston reciprocations to control flow from the intake port to the combustion chamber, exhaust valve means fluidly connecting the combustion chamber to an exhaust passage and opening and closing in specific phase relation to piston reciprocation, ignition means for the combustion chamber firing in phase to piston reciprocation, said engine operating on the four cycle principle comprising an intake stroke, a compression stroke, a power stroke and an exhaust stroke;

said method comprising the steps of:
 (1) Producing a dilute combustible air-fuel mixture;
 (2) Variably restricting flow of the dilute combustible air-fuel mixture in the intake port to form a "Coanda" wall attached flow and filling the space not occupied by said wall attached "Coanda" flow with a fluid mechanically stable recirculating vortex system, said vortex system smoothly intersecting with said wall attached flow thereby minimizing the turbulent dissipation of the wall attached flow;
 (3) Introducing said flow into the combustion chamber through said intake valve opening in the form of a high velocity flow having high angular momentum with respect to the central axis of said cylindrical passage, where the flow pattern through said intake valve opening forms a flow pattern inside said combustion chamber which pattern has the high velocity gradients characteristic of an irrotational vortex;
 (4) Controlling the mixture velocity through said intake valve opening so that said velocity may vary over a substantial range for a set engine speed, thereby producing in each combustion chamber a high velocity gradient structured turbulent flow having a flow pattern such that any fluid element located out of combustion chamber boundary layers is by the end of the compression stroke stretched, distorted and spread within the combustion chamber volume so that said fluid element is widely distributed spatially over said combustion chamber volume prior to ignition time, said flow pattern in the combustion chamber substantially increasing fuel concentration gradients so as to produce substantially homogeneous microscale air-fuel-products of previous combustion volume statistics thereby providing low cyclic time losses for mechanically efficient engine operation with very dilute mixtures.

3. A method for achieving stable and rapid dilute combustion to produce very low $NO_x$ output in a piston type engine, wherein the engine includes an engine head, an air throttle, fuel input means, intake volume in an intake manifold fluidly connected between said air throttle and an intake port in the engine head, said head being mounted on a cylinder block including a cylindrical passage in which a piston reciprocates, so that the geometrical combination of said head and said cylinder and said piston form a combustion chamber having a volume of cyclicly varying displacement, said intake porting being connected to the combustion chamber, a variable restriction element to variably restrict flow in the intake part, intake valve means opening and closing fluid connection between said intake port and the combustion chamber in phase relation to the piston reciprocations to control flow from the intake port to the combustion chamber, exhaust valve means fluidly connecting the combustion chamber to an exhaust passage and opening and closing in specific phase relation to piston reciprocation, ignition means for the combustion chamber firing in phase to piston reciprocation, said engine operating on the four cycle principle comprising an intake stroke, a compression stroke, a power stroke and an exhaust stroke;

said method comprising the steps of:

(1) Producing a dilute combustible air-fuel mixture;

(2) Variably restricting flow of the dilute combustible air-fuel mixture in the intake port to form a "Coanda" wall attached flow and filling the space not occupied by said wall attached "Coanda" flow with a fluid mechanically stable recirculating vortex system, said vortex system smoothly intersecting with said wall attached flow thereby minimizing the turbulent dissipation of the wall attached flow;

(3) Introducing said flow into the combustion chamber through said intake valve opening in the form of a high velocity flow having high angular momentum with respect to the central axis of said cylindrical passage, where the flow pattern through said intake valve opening forms a flow pattern inside said combustion chamber which pattern has the high velocity gradients characteristic of an irrotational vortex so as to produce substantially homogeneous microscale air-fuel-products of previous combustion volume statistics thereby providing low cyclic time losses for mechanically efficient engine operation with very dilute mixtures.

* * * * *